United States Patent
Hirose et al.

(10) Patent No.: US 9,896,606 B2
(45) Date of Patent: Feb. 20, 2018

(54) PRESSURE-SENSITIVE ADHESIVE SHEET AND USE THEREOF

(71) Applicant: NITTO DENKO CORPORATION, Ibaraki-shi, Osaka (JP)

(72) Inventors: Tetsuya Hirose, Ibaraki (JP); Shinji Inokuchi, Ibaraki (JP); Kenichi Nishikawa, Ibaraki (JP); Takayuki Shimada, Sayama (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 14/903,087

(22) PCT Filed: Jul. 9, 2014

(86) PCT No.: PCT/JP2014/068315
§ 371 (c)(1),
(2) Date: Jan. 6, 2016

(87) PCT Pub. No.: WO2015/005388
PCT Pub. Date: Jan. 15, 2015

(65) Prior Publication Data
US 2016/0376470 A1    Dec. 29, 2016

(30) Foreign Application Priority Data

Jul. 9, 2013 (JP) .................. 2013-144048
Jul. 9, 2013 (JP) .................. 2013-144049
Jul. 9, 2013 (JP) .................. 2013-144050

(51) Int. Cl.
C09J 7/02        (2006.01)
C09J 133/14      (2006.01)
C09J 133/06      (2006.01)

(52) U.S. Cl.
CPC ........... *C09J 7/0217* (2013.01); *C09J 133/14* (2013.01); *C09J 7/0289* (2013.01); *C09J 133/06* (2013.01);
(Continued)

(58) Field of Classification Search
None
See application file for complete search history.

(56) References Cited

U.S. PATENT DOCUMENTS 5,814,685 A * 9/1998 Satake ................ C09D 11/326
                                                        347/100
6,861,139 B2 * 3/2005 Takeda ................ C09J 123/283
                                                        428/343

(Continued)

FOREIGN PATENT DOCUMENTS

EP    2 166 052 A1     3/2010
JP    2009-242767 A   10/2009
(Continued)

OTHER PUBLICATIONS

International Search Report for PCT/JP2014/068315 dated Oct. 14, 2014.
(Continued)

*Primary Examiner* — Frank D Ducheneaux
(74) *Attorney, Agent, or Firm* — Sughrue Mion, PLLC

(57) ABSTRACT

A PSA sheet is provided, having an adhesive face formed of an acrylic PSA layer comprising an acrylic polymer. The PSA sheet has a peel strength of 5 N/10 mm or greater. The peel strength is measured as such that the adhesive face is directly adhered to an ethylene-propylene-diene rubber surface and after 20 minutes, peeled in the 180° direction at a tensile speed of 50 mm/min.

20 Claims, 4 Drawing Sheets

(52) U.S. Cl.
CPC .... *C09J 2201/606* (2013.01); *C09J 2201/622* (2013.01); *C09J 2400/243* (2013.01); *C09J 2433/00* (2013.01); *C09J 2433/006* (2013.01)

(56) References Cited

U.S. PATENT DOCUMENTS

| | | | |
|---|---|---|---|
| 7,070,051 B2 * | 7/2006 | Kanner | A61B 17/06133 |
| | | | 206/382 |
| 8,051,607 B2 * | 11/2011 | Okajima | B29C 47/003 |
| | | | 49/490.1 |
| 2009/0233093 A1 | 9/2009 | Toyama et al. | |
| 2011/0070435 A1 | 3/2011 | Toyama et al. | |
| 2011/0076489 A1 | 3/2011 | Nonaka et al. | |
| 2011/0129661 A1 | 6/2011 | Tsubaki et al. | |
| 2012/0177901 A1 | 7/2012 | Hirose et al. | |
| 2012/0183769 A1 | 7/2012 | Nasu et al. | |
| 2014/0178682 A1 | 6/2014 | Shirai et al. | |

FOREIGN PATENT DOCUMENTS

| | | | | |
|---|---|---|---|---|
| JP | | 2009-286882 A | 12/2009 | |
| JP | | 2011-084732 A | 4/2011 | |
| JP | | 2011-111594 A | 6/2011 | |
| JP | | 2013-047296 A | 3/2013 | |
| JP | | 2013-129826 A | 7/2013 | |
| WO | WO 2011/033736 A1 * | 3/2011 | ................ C09J 7/02 |
| WO | | 2011/040422 A1 | 4/2011 | |
| WO | | 2013/005507 A1 | 1/2013 | |

OTHER PUBLICATIONS

Extended European Search Report dated Dec. 8, 2016, from the European Patent Office in counterpart European application No. 14823556.7.
First Notice of Opinion on Examination dated Aug. 1, 2017 from the State Intellectual Property Office of the P.R.C. in counterpart application No. 201480039322.5.

* cited by examiner

[Fig. 1]
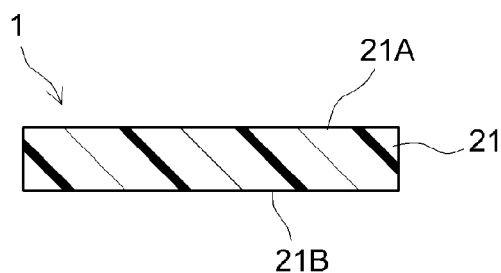
[Fig. 2]
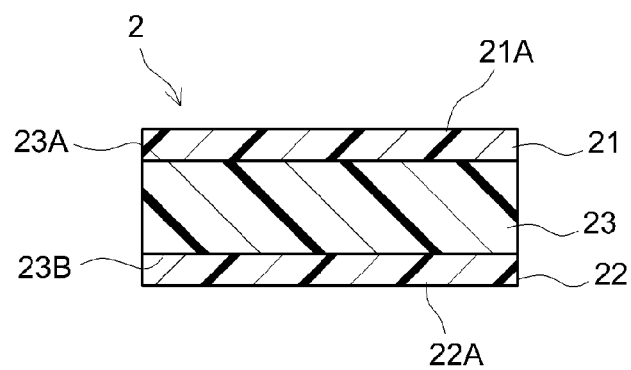
[Fig. 3]
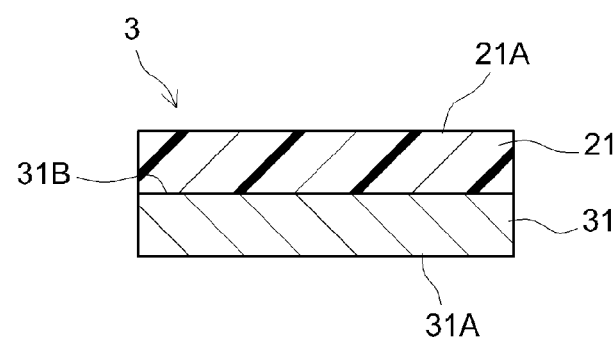

[Fig. 4]
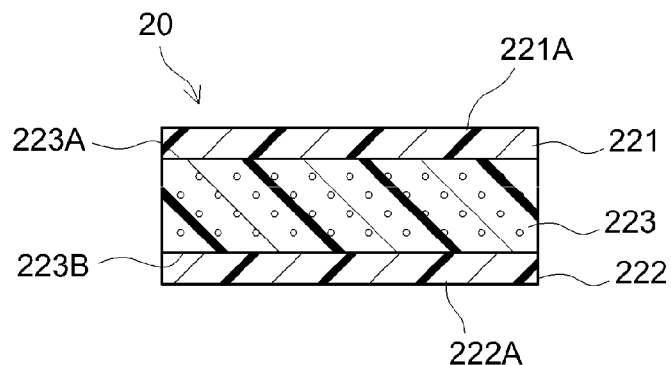
[Fig. 5]
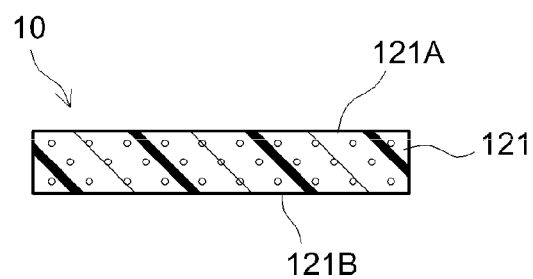
[Fig. 6]
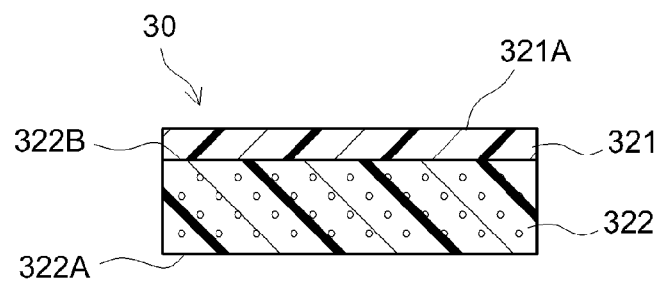

[Fig. 7]
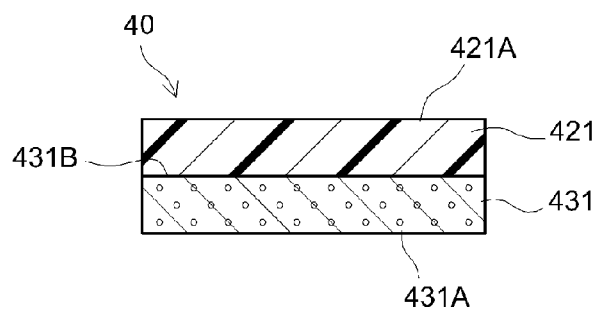
[Fig. 8]
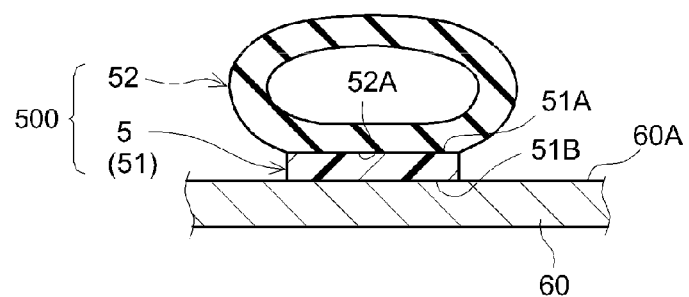
[Fig. 9]
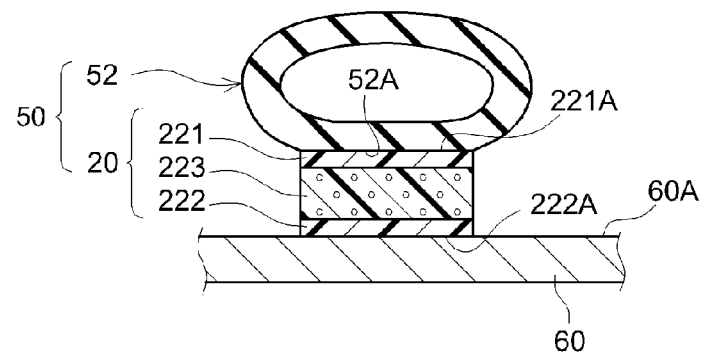

[Fig. 10]
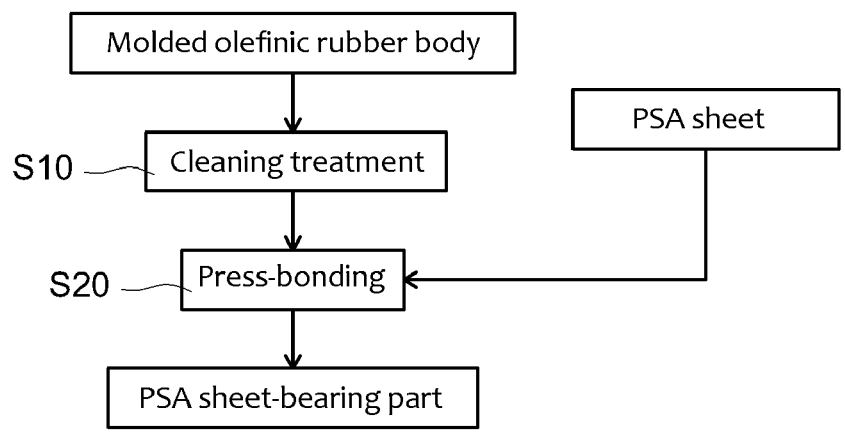

PRESSURE-SENSITIVE ADHESIVE SHEET AND USE THEREOF

CROSS REFERENCE TO RELATED APPLICATIONS

This application is a National Stage of International Application No. PCT/JP2014/068315 filed Jul. 9, 2014, claiming priority based on Japanese Patent Application Nos. 2013-144048, 2013-144049 and 2013-144050 filed Jul. 9, 2013, the contents of all of which are incorporated herein by reference in their entirety.

TECHNICAL FIELD

The present invention relates to a pressure-sensitive adhesive sheet having an acrylic PSA. This invention also relates to a pressure-sensitive adhesive sheet-bearing part that uses the pressure-sensitive adhesive sheet.

The present application claims priority to Japanese Patent Application Publication Nos. 2013-144048, 2013-144049 and 2013-144050 filed on Jul. 9, 2013; and the entire contents thereof are incorporated herein by reference.

BACKGROUND ART

In general, pressure-sensitive adhesive (PSA) has properties to be in a soft solid (viscoelastic) state in a room temperature range and easily adhere to adherend with some pressure applied. In particular, acrylic PSA is superior in lightfastness, weatherability, oil resistance, etc., to rubber-based PSA; and therefore, PSA sheets having acrylic PSA are widely used for joining, fastening and so on in various fields. Technical literatures related to PSA sheet using acrylic PSA include Patent Documents 1 to 3.

CITATION LIST

Patent Literature

[Patent Document 1] Japanese Patent Application Publication No. 2011-111594
[Patent Document 2] Japanese Patent Application Publication No. 2011-84732
[Patent Document 3] WO 2013/005507

SUMMARY OF INVENTION

Technical Problem

An adhesive face (a surface adhered to adherend) formed with acrylic PSA tends to be less adhesive (typically evaluated by its peel strength) to a low-polar adherend such as polyethylene, polypropylene, ethylene propylene diene rubber (EPDM), etc., than to a high-polar adherend. Especially, olefinic rubber materials such as EPDM and thermoplastic olefinic elastomer (TPO) have low polarity and also comprise, in general, a great deal of plasticizer such as paraffin oil; and therefore, they are known as poorly adhesive materials with respect to acrylic PSA. It will be beneficial if the adhesiveness of a PSA sheet having acrylic PSA to these low-polar materials and poorly adhesive materials can be increased.

An objective of the present invention is to provide a PSA sheet that has an acrylic PSA and exhibits great adhesion to various types of adherend including a low-polar adherend.

Another objective of the present invention is to provide a PSA sheet that has an acrylic PSA and exhibits improved adhesion to an olefinic rubber material. Another related objective is to provide a PSA sheet-bearing part in which a PSA sheet having an acrylic PSA is adhered to a surface of an olefinic rubber material and a method for producing the same.

As described above, an adhesive face formed of acrylic PSA tends to show insufficient adhesion to olefinic rubber materials. Thus, olefinic rubber materials are often provided with primer layers and acrylic PSA is applied via the primer layers to the olefinic rubber materials. As for the primer layer-forming material, a material (e.g. chlorinated polypropylene) adhesive to both olefinic rubber materials and acrylic PSA is used.

However, a typical conventional primer layer is formed by applying a solution (primer solution) that comprises primer layer-forming components in an organic solvent and allowing it to dry. If formation of such a primer layer can be omitted, it will be preferable from the standpoint of lowering environmental stress and reducing costs related to the primer layer formation (e.g. reducing material costs, energy costs, facility costs, etc.) and so on.

Accordingly, another objective of this invention is to provide a PSA sheet that comprises an adhesive face formed of an acrylic PSA, yet exhibits excellent adhesion even when applied to a surface of an olefinic rubber material without the presence of a primer layer in between. Another related objective is to provide a PSA sheet-bearing part in which an adhesive face formed of an acrylic PSA is joined directly and firmly to a surface of an olefinic rubber material.

Solution to Problem

To solve at least one of the problems described above, the following art is provided.

A PSA sheet provided by this description has an adhesive face formed of an acrylic PSA layer. The PSA sheet is characterized by exhibiting a peel strength of 5 N/10 mm or greater. The peel strength is measured as such that the adhesive face is directly adhered to a EPDM surface and after 20 minutes, peeled in the 180° direction at a tensile speed of 50 mm/min. This peel strength may be referred to as the "to-EPDM initial peel strength" hereinafter.

Such a PSA sheet that shows high initial peel strength when directly applied to a EPDM surface (e.g. without the presence of a primer layer in-between) is useful since it may provide excellent adhesion to EPDM and other olefinic rubber materials.

In a preferable embodiment of the PSA sheet disclosed herein, the PSA sheet comprises a support layer comprising a bubble-containing layer and an acrylic PSA layer supported with the support layer. According to such an embodiment, a higher-performance PSA sheet can be obtained due to the nature of the acrylic PSA layer forming the adhesive face combined with the nature of the support layer supporting the acrylic PSA layer.

A preferable example of the bubble-containing layer in the art disclosed herein is a bubble-containing adhesive layer formed of a PSA including bubbles. Another preferable example of the bubble-containing layer is a foam sheet comprising a foam layer (typically a non-adhesive layer) formed of a plastic foam body. The PSA sheet disclosed herein may have a configuration including either a bubble-containing adhesive layer or a foam sheet or a configuration including both.

The PSA sheet disclosed herein preferably has a 10% compression hardness in a range of 0.01 Pa to 0.07 Pa. Such a PSA sheet may be balanced well in handling properties and conformability to a surface structure and deformation of adherend. Thus, for instance, when the adherend is formed with EPDM or other olefinic rubber material, the PSA sheet may have excellent properties to conform elastic deformation of such adherend to maintain tight contact with its surface.

The PSA sheet disclosed herein preferably has a breaking strength in a range of 0.3 Pa to 2.5 Pa. Such a PSA sheet may be balanced well in cohesion and conformability to a surface structure and deformation of adherend. Thus, for instance, when the adherend is formed with EPDM or other olefinic rubber material, the PSA sheet may be suitable for fixing the adherend to a desirable location while resisting repulsion of such adherend.

The PSA sheet disclosed herein preferably has an overall thickness in a range of 0.05 mm to 10 mm Such a PSA sheet is preferable since adhesion to EPDM and other olefinic rubber materials can be easily balanced with cohesion.

The PSA sheet provided by this description can produce great adhesion even in an embodiment of use where it is directly applied to EPDM or other olefinic rubber material surface. According to such an embodiment of use, a step of forming a primer layer can be omitted. Accordingly, the PSA sheet disclosed herein is preferable as the PSA sheet for direct application to an olefinic rubber surface. The PSA sheet provided by this description can be preferably used also in an embodiment where it is applied via a primer layer to an olefinic rubber material surface.

This description provides a PSA sheet-bearing part. The PSA sheet-bearing part comprises a part having a surface formed of an olefinic rubber material (or an olefinic rubber surface, hereinafter) and a PSA sheet of which at least one surface is formed as an adhesive face. The adhesive face can be a surface of an acrylic PSA layer comprising an acrylic polymer. The PSA sheet is directly adhered at its adhesive face to the olefinic rubber surface of the part. The PSA sheet has a peel strength of 7 N/10 mm or greater when it is peeled from the olefinic rubber surface in the 180° direction at a tensile speed of 50 mm/min.

Such a PSA sheet-bearing part in which the PSA sheet is joined directly and firmly to the olefinic rubber surface is preferable for an application where, for instance, the part is attached via the PSA sheet to a desirable location (possibly a surface of another part). In the PSA sheet-bearing part, the adhesive face of the PSA sheet is directly adhered to the olefinic rubber surface. That is, in the PSA sheet-bearing part, no primer layer is present between the adhesive face and olefinic rubber surface. The PSA sheet-bearing part in such a configuration is preferable from the standpoint of reducing environmental stress and costs. Because the adhesive face is formed as the surface of the acrylic PSA layer, it is also preferable from the standpoint of the weatherability and lightfastness.

From the standpoint of the conformability to a surface structure and deformation of the part and the handling properties of the PSA sheet, etc., the PSA sheet constituting the PSA sheet-bearing part disclosed herein preferably has a 10% compression hardness of 0.01 Pa to 0.07 Pa.

From the standpoint of achieving cohesion and conformability to a surface structure and deformation of the part in a well-balanced manner, the PSA sheet constituting the PSA sheet-bearing part disclosed herein preferably has a breaking strength in a range of 0.3 Pa to 2.5 Pa.

From the standpoint of achieving cohesion and adhesion to the part, the PSA sheet constituting the PSA sheet-bearing part preferably has an overall thickness in a range of 0.05 mm to 10 mm.

In a preferable embodiment of the PSA sheet-bearing part disclosed herein, the part is a weather strip. According to such a PSA sheet-bearing part (i.e. a PSA sheet-bearing weather strip), because of the high adhesion of the PSA sheet to the weather strip, the weather strip can be properly joined via the PSA sheet to a suitable location.

To solve at least one of the problems described above, the following art is further provided.

Another PSA sheet provided by this description has at least one surface formed as an adhesive face. The at least one surface is a surface of an acrylic PSA layer comprising an acrylic polymer. The acrylic polymer comprises an amino group-containing (meth)acrylate as its monomeric component. The PSA sheet includes at least one bubble-containing layer. In the PSA sheet in such a configuration, the adhesive face may exhibit great adhesion to a low-polar adherend because of the effects of the amino group-containing (meth)acrylate. As a result, great adhesion can be achieved relative to various types of adherend including a low-polar adherend. With the inclusion of the bubble-containing layer, the PSA sheet shows great conformability to a surface structure and deformation of an adherend and the adhesive face is likely to maintain tight contact with the adherend surface. Combined with the effects of the use of the amino group-containing (meth)acrylate, this may advantageously contribute to increase the adhesion to various types of adherend including a low-polar adherend.

In a preferable embodiment of the PSA sheet disclosed herein, the PSA sheet comprises a support layer including the bubble-containing layer as well as the acrylic PSA layer supported with the support layer. According to such an embodiment, a higher-performance PSA sheet can be obtained due to the nature of the acrylic PSA layer forming the adhesive face combined with the nature of the support layer supporting the acrylic PSA layer.

A preferable example of the bubble-containing layer in the art disclosed herein is a bubble-containing adhesive layer formed from a PSA comprising bubbles. Another preferable example of the bubble-containing layer is a foam sheet comprising a foam layer (typically a non-adhesive layer) formed with a plastic foam body. The PSA sheet disclosed herein may have a configuration including either a bubble-containing adhesive layer or a foam sheet or a configuration including both.

Preferably, the PSA sheet disclosed herein comprises the bubble-containing layer and a 10% compression hardness in a range of 0.01 Pa to 0.07 Pa. Such a PSA sheet may be balanced well in handling properties and conformability to a surface structure and deformation of adherend.

Preferably, the PSA sheet disclosed herein comprises the bubble-containing layer and a breaking strength in a range of 0.3 Pa to 2.5 Pa. Such a PSA sheet may be balanced well in cohesion and conformability to a surface structure and deformation of adherend.

To solve at least one problem described above, the following art is further provided.

In particular, another PSA sheet provided by this description has an adhesive face to be applied to a surface formed of an olefinic rubber material (or an olefinic rubber surface hereinafter). The adhesive face is a surface of an acrylic PSA layer comprising an acrylic polymer. The acrylic polymer comprises an amino group-containing (meth)acrylate as its monomeric component. The PSA sheet in such a configuration may exhibit excellent adhesion to an olefinic rubber surface (e.g. a surface formed of EPDM) due to the effects of the amino group-containing (meth)acrylate.

The amino group-containing (meth)acrylate is preferably included at a ratio higher than 2.6% by mass of the monomeric components of all polymers (or "all monomeric components" hereinafter) in the acrylic PSA layer. The PSA sheet having such an acrylic PSA layer may show greater adhesion to an olefinic rubber surface.

The acrylic PSA layer may be a layer formed with an acrylic PSA composition. In a preferable embodiment, the acrylic PSA composition comprises a polymerization product (a) of a monomer mixture comprising an acyclic alkyl (meth)acrylate. The monomer mixture preferably comprises the amino group-containing (meth)acrylate. Its ratio is preferably above 0.2% by mass of the monomer mixture. The PSA sheet having such an acrylic PSA layer may show greater adhesion to an olefinic rubber surface.

The art disclosed herein can be preferably practiced in an embodiment where the acrylic PSA layer is a layer formed with an acrylic PSA composition, with the acrylic PSA composition comprising a polymerization product (a) of a monomer mixture that comprises an acyclic alkyl (meth) acrylate and further comprising an acrylic oligomer (b) having a weight average molecular weight (Mw) of $2 \times 10^4$ or lower. Herein, it is preferable that at least either the polymerization product (a) or the acrylic oligomer (b) comprises the amino group-containing (meth)acrylate as its monomeric component. The PSA sheet having such an acrylic PSA layer may exhibit grater adhesion to an olefinic rubber surface. In a preferable embodiment, each of the polymerization product (a) and the acrylic oligomer (b) comprises the amino group-containing (meth)acrylate as its monomeric component. In such an embodiment, the PSA sheet can be brought about with yet greater adhesion to an olefinic rubber surface.

As described earlier, conventional general acrylic PSA tends to show insufficient adhesion to olefinic rubber materials. Thus, primer layers are often provided to surfaces of olefinic rubber materials and acrylic PSA is adhered via the primer layers to the olefinic rubber materials. As for the primer layer-forming material, a material (e.g. chlorinated polypropylene) adhesive to both olefinic rubber materials and acrylic PSA is used.

The PSA sheet provided by this description for application to olefinic rubber can exhibit great adhesion also in an embodiment of use where the PSA sheet is directly applied to an olefinic rubber surface without the presence of a primer layer in-between. According to such an embodiment of use, a step of forming a primer layer on the olefinic rubber material surface can be omitted. Thus, the PSA sheet disclosed herein for application to olefinic rubber is suitable as a PSA sheet that is directly applied to an olefinic rubber surface. The PSA sheet provided by this description for application to olefinic rubbers can also be preferably used in an embodiment where it is applied via a primer layer to an olefinic rubber material surface.

This description also provides a PSA sheet-bearing part. The PSA sheet-bearing part comprises a part having an olefinic rubber surface (a surface formed of an olefinic rubber material) and a PSA sheet in which at least one surface is formed as an adhesive face. The PSA sheet is adhered at the adhesive face to the olefinic rubber surface of the part. The adhesive face may be a surface of an acrylic PSA layer comprising an acrylic polymer. The acrylic polymer comprises an amino group-containing (meth)acrylate as its monomeric component. With respect to the PSA sheet-bearing part in such a configuration, the adhesive face of the PSA sheet shows great adhesion to an olefinic rubber surface; and therefore, the PSA sheet can be firmly adhered to the part. Accordingly, the PSA sheet is preferable for an application where the olefinic rubber surface-bearing part is fastened via the PSA sheet to a desirable location (possibly a surface of another part).

In a preferable embodiment of the PSA sheet-bearing part disclosed herein, the adhesive face of the PSA sheet is directly adhered to the surface formed of the olefinic rubber (i.e. without the presence of a layer such as a primer layer between the adhesive face and the olefinic rubber surface). In the PSA sheet-bearing part, because of the effects of the amino group-containing (meth)acrylate, the adhesive face exhibits great adhesion to an olefinic rubber surface and thus the part can be preferably made in such an embodiment.

In a preferable embodiment of the PSA sheet-bearing part disclosed herein, the primary component of the polymer in the olefinic rubber material is EPDM. According to such an embodiment, the effects of the inclusion of the PSA layer comprising an acrylic polymer having the composition disclosed herein can be produced particularly well.

The PSA sheet disclosed herein for application to olefinic rubber can be preferably used in an embodiment where it is applied to a surface of an olefinic rubber material whose primary polymer component is EPDM. According to such an embodiment, the effects of the inclusion of a PSA layer comprising an acrylic polymer having the composition disclosed herein can be produced particularly well.

The olefinic rubber material comprises carbon black in a preferable embodiment of the PSA sheet-bearing part or PSA sheet for application to olefinic rubber disclosed herein. In an embodiment of use where it is applied to a surface of an olefinic rubber material comprising carbon black, the effects of the inclusion of a PSA layer comprising an acrylic polymer having the composition disclosed herein can be produced particularly well.

In a preferable embodiment of the PSA sheet-bearing part disclosed herein, the part having the surface formed of the olefinic rubber material is a weather strip. According to such a PSA sheet-bearing part (i.e. a PSA sheet-bearing weather strip), because of the high adhesion of the PSA sheet to the weather strip, the weather strip can be properly attached via the PSA sheet to a suitable location.

This description also provides a method for producing a PSA sheet-bearing part. The method comprises a step of obtaining a molded olefinic rubber body having an olefinic rubber surface (a surface formed of an olefinic rubber material). It also includes a step of obtaining a PSA sheet in which at least one surface is formed as an adhesive face. The method comprises a step of applying the adhesive face to the olefinic rubber surface. Preferably, the step of applying the adhesive face can be a step of applying the adhesive face directly (i.e. without the presence of another layer) to the olefinic rubber surface. Herein, the adhesive face is a surface of an acrylic PSA layer comprising an acrylic polymer. The acrylic polymer comprises an amino group-containing (meth)acrylate as its monomeric component. According to such a method, by the effects of the amino group-containing (meth)acrylate, a PSA sheet-bearing part in which a PSA sheet is firmly adhered to a surface of a molded olefinic rubber body can be produced.

The PSA sheet-bearing part production method disclosed herein can be preferably practiced in an embodiment where the surface formed of the olefinic rubber material is subjected to cleaning treatment by which a cleaning liquid comprising an organic solvent is allowed to make contact with the surface and the adhesive face is directly applied to the cleaned surface. According to such an embodiment, the PSA sheet-bearing part can be produced with the PSA sheet being more firmly joined to the surface of the molded olefinic rubber body.

In a preferable embodiment, the step of applying the adhesive face to the olefinic rubber surface can be carried out at ordinary temperature. Such an embodiment is preferable because it can save energy costs as compared to an embodiment where, for instance, one or each of the molded olefinic rubber body or the PSA sheet is heated when the molded body is applied to the PSA sheet. It is also preferable in view that the application can be done with simpler equipment.

The PSA sheet-bearing part production method disclosed herein can be preferably practiced in an embodiment where the molded olefinic rubber body is a weather strip. According to a PSA sheet-bearing weather strip produced in such an embodiment, the weather strip can be properly attached via the PSA sheet to a desirable location.

BRIEF DESCRIPTION OF DRAWINGS

FIG. 1 shows a schematic cross-sectional view of the configuration of the PSA sheet according to an embodiment.

FIG. 2 shows a schematic cross-sectional view of the configuration of the PSA sheet according to another embodiment.

FIG. 3 shows a schematic cross-sectional view of the configuration of the PSA sheet according to another embodiment.

FIG. 4 shows a schematic cross-sectional view of the configuration of the PSA sheet according to another embodiment.

FIG. 5 shows a schematic cross-sectional view of the configuration of the PSA sheet according to another embodiment.

FIG. 6 shows a schematic cross-sectional view of the configuration of the PSA sheet according to another embodiment.

FIG. 7 shows a schematic cross-sectional view of the configuration of the PSA sheet according to another embodiment.

FIG. 8 shows a schematic cross-sectional view of a PSA sheet-bearing part (an article having the PSA sheet) according to an embodiment.

FIG. 9 shows a schematic cross-sectional view of a PSA sheet-bearing part (an article having the PSA sheet) according to another embodiment.

FIG. 10 shows a flow chart illustrating the PSA sheet-bearing part production method according to an embodiment.

DESCRIPTION OF EMBODIMENTS

Preferred embodiments of the present invention are described below. Matters necessary to practice this invention other than those specifically referred to in this description can be understood by a person skilled in the art based on the disclosure about implementing the invention in this description and conventional techniques in the pertinent field. The present invention can be practiced based on the contents disclosed in this description and conventional techniques in the subject field.

In the drawings referenced below, a common reference numeral may be assigned to members or sites producing the same effects, and duplicated descriptions are sometimes omitted or simplified. The embodiments described in the drawings are schematized for clear illustration of the present invention, and do not necessarily represent the accurate size or reduction scale of the PSA sheet of this invention actually provided as a product.

As described earlier, the term "PSA" in this description refers to a material present in a soft solid (viscoelastic) state in a room temperature range and has a property to easily adhere to adherend with some pressure applied. As defined in "*Adhesion Fundamental and Practice*" by C. A. Dahlquist (McLaren & Sons (1966), P. 143), the PSA referred to herein is a material having a property that satisfies complex tensile modulus $E^*(1\ Hz) < 10^7$ dyne/cm$^2$ (typically, a material exhibiting the described characteristics at 25° C.).

As used herein, the term "(meth)acryloyl" comprehensively refers to acryloyl and methacryloyl. Similarly, the term "(meth)acrylate" comprehensively refers to acrylate and methacrylate, and the term "(meth)acryl" comprehensively refers to acryl and methacryl. The term "(cyclo)alkyl" comprehensively refers to acyclic alkyl and cycloalkyl. The "(cyclo)alkyl" is sometimes referred to simply as the "alkyl."

In this description, the term "acrylic monomer" refers to a monomer having at least one (meth)acryloyl group per molecule. The term "acrylic polymer" refers to a polymer that comprises an acrylic monomer as a monomer unit (monomeric component) constituting the polymer. In other words, it refers to a polymer comprising a monomer unit derived from an acrylic monomer. Thus, the "acrylic polymer" referred to herein may comprise, as a part or the entirety of its monomeric components, an acrylic monomer having at least one methacryloyl group per molecule.

The term "primary component" in this description typically refers to a component accounting for more than 50% by mass of the content, unless otherwise specified. For instance, an alkyl (meth)acrylate being the primary component of a monomer mixture typically means that more than 50% by mass of the monomer mixture is the alkyl (meth)acrylate. For instance, EPDM being the primary component of a polymer in an olefinic rubber material typically means that more than 50% by mass of the total amount of the polymer in the olefinic rubber material is EPDM.

In the description below, the term "standard EPDM piece" refers to the standard EPDM test piece specified in Section 3.1.4, *Worldwide Engineering Standards, Material Specification Adhesives*, GMW 15201 (published December, 2010) by General Motors. That is, it refers to a 33.4 mm wide by 3.2 mm thick rectangular EPDM piece, ASTM D2000-00, Shore A, 70 durometer (black) dense (EPDM), available from Lauren Manufacturing, or to an equivalent product.

In this description, the term "active energy ray" refers to an energy ray having energy enough to cause a chemical reaction, such as polymerization reaction, crosslinking reaction, initiator decomposition, etc. Examples of the active energy rays referred to herein include light such as UV rays, visible light, infrared rays, etc., as well as radiation such as α-rays, δ-rays, γ-rays, electron beam, neutron beam, X rays, etc.

As used herein, the term "PSA layer" herein refers to a layer having a peel strength of 0.1 N/20 mm or greater when measured based on JIS 20237(2004), where, with a SUS304 stainless steel plate being an adherend, it is press-bonded to the adherend with a 2 kg roller moved back and forth once in a measurement environment at 23° C. and after 30 minutes, it is peeled in the 180° direction at a tensile speed of 300 mm/min.

As used herein, the term "non-adhesive layer" refers to a layer that is not considered as a PSA layer, typically referring to a layer having a peel strength of less than 0.1 N/20 mm. A layer that does not stick to a SUS304 stainless steel plate when press-bonded to the stainless steel plate with a 2 kg roller moved back and forth once (i.e. a layer that is essentially non-adhesive on the stainless steel plate) in an measurement environment at 23° C. is a typical example included in the concept of the non-adhesive layer referred to herein.

In this description, the term "bubble-containing layer" refers to a layer wherein, at 25° C., the ratio of volume of bubbles in the apparent volume of the layer is 3% or higher by volume (typically 5% or higher by volume).

In this description, the term "bubble-free layer" refers to a layer that is not considered as a bubble-containing layer. In particular, it refers to a layer in which the ratio of volume of bubbles in the apparent volume of the layer is lower than 3% by volume (typically lower than 1% by volume).

In this description, the term "plastic film" typically refers to non-porous plastic film and is conceptually distinct from woven and nonwoven fabrics formed of plastic fibers or from a foam sheet. The plastic film in this description typically belongs to the bubble-free layer.

<Adhesion to Standard EPDM Plate>

The PSA sheet disclosed herein has an adhesive face formed with an acrylic PSA layer comprising an acrylic polymer. The PSA sheet preferably has, but not particularly limited to, a to-EPDM initial peel strength of 5 N/10 mm or greater.

Herein, the "to-EPDM initial peel strength" refers to the value measured by the following method, using the standard EPDM piece described above or an equivalent product as the adherend.

[Measurement Method of to-EPDM Initial Peel Strength]

A PSA sheet to be measured is prepared into a 10 mm wide strip to make a measurement sample. When the PSA sheet to be measured is in a form of double-faced PSA sheet, 50 µm thick polyethylene terephthalate (PET) film should be applied to back one of the adhesive faces in advance.

The standard EPDM plate surface as the adherend is cleaned by wiping twice in one direction with cloth wet with isopropanol (IPA) (cleaning treatment).

In a standard environment at 23° C. and 50% RH, to the cleaned adherend surface, the adhesive face of the measurement sample is press-bonded with a roller weighing about 2 to 5 kg moved back and forth once. After the resultant is stored in the standard environment for 20 minutes, 180° peel strength (N/10 mm) is measured in the same environment, based on JIS Z0237(2004). The measurement is taken twice and their arithmetic average value is used as the to-EPDM initial peel strength (N/10 mm).

The 180° peel strength can be measured, using a commercial general tensile tester. For instance, a universal tensile and compression testing machine (available from Minebea Co., Ltd., system name "Tensile/Compression Tester, TG-1kN") can be used.

When it is difficult to prepare a measurement sample in a 10 mm wide strip such as when the width of the PSA sheet is smaller than 10 mm, a measurement sample measuring a mm in width is used; and the product of the measured value of peel strength (N/α mm) multiplied by 10/α is used as the value instead.

In the PSA sheet disclosed herein, the adhesive face preferably has a to-EPDM initial peel strength of 5 N/10 mm or greater. The to-EPDM initial peel strength is preferably 7 N/10 mm or greater, more preferably 10 N/10 mm or greater, or yet more preferably 15 N/10 mm or greater. The PSA sheet showing such to-EPDM initial peel strength can bring about excellent initial adhesion to EPDM and other olefinic rubber materials. Such a PSA sheet is preferable, for instance, as a component of a PSA sheet-bearing part (e.g. a PSA sheet-bearing weather strip) described later.

The upper limit of the to-EPDM initial peel strength is not particularly limited. It is usually 100 N/10 mm or less, or typically 50 N/10 mm or less.

The PSA sheet preferably has a peel strength of 7 N/10 mm or greater when directly applied to the standard EPDM plate surface and after 7 days, peeled in the 180° direction at a tensile speed of 50 mm/min. Herein, the peel strength after 7 days refers to the value measured in the same manner as for the to-EPDM initial peel strength except that the storage period in the standard environment at 23° C. and 50% RH from the press-bonding of the adhesive face to the adherend is 7 days. Hereinafter, the peel strength after 7 days is sometimes referred to as the "post-aging to-EPDM peel strength."

A PSA sheet having a post-aging to-EPDM peel strength of 7 N/10 mm or greater may exhibit excellent adhesion to EPDM and other olefinic rubber materials for a long time. Thus, such a PSA sheet is preferable, for instance, as a component of a PSA sheet-bearing part (e.g. a PSA sheet-bearing weather strip) described later. Such a PSA sheet may be preferable, for instance, in a form of double-faced PSA sheet for an application where a part having a surface formed of EPDM or other olefinic rubber material is joined to a desirable location and like application. From the standpoint of the reliability of the joint, etc., the post-aging to-EPDM peel strength is preferably 10 N/10 mm or greater, more preferably 15 N/10 mm or greater, or yet more preferably 20 N/10 mm or greater.

The upper limit of the post-aging to-EPDM peel strength is not particularly limited. It is usually 100 N/10 mm or less, or typically 50 N/10 mm or less.

In a preferable embodiment of the PSA sheet provided by this description, the PSA sheet satisfies each of the following:

(1) having a to-EPDM initial peel strength of 5 N/10 mm or greater (preferably 7 N/10 mm or greater, more preferably 10 N/10 mm or greater, or yet more preferably 15 N/10 mm or greater); and (2) having a post-aging to-EPDM peel strength of 7 N/10 mm or greater (preferably 10 N/10 mm or greater, more preferably 15 N/10 mm or greater, or yet more preferably 20 N/10 mm or greater). Such a PSA sheet is preferable, for instance, as a component of a PSA sheet-bearing part (e.g. a PSA sheet-bearing weather strip).

<Configuration of PSA Sheet>

The shape and structure of the PSA sheet disclosed herein is not particularly limited. For instance, the PSA sheet may have a single-layer structure formed with one acrylic PSA layer or a multi-layer structure including an adhesive face-constituting acrylic PSA layer whose back face (opposite from the adhesive face) is laminated with a non-release surface of another layer. The other layer can be an acrylic PSA layer, a different PSA layer, or a non-adhesive layer.

The concept of PSA sheet referred to herein encompasses so-called PSA tape, PSA labels, PSA film and so on. The PSA layer is typically formed in a continuous manner, but it is not limited to such a form. For instance, it may be formed in a regular or random pattern of dots, stripes, etc. The PSA sheet provided by this invention may be in a roll form or in a flat sheet form. Alternatively, the PSA sheet may be processed into various shapes.

[Bubble-Containing Layer]

In a preferable embodiment of the PSA sheet disclosed herein, the PSA sheet comprises a bubble-containing layer. The bubble-containing layer can be thought as a layer that includes bubble structures. The "bubble structures" should just be structures having a gaseous component. They can be "bubbles" that are formed of solely the gaseous component and are structurally free of outer shells or they can be of a substance in a form of particles having hollow structures where the gaseous component is enclosed in outer shells (or such a substance may be referred to as "hollow particles" hereinafter). The material constituting the outer shells is not particularly limited. It can be an inorganic material such as glass or an organic material.

The bubble-containing layer can be an acrylic PSA layer constituting the first surface (first adhesive face) of the PSA sheet. When the PSA sheet comprises another layer in addition to the acrylic PSA layer constituting the first adhesive face, this other layer can be a bubble-containing layer. When the other layer is a bubble-containing layer, the bubble-containing layer can be a layer that is adhesive at ordinary temperature (i.e. a bubble-containing adhesive layer) or a layer that is essentially non-adhesive at ordinary temperature (i.e. a bubble-containing non-adhesive layer). In the PSA sheet having a multiple layer-containing structure (multi-layer structure) that includes two or more layers, the number of bubble-containing layers among the multiple layers can be one or can be two or more.

The inclusion of the bubble-containing layer in the PSA sheet provides adequate cushioning properties to the PSA sheet. By this, the adhesive face can absorb unevenness and a gap in the adherend surface, whereby the adhesive face can be adhered more tightly to the adherend surface. The tight adhesion of the adhesive face to the adherend surface may advantageously contribute to increase the adhesion to EPDM and other olefinic rubber surfaces. The bubble-containing layer may contribute to increase the flexibility (reduce the repulsive force) of the PSA sheet. By this, when the PSA sheet is applied along a curved surface or a surface having a gap or when the adherend to which the PSA sheet is adhered is deformed, etc., peeling (lifting) of the PSA sheet from the surface caused by its own repulsive force can be effectively inhibited.

The bubble structures in the bubble-containing layer disclosed herein may be formed solely with gas bubbles (i.e. shell-free gas bubbles), solely with hollow particles, or with both gas bubbles and hollow particles. From the standpoint of the cushioning properties, etc., a preferable PSA sheet has a bubble-containing layer that comprises at least bubble structures formed with gas bubbles.

The bubbles contained in the bubble-containing layer may be independent (separate) bubbles, successive bubbles, or a mixture of these. From the cushioning properties, a more preferable bubble-containing layer is formed to include many independent bubbles. With respect to independent bubbles, the gaseous component included in the bubbles (gas component forming the bubbles; or "bubble-forming gas" hereinafter) is not particularly limited, and it can be various gaseous components such as inert gases including nitrogen, carbon dioxide, argon, etc., as well as various gaseous components such as air, etc. When the polymerization, etc., are carried out in a state containing the bubble-forming gas, it is preferable to use, as the bubble-forming gas, a gas species that does not inhibit the reaction(s). From such a standpoint and in respect of the cost, etc., nitrogen can be preferably used as the bubble-forming gas.

In typical, the shapes of bubbles are more or less globular while they are not limited to such shapes. The average diameter of bubbles (average bubble diameter) is not particularly limited. It can be selected, for instance, from a range of 1 µm to 1000 µm, preferably 10 µm to 500 µm, or more preferably 30 µm to 300 µm. The average bubble diameter is usually suitably at most 50% of the thickness of the bubble-containing layer, or preferably at most 30% (e.g. at most 10 V.

The average bubble diameter can be determined typically by scanning electron microscopy (SEM), preferably by measuring 10 or more bubbles for their diameters and arithmetically averaging the results. For this, with respect to non-globular bubbles, they are converted to globular bubbles having the same volumes to determine the average bubble diameter.

The volume ratio (bubble content) of bubbles in the bubble-containing layer is not particularly limited. It can be suitably set so as to obtain target cushioning properties and flexibility. For instance, it can be 5 to 50% by volume of the volume of the entire bubble-containing layer (referring to the apparent volume which can be determined from the surface area and thickness of the bubble-containing layer). When the bubble-containing layer is a PSA layer, in view of the balance between the effects of the inclusion of bubbles and adhesive properties, the volume ratio of bubbles is suitably, for instance, 8 to 40% by volume.

[Bubble-Containing Adhesive Layer]

The bubble-containing layer may be an acrylic PSA layer constituting an adhesive face. In a PSA comprising another layer in addition to the adhesive face-constituting acrylic PSA layer, the other layer can be a bubble-containing layer. The other layer can be a bubble-containing adhesive layer constituting an adhesive face different from the adhesive face formed with the acrylic PSA layer, or a bubble-containing adhesive layer or bubble-containing non-adhesive layer that does not constitute an adhesive face. When the other layer is a bubble-containing adhesive layer, the adhesive layer can be an acrylic PSA layer or a non-acrylic PSA layer. The non-acrylic PSA layer can be a rubber-based PSA layer, polyester-based PSA layer, urethane-based PSA layer, silicone-based PSA layer, or the like.

In the PSA layer in an embodiment comprising a bubble-containing adhesive layer as the non-acrylic PSA layer constituting an adhesive face, from the standpoint of the cushioning properties and flexibility, etc., the PSA constituting the bubble-containing adhesive layer has, but not particularly limited to, a glass transition temperature (Tg) of preferably −40° C. or lower, or more preferably −50° C. or lower based on the composition of all monomeric components of the PSA. The lower limit of the Tg is not particularly limited. It is typically −80° C. or higher, for instance, −70° C. or higher.

In a preferable embodiment, as the PSA constituting the bubble-containing adhesive layer, it is preferable to use a PSA whose Tg based on the composition of its all monomeric components is lower than the Tg based on the composition of all monomeric components of the adhesive face-constituting acrylic PSA layer. This can bring about a high performance PSA sheet that combines high adhesion to EPDM contributed primarily by the acrylic PSA layer constituting the adhesive face and great cushioning properties contributed primarily by the bubble-containing adhesive layer. For instance, relative to the Tg of the adhesive face-constituting acrylic PSA layer, the Tg of the PSA constituting the bubble-containing adhesive layer is lower preferably by 5° C. or more, more preferably a by 10° C. or more, or yet more preferably by 15° C. or more (e.g. by 20° C. or more). In a PSA sheet comprising an acrylic PSA layer as a bubble-containing adhesive layer, it is particularly meaningful to satisfy the relationship of their Tg values.

As the method for forming such a bubble-containing layer, for instance, the following methods can be suitably employed: (1) a method where a PSA composition having a pre-mixed bubble-forming gas (preferably a PSA composition that cures with active energy rays such as UV rays to form PSA) is allowed to cure to form a bubble-containing adhesive layer, (2) a method where a PSA composition comprising a foaming agent is used to form bubbles from the foaming agent and thereby to form a bubble-containing adhesive layer, and like method. The foaming agent used is not particularly limited. A suitable one can be selected from commonly-known foaming agents. For instance, foaming agents such as thermally expandable microspheres and the like can be preferably used.

In forming a bubble-containing adhesive layer by the method (1), the method for preparing the PSA composition having a pre-mixed bubble-forming gas is not particularly limited, and a known bubble-mixing method can be used. An example of a device comprises a stator made of a finely toothed disc with a central open hole and a rotor which opposes the stator and is similarly made of a finely toothed disc. The PSA composition (PSA composition precursor) prior to bubble mixing is introduced between the stator's tooth and rotor's tooth in this device. With the rotor spinning at a high speed, a gaseous component (bubble-forming gas) is introduced to form bubbles through the open hole into the PSA composition precursor. By this, a PSA composition can be obtained, having finely dispersed bubbles mixed therein.

By applying such a PSA composition having a bubble-forming gas mixed therein to a prescribed surface and allowing it to cure, a bubble-containing adhesive layer can be formed. As the curing method, methods such as heating and irradiating active energy rays (e.g. UV rays) can be preferably employed. The bubble-containing adhesive layer can be preferably formed by subjecting the PSA composition having a bubble-forming gas mixed therein to heating, irradiation of active energy rays, etc., and allowing it to cure in a state where bubbles are stably kept.

From the standpoint of the mixing compatibility of the bubble-forming gas with the PSA composition precursor or the stability of bubbles, a surfactant may be added to the PSA composition. Examples of such a surfactant include ionic surfactants, hydrocarbon-based surfactants, silicone-based surfactants, fluorine-based surfactants and the like. Among these, fluorine-based surfactants are preferable. In particular, a fluorine-based surfactant having an oxyalkylene group (typically an oxyalkylene group having 2 to 3 carbon atoms) along with a fluorinated hydrocarbon group is preferable. Fluorine-based surfactants can be used singly as one species or in combination of two or more species. Examples of preferably usable commercial fluorine-based surfactants include trade name "SURFLON S-393" available from AGC Seimi Chemical Co., Ltd.

The amount of fluorine-based surfactant used is not particularly limited. For instance, the amount (based on non-volatiles) of fluorine-based surfactant used to 100 parts by mass of all monomeric components in the bubble-containing adhesive layer can be about 0.01 to 3 parts by mass. From the standpoint of obtaining greater effects of the use of fluorine-based surfactant (e.g. an effect to enhance the mixing or stability of bubbles), its amount is suitably 0.03 part by mass or greater, or preferably 0.05 part by mass or greater. When the bubble-containing adhesive layer consti-tutes an adhesive face, from the standpoint of the adhesive properties, the amount of surfactant is suitably 2 parts by mass or less, preferably 1.5 parts by mass or less, or more preferably 1 part by mass or less.

[Bubble-Containing Non-Adhesive Layer]

When the PSA sheet disclosed herein has a bubble-containing non-adhesive layer as a bubble-containing layer, the bubble-containing non-adhesive layer can be, for instance, a known foam sheet. The material of the foam sheet is not particularly limited. For instance, foam sheets comprising foam body layers formed of foam bodies of various plastic materials (plastic foam bodies) can be preferably used. The type of plastic material (including a rubber material) forming the plastic foam body is not particularly limited. For the plastic material, solely one species or a combination of two or more species can be used.

Specific examples of plastic foam bodies include polyolefinic foam bodies such as polyethylene foam bodies, polypropylene foam bodies, etc.; polyester-based foam bodies such as polyethylene terephthalate foam bodies, polyethylene naphthalate foam bodies, polybutylene terephthalate foam bodies, etc.; polyvinyl chloride-based foam bodies such as polyvinyl chloride foam bodies, etc.; vinyl acetate-based resin foam bodies; polyphenylene sulfide resin foam bodies; polyamide-based foam bodies such as polyamide (nylon) resin foam bodies, wholly aromatic polyamide (aramid) resin foam bodies, etc.; polyimide-based resin foam bodies; acrylic foam bodies such as acrylic resin foam bodies; polyether ether ketone (PEEK) foam bodies; polystyrene-based foam bodies such as polystyrene foam bodies; polyurethane-based foam bodies such as polyurethane resin foam bodies; and the lie. The plastic foam body can be a rubber-based foam body such as a polychloroprene rubber foam body. For instance, a polyolefinic foam sheet formed of a polyolefinic foam body, a polyester-based foam sheet formed of a polyester-based foam body, a polyimide-based foam sheet formed of a polyimide-based resin foam body, an acrylic foam sheet formed from an acrylic foam body, a polystyrene-based foam sheet formed of a polystyrene-based foam body, a polyurethane-based foam sheet formed of a polyurethane-based foam body, a rubber-based foam sheet formed of a rubber-based foam body or the like can be preferably used.

From the cushioning properties, a preferable foam sheet is formed of a foam body (elastic foam body) that exhibits adequate elasticity at ordinary temperature. For instance, it is preferable to use a foam sheet having a 10% compression hardness generally in a range of 0.007 Pa to 0.07 Pa (more preferably 0.01 Pa to 0.07 Pa) when the 10% compression hardness is measured in the same manner as for the 10% compression hardness of PSA sheets described later. A PSA sheet comprising such a foam sheet as the bubble-containing layer is preferable because the 10% compression hardness of the PSA sheet can be readily adjusted to be in a preferable range described later.

An example of preferable foam bodies is a polyolefinic foam body. As for the plastic material (i.e. a polyolefinic resin) forming the polyolefinic foam body, various commonly known or used polyolefinic resins can be used without particular limitations. Examples include polyethylenes such as a low-density polyethylene (LDPE), linear low-density polyethylene (LLDPE), high-density polyethylene (HDPE), metallocene catalyst-based linear low-density polyethylene, etc.; polypropylenes; ethylene-propylene copolymers; ethylene-vinyl acetate copolymers; and the like. These polyolefinic resins can be used singly as one species or in a combination of two or more species.

From the standpoint of the weatherability, etc., preferable examples of the foam sheet include a polyethylene-based foam sheet essentially formed of a polyethylene-based resin foam body, a polypropylene-based foam sheet essentially formed of a polypropylene-based resin foam body, and the like. Herein, the polyethylene-based resin refers to a resin formed from ethylene as its primary monomer (the primary component among monomers, i.e. a component accounting for more than 50% by mass) and may include HDPE, LDPE and LLDPE as well as ethylene-propylene copolymer and ethylene-vinyl acetate copolymer in which the copolymerization ratio of ethylene exceeds 50% by mass. Similarly, the polypropylene-based resin refers to a resin formed from propylene as its primary monomer. As for the foam sheet in the art disclosed herein, a polyethylene-based foam sheet can be preferably used.

[Bubble-Free Layer]

When the PSA sheet disclosed herein comprises at least one bubble-containing layer and at least one bubble-free layer, the bubble-free layer can be an adhesive layer (bubble-free adhesive layer) or a non-adhesive layer (bubble-free non-adhesive layer).

When the bubble-free layer is an adhesive layer, the adhesive layer can be an acrylic PSA layer or a non-acrylic PSA layer. The non-acrylic PSA layer can be a rubber-based PSA layer, polyester-based PSA layer, urethane-based PSA layer, silicone-based PSA layer, or the like.

When the bubble-free layer is a non-adhesive layer, as the non-adhesive layer, a suitable one can be selected and used in accordance of the application of the PSA sheet, such as plastic film including polypropylene film, ethylene-propylene copolymer film, polyester film, polyvinyl chloride film, etc.; metal foil such as aluminum foil, copper foil, etc.; or the like. As the plastic film, either non-stretched film or stretched (uni-axially stretched or bi-axially stretched) film can be used.

The PSA sheet disclosed herein may include a layer of woven fabric or non-woven fabric (meaning to include paper such as Japanese paper (Washi), high-grade paper, etc.) of a single species or a blend, etc., of various species of fibrous substance. The fibrous substance can be natural fibers such as hemp, cotton, etc.; synthetic fibers such as polyester, vinylon, etc.; semi-synthetic fibers such as acetate; or the like.

In this description, with respect to such a layer of a fibrous substance, if spaces among fibers constituting the layer are filled with some other material (PSA, thermoplastic resin, etc.), such a layer of a fibrous substance is treated as a composite material layer including the other material and the fibrous substance. Thus, with the apparent volume of the composite material layer being 100% by volume, when more than 97% by volume of the spaces among fibers of the fibrous substance are filled with the other material, the composite material layer is treated as a bubble-free layer. When 3% by volume or more of the inter-fiber spaces remains as bubbles, the composite material layer is treated as a bubble-containing layer.

On the other hand, when the inter-fiber spaces are not filled with the other material in the fibrous substance layer, if the volume of bubbles accounts for 3% by volume or more of the apparent volume of the fibrous substance layer itself, this layer is treated as a bubble-containing layer; and if it accounts for less than 3% by volume, it is treated as a bubble-free layer.

The PSA sheet disclosed herein can be preferably made in an embodiment free of such a fibrous substance layer.

FIG. 1 to FIG. 7 illustrate typical configurational examples of the PSA sheet disclosed herein.

Configurational Example 1

PSA sheet 1 shown in FIG. 1 is an adhesively double-faced PSA sheet formed of an acrylic PSA layer (first adhesive layer) 21 comprising an acrylic polymer. The PSA sheet 1 preferably has, but not particularly limited to, a 20-min peel strength (to-EPDM initial peel strength) of 5 N/10 mm or greater when measured upon direct application of either the first surface (first adhesive face) 21A or the second surface (second adhesive face) 21B of the PSA layer 21 onto an EPDM surface.

Although not particularly limited to this, PSA sheet 1 in such a configuration can be preferably used in an embodiment where each of the adhesive faces 21A and 21B is applied to an olefinic rubber surface such as EPDM. It can be preferably used also in an embodiment where the first adhesive face 21A is applied to an olefinic rubber surface and the second adhesive face 21B is applied to various types of adherend surface (not limited to an olefinic rubber surface) and in like embodiment. The PSA layer 21 may be a PSA layer having a multi-layer structure (laminate structure) in which two or more multiple acrylic PSA layers are laminated.

Configurational Example 2

PSA sheet 2 shown in FIG. 2 is a double-faced PSA sheet comprising a first PSA layer 21 constituting the first adhesive face 21A, a second PSA layer 22 constituting the second adhesive face 22A and an intermediate layer 23 placed between them. Among them, the first PSA layer 21 is an acrylic PSA layer. In other words, the first adhesive face 21A is a surface of an acrylic PSA layer (first PSA layer) 21. The second PSA layer 22 can be an acrylic PSA layer or a non-acrylic PSA layer. The non-acrylic PSA layer include a rubber-based PSA layer, polyester-based PSA layer, urethane-based PSA layer, silicone-based PSA layer, etc. In the intermediate layer 23, its first surface 23A and second surface 23B are both non-releasable surfaces. The intermediate layer 23 can be an adhesive layer or a non-adhesive layer. The PSA sheet 2 preferably has, but not particularly limited to, a to-EPDM initial peel strength of 5 N/10 mm or greater when measured at least with respect to the first adhesive face 21A.

Although not particularly limited to this, PSA sheet 2 in such a configuration can be preferably used, for instance, in an embodiment where the first adhesive face 21A is applied to an olefinic rubber surface such as EPDM and the second adhesive face 22A is applied to various types of adherend surface (not limited to an olefinic rubber surface), etc.

When the intermediate layer 23 is an adhesive layer, the adhesive layer can be an acrylic PSA layer or a non-acrylic PSA layer. The non-acrylic PSA layer can be a rubber-based PSA layer, polyester-based PSA layer, urethane-based PSA layer, silicone-based PSA layer, etc.

When the intermediate layer 23 is a non-adhesive layer, as the intermediate layer 23, a suitable species can be selected and used in accordance with the purpose of the PSA sheet, among, for instance, plastic films such as polypropylene films, ethylene-propylene copolymer films, polyester films, polyvinyl chloride films, etc.; foam sheets made of foam such as polyurethane foam, polyethylene foam, polychloroprene foam, etc.; woven fabrics and non-woven fabrics (meaning to include paper such as Japanese paper (Washi), high-grade paper, etc.) of a single species or a blend, etc., of various species of fibrous substance (which can be natural fibers such as hemp, cotton, etc.; synthetic fibers such as polyester, vinylon, etc.; semi-synthetic fibers such as acetate, etc.; and the like); metal foil such as aluminum foil, copper foil, etc.; and the like. For the plastic film, either non-stretched film or a stretched (uni-axially stretched or biaxially stretched) film can be used. One or each of the surfaces 23A and 23B of the intermediate layer 23 can be subjected to a surface treatment to increase the non-releasability of the surface(s), such as corona discharge treatment, primer layer formation, etc.

The PSA sheet 2 shown in FIG. 2 can be made also in an embodiment consisting of the first PSA layer (acrylic PSA layer) 21 and the intermediate layer 23, with the intermediate layer 23 being an adhesive layer. That is, it may have the same configuration as the one shown in FIG. 2, but without the second PSA layer 22. In the PSA sheet in this embodiment, the second surface 23B of the intermediate layer 23 shown in FIG. 2 constitutes the second adhesive face. A sheet in such a configuration can be preferably used, for instance, in an embodiment where the first adhesive face 21A is applied to EPDM or other olefinic rubber surface and the other second surface 23B of the intermediate layer 23 is applied to various types of adherend surface (not limited to an olefinic rubber surface).

Configurational Example 3

PSA sheet 3 shown in FIG. 3 is an adhesively single-faced PSA sheet comprising a first PSA layer 21 constituting the first surface (first adhesive face) 21A and a backside layer 31 constituting the second surface 31A of the PSA sheet 3. The first PSA layer 21 is an acrylic PSA layer. The backside layer 31 is a non-adhesive layer and at least its first PSA layer 21—side surface 31B is not releasable. The backside layer 31 can be of, for instance, a plastic film, woven fabric, non-woven fabric, foam sheet, metal foil and the like exemplified as the non-adhesive intermediate layer 23 in the description of FIG. 2. While not particularly limited, the PSA sheet 3 preferably has a to-EPDM initial peel strength of 5 N/10 mm or greater when measured with respect to the first adhesive face 21A.

PSA sheet (single-faced PSA sheet) 3 in such a configuration can be preferably used, for instance, in an embodiment where the first adhesive face 21A is applied to EPDM and other olefinic rubber surface. The first PSA layer 21—side surface 31B of the backside layer 31 may be subjected to a surface treatment to increase the non-releasing properties of the surface, such as corona discharge treatment, primer layer formation, etc. Of the backside layer 31, the surface 31A constituting the second surface of the PSA sheet may be subjected to a suitable treatment, such as a treatment to increase the releasing properties of the surface (formation of a release layer treated with a silicone-based, fluorine-based, long-chain alkyl-based release agent, etc.; polyolefin film lamination, etc.), a treatment to increase the non-releasing properties or printability of the surface (corona discharge treatment, etc.); a treatment to increase the decorativeness of the surface (e.g. printing, metal vapor deposition), and so on.

Configurational Example 4

The art disclosed herein can be preferably practiced, for instance, such as in PSA sheet 20 shown in FIG. 4, in an embodiment of PSA sheet 2 in the configuration shown in FIG. 2 where the intermediate layer 23 is a bubble-containing layer 223. In other words, PSA sheet 20 shown in FIG. 4 is a double-faced PSA sheet comprising a first PSA layer 221 constituting the first adhesive face 221A, a second PSA layer 222 constituting the second adhesive face 222A and an intermediate layer 223 placed between them. The first PSA layer 221 is a bubble-free adhesive layer formed of an acrylic PSA layer with its surface being the first adhesive face 221A. The second PSA layer 222 is a bubble-free adhesive layer formed of an acrylic PSA layer or other PSA layer with its surface being the second adhesive face 222A. The intermediate layer 223 is a bubble-containing layer and its first surface 223A and second surface 223B are both non-releasable surfaces. The intermediate layer 223 can be a bubble-containing adhesive layer or a bubble-containing non-adhesive layer. The PSA sheet preferably has, but not particularly limited to, a to-EPDM initial peel strength of 5 N/10 mm or greater when measured at least with respect to the first adhesive face 221A.

In PSA sheet 20 shown in FIG. 4, the back face (opposite from the first adhesive face 221A) of the first PSA layer 221 is supported with the first surface 223A of the intermediate layer 223. The back face of the second PSA layer 222 is supported with the second surface 223B of the intermediate layer 223. In other words, the intermediate layer 223 serves as the support layer for the first PSA layer 221 and the second PSA layer 222.

According to such a PSA sheet in a configuration where the PSA layers 221 and 222 are supported with the intermediate layer 223, by preferably combining the nature of the PSA layers 221 and 222 with the nature of the intermediate layer 223, a high performance PSA sheet can be made benefiting from their individual advantages. Adjustments can be easily made, for instance, so as to compose the PSA layer 221 constituting an adhesive face with the focus on the adhesion to EPDM and other olefinic rubber surfaces while composing the intermediate layer 223 as the support layer with the focus on the cushioning properties and cohesion. With the adhesive face-constituting PSA layers 221 and 222 being bubble-free layers and the intermediate layer 223 being a bubble-containing layer, highly smooth adhesive faces can be combined with great cushioning properties of the PSA sheet as a whole at a high level. It is also preferable from the standpoint of the quality of the external appearance that the adhesive face-constituting PSA layers 221 and 222 are bubble-free layers.

Configurational Example 4-1

A preferable example of PSA sheet 20 having a configuration shown in FIG. 4 is a configuration where the first PSA layer 221 is a bubble-free adhesive layer formed of an acrylic PSA layer, the second PSA layer 222 is a bubble-free adhesive layer formed of an acrylic PSA layer or other PSA layer, and the intermediate layer 223 is a bubble-containing adhesive layer. According to such a configuration, with the intermediate layer 223 being an adhesive layer, sufficient joining strength can be readily assured between the intermediate layer 223 and each of the PSA layers 221 and 222. From the standpoint of the joining strength, an acrylic PSA layer can be preferably used as the intermediate layer 223. It is also preferable from the standpoint of the weatherability of the PSA sheet 20, etc., that the intermediate layer 223 is an acrylic PSA layer. In an embodiment particularly preferable from the standpoint of the weatherability, each of the layers 221, 222 and 223 in the PSA sheet 20 is an acrylic PSA layer.

The method for preparing such a PSA sheet 20 is not particularly limited. It can be preferably produced, for instance, by a method comprising a step of preparing a bubble-containing adhesive layer as an intermediate layer 223, a step of preparing two independent PSA layers to form PSA layers 221 and 222, and a step of adhering these PSA layers to the first surface 223A and second surface 223B of the intermediate layer 223, respectively. In a preferable embodiment of such a production method, the bubble-containing layer and the two independent PSA layers are all allowed to cure with irradiation of active energy rays (typically light such as UV light).

The intermediate layer 223 can be a layer formed of a single bubble-containing adhesive layer or a layer having a multi-layer structure (laminate structure) in which multiple bubble-containing adhesive layers are laminated. When the intermediate layer 223 has a multi-layer structure formed of several bubble-containing adhesive layers, for the individual bubble-containing adhesive layers, the compositions, bubble contents, thicknesses and so on may be the same with or different from one another. The number of bubble-containing adhesive layers in the intermediate layer 223 is not particularly limited. For instance, it can be about 2 to 100 layers. From the standpoint of the productivity of the PSA sheet, etc., it is usually suitably about 2 to 50 layers, and preferably, for instance, about 2 to 30 layers.

Configurational Example 4-2

Another preferable example of PSA sheet 20 having a configuration shown in FIG. 4 is a configuration where each of the first PSA layer 221 and the second PSA layer 222 is a bubble-free adhesive layer formed of an acrylic PSA layer, and the intermediate layer 223 is a bubble-containing non-adhesive layer. One or each of the surfaces 223A and 223B of the intermediate layer 223 may be subjected to a surface treatment to increase the non-releasing properties of the surface(s), such as corona discharge treatment, primer layer formation, etc. In the PSA sheet 20 in such a configuration, because the intermediate layer 223 is a non-adhesive layer, the intermediate layer (bubble-containing layer) can be selected from a wider range of materials. It is preferable because, for instance, suitable thickness, bubble content, compression hardness, breaking strength, etc., can be easily selected for the intermediate layer and this makes it easy to adjust the cushioning properties, repulsion resistance, etc., of the PSA sheet as a whole.

Configurational Example 5

PSA sheet 10 shown in FIG. 5 is an embodiment of PSA sheet 1 according to Configurational Example 1 shown in FIG. 1, being a double-faced PSA sheet formed of an acrylic PSA layer as the bubble-containing adhesive layer 121. The PSA sheet 10 preferably has, but not particularly limited to, a to-EPDM initial peel strength of 5 N/10 mm or greater when measured about either the first surface (first adhesive face) 121A or the second surface (second adhesive face) 121B of the bubble-containing adhesive layer 121.

Although not particularly limited to this, PSA sheet 10 in such a configuration can be preferably used, similarly to the PSA sheet 1 according to Configurational Example 1, in an embodiment where each of the first surface (first adhesive face) 121A and the second surface (second adhesive face) 121B of the bubble-containing adhesive layer 121 is applied to an olefinic rubber surface such as EPDM. It can be preferably used also in an embodiment where the first adhesive face 121A is applied to an olefinic rubber surface and the second adhesive face 121B is applied to various types of adherend surface (not limited to an olefinic rubber surface).

The bubble-containing adhesive layer 121 can be a PSA layer formed of a single acrylic PSA layer or can be a PSA layer having a multi-layer structure (laminate structure) in which multiple acrylic PSA layers are laminated. When the bubble-containing adhesive layer 121 is a PSA layer having a multi-layer structure formed of several acrylic PSA layers, for the individual acrylic PSA layers, the compositions, bubble contents, thicknesses and so on can be the same with or different from one another. The number of acrylic PSA layers in the bubble-containing adhesive layer 121 is not particularly limited and can be, for instance, about 2 to 100 layers. From the standpoint of the productivity of the PSA sheet, etc., it is usually suitably about 2 to 50 layers, for instance, preferably about 2 to 30 layers.

Configurational Example 6

PSA sheet 30 shown in FIG. 6 is a double-faced PSA sheet that comprises a first PSA layer 321 being a bubble-free adhesive layer and constituting the first adhesive face 321A and a second PSA layer 322 being a bubble-containing adhesive layer and constituting the second adhesive face 322A.

A preferable example of PSA sheet 30 having such a configuration is a configuration in which the first PSA layer (bubble-free adhesive layer) 321 is an acrylic PSA layer and the first PSA layer 321 is supported with the surface 322B of the second PSA layer (bubble-containing adhesive layer) 322. The acrylic PSA layer as the first PSA layer 321 is preferably a PSA layer (A) described later. The second PSA layer 322 can be a PSA layer (a) or other PSA layer that is not a PSA layer (A). For instance, it is preferable to use a configuration where the second PSA layer 322 is an acrylic PSA layer other than a PSA layer (A). Although not particularly limited to this, PSA sheet 30 in such a configuration can be preferably used in an embodiment where, for instance, the first adhesive face 321A is applied to a low-polar surface such as an olefinic rubber material surface and the second adhesive face 322A is applied to various types of adherend surface (not limited to a low-polar surface).

Configurational Example 7

PSA sheet 40 shown in FIG. 7 is an adhesively single-faced PSA sheet having a PSA layer 421 constituting its first surface (first adhesive face) 421A and a non-adhesive back-side layer 431 constituting the second surface 431A. The PSA layer 421 is a bubble-free adhesive layer formed of an acrylic PSA layer. The acrylic PSA layer as PSA layer 421 is preferably a PSA layer (A) described later. The backside layer (support layer) 431 supporting the PSA layer 421 is a bubble-containing non-adhesive layer in which at least its PSA layer 421—side surface 431B is non-releasable. As the backside layer 431, a suitable one can be selected among aforementioned various types of foam sheets. For instance, a foam sheet formed of a polyolefinic foam body can be preferably used. While not particularly limited to this, for instance, a foam sheet formed with a polyolefinic foam body can be preferably used. Although not particularly limited to this, PSA sheet (single-faced PSA sheet) 40 thus configured can be preferably used, for instance, in an embodiment where the adhesive face 421A is applied to a surface of a low-polar material such as an olefinic rubber material. The PSA layer 421—side surface 431B of the backside layer 431 may be subjected to a surface treatment to increase the non-releasing properties of the surface, such as corona discharge treatment, primer layer formation, etc. Of the backside layer 431, the surface 431A constituting the second surface of the PSA sheet 40 may be subjected to a suitable treatment, such as a treatment to increase the releasing properties of the surface (formation of a release layer treated with a silicone-based, fluorine-based, long-chain alkyl-based release agent, etc.; polyolefin film lamination, etc.), a treatment to increase the non-releasing properties or printability of the surface (corona discharge treatment, etc.); a treatment to increase the decorativeness of the surface (e.g. printing, metal vapor deposition), and so on.

In the respective PSA sheets exemplified in FIGS. 1 to 7, the layers shown in the respective drawings may have each a single-layer structure or multi-layer structure (i.e. a structure including multiple layers). It may further have another layer (a primer layer, release layer, colored layer such as a printed layer, deposited metal layer, antistatic layer, surface-protective layer) on the surface other than the adhesive face or between the respective layers.

Prior to use (i.e. before applied to an adherend), a PSA sheet disclosed herein may be in an embodiment where its adhesive face is protected with a release liner having a release face at least on the adhesive face side. Alternatively, for instance, PSA sheet 3 shown in FIG. 3 may be in an embodiment where the surface 31A of backside layer 31 is a release face and PSA sheet 3 is wound so that the adhesive face 21A is in contact and protected with the surface 31A.

<Acrylic PSA Layer>

The PSA sheet disclosed herein has an adhesive face constituted with an acrylic PSA layer. There are no particular limitations to the composition or structure of the acrylic PSA layer constituting the adhesive face. The PSA sheet according to a preferable embodiment has a peel strength (20-min peel strength to standard EPDM plate) of 5 N/10 mm or greater when measured by directly applying the adhesive face to an EPDM surface.

Preferable embodiments are described next about the acrylic PSA layer constituting an adhesive face in the PSA sheet disclosed herein. The scope of the present invention is not to be limited by this.

[Amino Group-Containing (Meth)Acrylate (Monomer A)]

The acrylic PSA layer constituting an adhesive face of the PSA sheet disclosed herein typically comprises an acrylic polymer. The concept of polymer referred to herein encompasses a polymer having a relatively low degree of polymerization, which may be generally called an oligomer.

In a preferable acrylic PSA layer disclosed herein, the acrylic polymer comprises an amino group-containing (meth)acrylate (or a "monomer A" hereinafter) as its monomeric component. In other words, an acrylic PSA layer comprising a monomer unit derived from the monomer A is preferable. The monomeric components may comprise one species of such amino group-containing (meth)acrylate or may comprise two or more such species in combination. In this description, an acrylic PSA layer comprising a monomer A-derived monomer unit is sometimes regarded as a "PSA layer (A)."

Herein, the amino group-containing (meth)acrylate refers to a (meth)acrylate having at least one amino group per molecule. From the standpoint of the polymerization reactivity, etc., a preferable amino group-containing (meth)acrylate usually has one amino group per molecule.

The amino group in the amino group-containing (meth)acrylate can be any among a primary amino group (—NH$_2$), secondary amino group (—NHR$^a$), tertiary amino group (—NR$^a$R$^b$) and quaternary ammonium group (—N±R$^a$R$^b$R$^c$). Herein, R$^a$, R$^b$ and R$^c$ are monovalent organic groups that are identical to or different from one another and may be coupled to one another to form a ring structure. For instance, R$^a$, R$^b$ and R$^c$ may have each about 1 to 20 carbon atoms. From the standpoint of the polymerization reactivity, it is usually preferable to use an amino group-containing (meth)acrylate wherein each of R$^a$, R$^b$ and R$^c$ is a hydrocarbon group having about 1 to 20 carbon atoms. In particular, an amino group-containing (meth)acrylate having a tertiary amino group wherein R$^a$ and R$^b$ are each a (cyclo)alkyl group having about 1 to 20 carbon atoms (e.g. an N,N-dialkylaminoalkyl (meth)acrylate) is preferable.

The concept of amino group in the amino group-containing (meth)acrylate does not include a species in which the amino nitrogen constitutes an amide group. Accordingly, amide group-containing (meth)acrylates such as acrylamide and acryloylmorpholine are not included in the amino group-containing (meth)acrylate (monomer A) referred to herein. On the other hand, a (meth)acrylate having at least one amino group that does not constitute an amide group and further has an amide group in addition to the amino group may belong to the amino group-containing (meth)acrylate referred to herein.

In a preferable embodiment of the art disclosed herein, the acrylic polymer may comprise an amino group-containing (meth)acrylate (monomer A) represented by the following formula (1):

$$CH_2=CR^1COO(CH_2)_nNR^2R^3 \quad (1)$$

In the formula (1), R$^1$ can be a hydrogen atom or methyl group and n can be 0 to 6 (typically 0 to 4, preferably 1 to 3). R$^2$ and R$^3$ can be each independently selected from a hydrogen atom and a hydrocarbon group. Preferable examples of the hydrocarbon group include an acyclic alkyl group having 1 to 20 carbon atoms and a cycloalkyl group having 4 to 20 carbon atoms. Examples of a hydrocarbon group preferable from the standpoint of the polymerization reactivity include an acyclic alkyl group having 1 to 16 carbon atoms (e.g. 1 to 12 carbon atoms, typically 1 to 10 carbon atoms) and a cycloalkyl group having 4 to 16 carbon atoms (e.g. 4 to 12 carbon atoms, typically 4 to 10 carbon atoms). The acyclic alkyl group can be linear or branched. In particular, an acyclic alkyl group having 1 to 4 (more preferably 1 to 3, typically 1 to 2) carbon atoms is preferable.

Specific examples of the amino group-containing (meth)acrylate represented by the formula (1) include N,N-dialkylaminoalkyl (meth)acrylates such as N,N-dimethylaminomethyl (meth)acrylate, N,N-dimethylaminoethyl (meth)acrylate, N,N-dimethylaminopropyl (meth)acrylate, N,N-dimethylaminobutyl (meth)acrylate, N,N-dimethylaminohexyl (meth)acrylate, N,N-diethylaminoethyl (meth)acrylate, N,N-dipropylaminoethyl (meth)acrylate, N,N-dibutylaminoethyl (meth)acrylate, N-methyl-N-ethylaminoethyl (meth)acrylate, N-methyl-N-butylaminoethyl (meth)acrylate, and N,N-dipropylaminopropyl (meth)acrylate; N-alkylaminoalkyl (meth)acrylates such as N-methylaminoethyl (meth)acrylate, N-ethylaminoethyl (meth)acrylate, N-isopropylaminoethyl (meth)acrylate, N-t-butylethyl (meth)acrylate and N-butylaminoethyl (meth)acrylate; N-alkylamino(meth)acrylates such as N-methylamino(meth)acrylate and N-ethylamino(meth)acrylate; N,N-dialkylamino(meth)acrylates such as N,N-dimethylamino(meth)acrylate and N,N-diethylamino(meth)

acrylate; aminoethyl (meth)acrylate aminoalkyl (meth) acrylates such as aminomethyl (meth)acrylate; amino(meth) acrylates; and the like.

Examples of the amino group-containing (meth)acrylate having a quaternary ammonium group include a quaternary alkyl halide of an amino group-containing (meth)acrylate having a tertiary amino group, for example, a quaternary alkyl halide of an N,N-dialkylaminoalkyl (meth)acrylate. Specific examples include dimethylaminoethyl acrylate methyl chloride quaternary salt and dimethylaminoethyl methacrylate methyl chloride quaternary salt.

Among these, preferable amino group-containing (meth) acrylates include N,N-dimethylaminoethyl acrylate (or "DMAEA" hereinafter), N,N-dimethylaminoethyl methacrylate (or "DMAEM" hereinafter), N,N-diethylaminoethyl acrylate and N,N-diethylaminoethyl methacrylate. In particular, DMAEA and DMAEM are preferable. DMAEM is especially preferable in view that the peel strength is unlikely to decrease even with time after applied to a low-polar surface (e.g. a surface formed from an olefinic rubber material) or the peel strength may further increase.

[Monomer(s) Other than Amino Group-Containing (Meth) Acrylate (Monomer B)]

In addition to the amino group-containing (meth)acrylate (monomer A), the acrylic PSA layer may comprise, as a monomeric component of the polymer in the acrylic PSA layer, a monomer (or "monomer B" hereinafter) other than the amino group-containing (meth)acrylate. The monomer B can be an acrylic monomer or a non-acrylic monomer (e.g. a monomer having an ethylenic unsaturated group other than a (meth)acryloyl group).

Preferable examples of an acrylic monomer that can be used as the monomer B include a (cyclo)alkyl (meth) acrylate (or "monomer B" hereinafter). For instance, a (cyclo)alkyl (meth)acrylate represented by the following formula (2) is preferable.

$$CH_2=CR^4COOR^5 \quad (2)$$

In the formula (2), $R^4$ is a hydrogen atom or methyl group. $R^5$ is a (cyclo)alkyl group and can be typically a acyclic alkyl group having 1 to 20 carbon atoms or a cycloalkyl group having 4 to 20 carbon atoms. From the standpoint of the PSA's storage modulus, etc., it is preferable to use a (cyclo)alkyl (meth)acrylate wherein $R^5$ is an acyclic alkyl group having 1 to 16 (e.g. 1 to 12, typically 1 to 10) carbon atoms or a cycloalkyl group having 4 to 16 (e.g. 4 to 12, typically 4 to 10) carbon atoms. When $R^5$ is an acyclic alkyl group, the alkyl group can be linear or branched.

Examples of an alkyl (meth)acrylate with $R^5$ being a $C_{1-20}$ acyclic alkyl group include methyl (meth)acrylate, ethyl (meth)acrylate, propyl (meth)acrylate, isopropyl (meth) acrylate, n-butyl (meth)acrylate, isobutyl (meth)acrylate, s-butyl (meth)acrylate, t-butyl (meth)acrylate, pentyl (meth) acrylate, isopentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth) acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, eicosyl (meth)acrylate, etc. Examples of a cycloalkyl (meth)acrylate with $R^5$ being a $C_{4-20}$ cycloalkyl group include cyclopentyl (meth)acrylate, cyclohexyl (meth)acrylate, isobornyl (meth)acrylate, etc. These can be used singly as one species or in a combination of two or more species.

Examples of a particularly preferable (cyclo)alkyl (meth) acrylate include n-butyl acrylate (BA), 2-ethylhexyl acrylate (2EHA), lauryl acrylate, lauryl methacrylate, t-butyl acrylate, cyclohexyl acrylate (CHA), cyclohexyl methacrylate (CHMA), isobornyl acrylate (IBXA), isobornyl methacrylate (IBXMA), etc. These can be used singly as one species or in a combination of two or more species.

The monomeric components of the polymer in the acrylic PSA layer may comprise a monomer (or "monomer B2" hereinafter) other than a (cyclo)alkyl (meth)acrylate. Such a monomer can be used to increase various properties such as cohesion, heat resistance, tightness of adhesion, etc.

Examples of the monomer B2 include a monomer having a functional group (or a "functional group-containing monomer" hereinafter). Such a functional group-containing monomer can be added to introduce crosslinking points in the polymer in the acrylic PSA layer so as to increase the cohesive strength of the acrylic PSA. Examples of such functional group-containing monomers include:

carboxy group-containing monomers including ethylenic unsaturated mono-carboxylic acids such as acrylic acid, methacrylic acid, crotonic acid, carboxyethyl (meth)acrylate, carboxypentyl (meth)acrylate, etc.; and ethylenic unsaturated dicarboxylic acids such as itaconic acid, maleic acid, fumaric acid, citraconic acid, etc., as well as metal salts thereof (e.g. alkali metal salts);

acid anhydride group-containing monomers including acid anhydrides such as maleic acid anhydride, itaconic acid anhydride, etc.;

hydroxy group-containing monomers including hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate (4-hydroxymethylcyclohexyl)methyl (meth)acrylate, etc.; as well as unsaturated alcohols such as N-methylol (meth)acrylamide, vinyl alcohol, allyl alcohol, 2-hydroxyethyl vinyl ether, 4-hydroxybutyl vinyl ether, diethylene glycol monovinyl ether, etc.;

amide group-containing monomers including (meth)acrylamide, N,N-dimethyl(meth)acrylamide, N-butyl(meth) acrylamide, N-methylol(meth)acrylamide, N-methylolpropane(meth)acrylamide, N-methoxymethyl(meth) acrylamide, N-butoxymethyl(meth)acrylamide;

cyano group-containing monomers such as acrylonitrile, methacrylonitrile, etc.;

sulfonic acid group-containing monomers such as styrene sulfonic acid, allyl sulfonic acid, 2-(meth)acrylamido-2-methylpropanesulfonic acid (meth)acrylamidopropanesulfonic acid, sulfopropyl (meth)acrylate (meth)acryloyloxy naphthalene sulfonic acid, etc.;

phosphoric acid group-containing monomers such as 2-hydroxyethyl acryloyl phosphate, etc.;

oxazoline group-containing monomers such as 2-vinyl-2-oxazoline, 2-vinyl-5-methyl-2-oxazoline, 2-isopropenyl-2-oxazoline, etc.;

aziridine group-containing monomers such as (meth)acryloylaziridine and 2-aziridinylethyl (meth)acrylate;

epoxy group (glycidyl group)-containing monomers such as glycidyl (meth)acrylate, methylglycidyl (meth)acrylate, allyl glycidyl ether, etc.;

keto group-containing monomers such as diacetone (meth)acrylamide, diacetone (meth)acrylate, vinyl methyl ketone, allyl acetoacetate, vinyl acetoacetate, etc.;

isocyanate group-containing monomers such as 2-(meth) acryloyloxyethyl isocyanate, etc.;

alkoxy group-containing monomers such as methoxyethyl (meth)acrylate, ethoxyethyl (meth)acrylate, propoxyethyl (meth)acrylate, butoxyethyl (meth)acrylate, ethoxypropyl (meth)acrylate, etc.;

alkoxysilyl group-containing monomers such as 3-(meth) acryloxypropyltrimethoxysilane, 3-(meth)acryloxypropyltriethoxysilane, 3-(meth)acryloxypropylmethyldimethoxysilane, 3-(meth)acryloxypropylmethyldiethoxysilane, etc.; and so on.

Other examples include a macro monomer having a radically-polymerizable vinyl group in a terminal monomer unit of a vinyl polymer, etc. These can be used singly as one species or in combination of two or more species.

To adjust the glass transition temperature (Tg) or to increase the cohesive strength, etc., the monomeric components may include a monomer other than the functional group-containing monomers listed above. Examples of such a monomer B2 include:

carboxylic acid vinyl esters such as vinyl acetate, vinyl propionate, vinyl lactate, vinyl pivalate, vinyl cyclohexane carboxylate, vinyl benzoate, etc.;

aromatic vinyl compounds such as styrene, substituted styrenes (α-methylstyrene, etc.), vinyl toluene, etc.;

aromatic ring-containing (meth)acrylates such as aryl (meth)acrylates (e.g. phenyl (meth)acrylate), aryloxyalkyl (meth)acrylates (e.g. phenoxyethyl (meth)acrylate), arylalkyl (meth)acrylates (e.g. benzyl (meth)acrylate), etc.;

nitrogen atom-containing rings such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholine, N-vinylcaprolactam, N-(meth)acryloyl morpholine, etc.;

olefinic monomers such as ethylene, propylene, isoprene, butadiene, isobutylene, etc.;

chlorine-containing monomers such as vinyl chloride, vinylidene chloride, etc.;

vinyl ether-based monomers such as methyl vinyl ether, ethyl vinyl ether, etc.; and the like.

These can be used singly as one species or in combination of two or more species.

The monomeric components may comprise, as a monomer B2, a polyfunctional monomer for crosslinking and so on, if necessary. Examples of such a polyfunctional monomer include monomers having two or more polymerizable functional groups (typically (meth)acryloyl groups) per molecule, such as 1,6-hexanediol di(meth)acrylate, ethylene glycol di(meth)acrylate, propylene glycol di(meth)acrylate, polyethylene glycol di(meth)acrylate, polypropylene glycol di(meth)acrylate, neopentyl glycol di(meth)acrylate, pentaerythritol di(meth)acrylate, trimethylolpropane tri(meth) acrylate, ethyleneoxide-modified trimethylolpropane tri (meth)acrylate, pentaerythritol tri(meth)acrylate, dipentaerythritol penta(meth)acrylate, dipentaerythritol hexa(meth)acrylate, etc. These can be used singly as one species or in combination of two or more species. From the standpoint of the reactivity, etc., it is usually preferable to use a polyfunctional monomer having two or more (typically three or more) acryloyl groups per molecule.

[Composition of all Monomer Components]

The ratio of acrylic monomer to all monomeric components of the total polymer (or "all monomeric components" hereinafter) in the acrylic PSA layer is typically higher than 50% by mass and can be preferably 70% by mass or higher, more preferably 85% by mass or higher (e.g. 90% by mass or higher). The ratio of mass of acrylic monomer to mass ($m_T$) of all monomeric components can be essentially 100% by mass (e.g. 98% to 100% by mass). The ratio of acrylic polymer to mass of entire acrylic PSA layer is typically 70% by mass or higher and can be preferably 80% by mass or higher (90% by mass or higher).

When the acrylic PSA layer comprises an amino group-containing (meth)acrylate (monomer A) as its monomeric component, the ratio ($m_A/m_T$) of mass ($m_A$) of monomer A to mass ($m_T$) of all monomeric components of the acrylic PSA layer can be, for instance, higher than 0.2% by mass (typically higher than 0.5% by mass). From the standpoint of the adhesion to a low-polar material such as an olefinic rubber material, the monomer A content is preferably higher than 1.0% by mass or more preferably higher than 2.0% by mass.

In a preferable embodiment, the amino group-containing (meth)acrylate (monomer A) can be included at a ratio higher than 2.6% by mass of all monomeric components of the acrylic PSA layer. In other words, the acrylic PSA layer in the art disclosed herein preferably comprises a monomer A-derived monomer unit at a ratio higher than 2.6% by mass of all polymers in the acrylic PSA layer (typically at a ratio higher than 2.6% by mass of the entire acrylic PSA layer). The acrylic PSA layer having such a composition may provide great adhesion to an adherend formed of an olefinic rubber material and other low-polar adherend. From the standpoint of the adhesion, etc., the ratio ($m_A/m_T$) of mass ($m_A$) of monomer A to mass ($m_T$) of all monomeric components is preferably higher than 5% by mass, more preferably 6% by mass or higher, or yet more preferably 7% by mass or higher. The upper limit of $m_A/m_T$ is not particularly limited. From the standpoint of the polymerization reactivity, initial adhesiveness, etc., it is usually suitably 80% by mass or lower, preferably 60% by mass or lower, more preferably 50% by mass or lower, or typically lower than 50% by mass. In an embodiment where an active energy ray-curing (e.g. UV-curing) PSA composition is used to form the acrylic PSA layer, from the standpoint of the curing properties of the PSA composition, $m_A/m_T$ is suitably 30% by mass or lower, or preferably 25% by mass or lower (e.g. 20% by mass or lower).

The curing properties of the PSA composition with active energy rays can be thought as the ease of forming acrylic PSA from the PSA composition and further as the productivity of a PSA sheet having the acrylic PSA. Hereinafter, curing properties with active energy rays are sometimes referred to simply as "curing properties."

The art disclosed herein can be preferably implemented in an embodiment where the acrylic PSA layer comprises a (cyclo)alkyl (meth)acrylate (monomer B1) at a ratio higher than 50% by mass (typically at a ratio of higher than 50% by mass, but lower than 97.4% by mass or lower) of $m_T$. Such an embodiment can combine adhesion to low-polar materials such as olefinic rubber materials and polymerization reactivity at a high level. High polymerization reactivity is advantageous in terms of the ease of acrylic PSA layer formation (and further the productivity of the PSA sheet having the acrylic PSA layer). From the standpoint of the polymerization reactivity, the ratio of mass of monomer B1 to $m_T$ can be, for instance, higher than 50% by mass, but 97% by mass or lower; or it is more preferably lower than 96% by mass, more preferably 95% by mass or lower, or yet more preferably 94% by mass or lower (even 93% by mass lower).

The art disclosed herein can be preferably implemented in an embodiment where the monomeric components of the acrylic PSA layer comprise an acyclic alkyl (meth)acrylate as the monomer B1. With the use of the acyclic alkyl (meth)acrylate, a PSA sheet can be obtained having great initial adhesion to various types of adherend. The ratio of mass of acyclic alkyl (meth)acrylate to $m_T$ can be, for instance, 20% by mass or higher, or it is usually suitably 30% by mass or higher, preferably 40% by mass or higher, or more preferably 50% by mass or higher (typically higher than 50% by mass). From the standpoint of the cohesion, etc., the ratio is usually suitably 95% by mass or lower, or preferably 90% by mass or lower (e.g. 80% by mass or lower).

The art disclosed herein can be preferably implemented in an embodiment where the monomeric components of the acrylic PSA layer comprise a cycloalkyl (meth)acrylate as the monomer B1. With the use of the cycloalkyl (meth)acrylate, adhesion to a low-polar material such as an olefinic rubber material can be combined with cohesion of the PSA at a higher level. When the monomeric components of the acrylic PSA layer comprises a cycloalkyl (meth)acrylate, the ratio ($m_C/m_T$) of mass ($m_C$) of cycloalkyl (meth)acrylate to $m_T$ can be, for instance, 1% by mass or higher. From the standpoint of obtaining greater effects of the use of the cycloalkyl (meth)acrylate, $m_C/m_T$ is suitably 5% by mass or higher, preferably 10% by mass or higher, or more preferably 15% by mass or higher (e.g. 20% by mass or higher, or even 25% by mass or higher). From the standpoint of the polymerization reactivity, etc., $m_C/m_T$ is usually suitably less than 50% by mass, preferably 40% by mass or less, or more preferably 35% by mass or less (e.g. 30% by mass or less).

When the monomeric components of the acrylic PSA layer comprise a cycloalkyl (meth)acrylate, the ratio ($m_A/m_C$) of mass ($m_A$) of monomer A to mass ($m_C$) of cycloalkyl (meth)acrylate is not particularly limited in all monomeric components of the PSA layer. From the standpoint of the adhesion to a low-polar surface such as an olefinic rubber surface, the ratio ($m_A/m_C$) value is effectively 0.20 or higher (typically higher than 0.20), preferably 0.22 or higher, or more preferably 0.24 or higher. From the standpoint of combining adhesion to an olefinic rubber surface and cohesion at a higher level, the ratio ($m_A/m_C$) value is preferably 0.30 or higher and can be, for example, 0.35 or higher. The upper limit of the ratio ($m_A/m_C$) value is not particularly limited. From the standpoint of the polymerization reactivity, etc., it is usually suitably 0.70 or lower, preferably 0.65 or lower, or more preferably 0.50 or lower.

When the entire monomeric components in the acrylic PSA layer comprise both the acyclic alkyl (meth)acrylate and cycloalkyl (meth)acrylate as the monomer B1, the ratio of mass of acyclic alkyl (meth)acrylate to $m_T$ can be, for instance, higher than 50% by mass, but 85% by mass or lower, or preferably 55% by mass or higher, but 85% by mass or lower (e.g. 55% by mass or higher, but 70% by mass or lower). In view of the balance between adhesion and cohesion, polymerization reactivity, etc., the mass ratio (acyclic alkyl (meth)acrylate/cycloalkyl (meth)acrylate) of acrylic alkyl (meth)acrylate to cycloalkyl (meth)acrylate in all monomeric components can be, for instance, 1.5 to 10, preferably 1.7 to 5.5, or more preferably 1.8 to 3.5 (e.g. 2.0 to 3.0).

When the monomeric components of the acrylic PSA layer comprise a monomer B2, its content can be, for instance, 30% by mass or less of $m_T$. From the standpoint of the adhesion to a low-polar material such as an olefinic rubber material, the monomer B2 content is suitably 20% by mass or less of $m_T$, preferably 10% by mass or less, or more preferably 5% by mass or less (e.g. 2% by mass or less).

The art disclosed herein can be preferably implemented in an embodiment where the ratio of mass of carboxy group-containing monomer to $m_T$ is 0 to 1% by mass (more preferably 0 to 0.5% by mass, yet more preferably 0 to 0.1% by mass). Herein, the ratio of mass of carboxy group-containing monomer to $m_T$ being 0 means that no carboxy group-containing monomer is used at least intentionally. An acrylic PSA layer having such a composition contains very little to no carboxy group. Thus, its surface (adhesive face) may be low polar. This may advantageously contribute to increase the adhesion to a low-polar material such as an olefinic rubber material. Better results can be obtained when the combined ratio of mass of carboxy group-containing monomer and mass of hydroxy group-containing monomer to $m_T$ is 0 to 1% by mass (more preferably 0 to 0.5% by mass, even more preferably 0 to 0.1% by mass).

The art disclosed herein can be preferably implemented, for instance, in an embodiment where a polyfunctional monomer is included as the monomer B2 in the entire monomeric components of the acrylic PSA layer. The amount of the polyfunctional monomer used can be, for instance, 2% by mass or less (typically 0.01 to 1% by mass, preferably 0.02 to 1% by mass, or more preferably 0.05 to 0.5% by mass) of $m_T$. In a preferable embodiment, a polyfunctional monomer is included solely as the monomer B2. Another preferable embodiment is essentially free of the monomer B2.

The composition of all monomeric components of the acrylic PSA layer can be formulated so as to yield a glass transition temperature (Tg) of its completely polymerized product of −60° C. or higher, but −10° C. or lower. From the standpoint of the initial adhesion to an adherend (e.g. a low-polar material such as an olefinic rubber material), the Tg determined from the composition of all monomeric components of the acrylic PSA layer (i.e. Tg of the completely polymerized product of all monomeric components) is suitably −15° C. or lower, preferably −20° C. or lower, or more preferably −25° C. or lower. From the standpoint of the cohesion of the PSA, the Tg is suitably −60° C. or higher, preferably −55° C. or higher, or more preferably −50° C. or higher. In a preferable embodiment of the art disclosed herein, the Tg determined from the composition of all monomeric components can be, for instance, −50° C. to −30° C. (typically −45° C. to −30° C.).

Herein, the Tg of a polymer refers to a value determined by the Fox equation based on the Tg values of homopolymers of the respective monomers constituting the polymer and mass fractions (copolymer ratio by mass) of the monomers. Thus, the Tg of the polymer can be adjusted by suitably modifying the monomer composition (i.e. types and relative amounts of monomers used for the synthesis of the acrylic polymer).

As the Tg values of the homopolymers, values given in a known document are used:

| | |
|---|---|
| 2-ethylhexyl acrylate | −70° C. |
| n-butyl acrylate | −55° C. |
| ethyl acrylate | −22° C. |
| methyl acrylate | 8° C. |
| methyl methacrylate | 105° C. |
| cyclohexyl acrylate | 15° C. |
| cyclohexyl methacrylate | 66° C. |
| isobornyl acrylate | 94° C. |
| isobornyl methacrylate | 180° C. |
| N,N-dimethylaminoethyl acrylate | 18° C. |
| N,N-dimethylaminoethyl methacrylate | 18° C. |
| N,N-diethylaminoethyl acrylate | 20° C. |

| | |
|---|---|
| N,N-diethylaminoethyl methacrylate | 20° C. |
| vinyl acetate | 32° C. |
| 2-hydroxyethyl acrylate | −15° C. |
| styrene | 100° C. |
| acrylic acid | 106° C. |
| methacrylic acid | 228° C. |

With respect to the Tg values of homopolymers other than the examples listed above, the values given in "Polymer Handbook" (3rd edition, John Wiley & Sons, Inc., Year 1989) are used.

When no values are given in "Polymer Handbook" (3rd edition, John Wiley & Sons, Inc., Year 1989), values obtained by the following measurement method are used (see Japanese Patent Application Publication No. 2007-51271).

In particular, to a reaction vessel equipped with a thermometer, a stirrer, a nitrogen inlet and a condenser, are added 100 parts by weight of monomer(s), 0.2 part by weight of azobisisobutyronitrile, and 200 parts by weight of ethyl acetate as a polymerization solvent, and the mixture is stirred for one hour under a nitrogen gas flow. After oxygen is removed in this way from the polymerization system, the mixture is heated to 63° C. and the reaction is carried out for 10 hours. Then, it is cooled to room temperature, and a homopolymer solution having 33% by mass solid content is obtained. Subsequently, this homopolymer solution is applied onto a release liner by flow coating and allowed to dry to prepare a test sample (a homopolymer sheet) of about 2 mm thickness. This test sample is cut out into a disc of 7.9 mm diameter and is placed between parallel plates; and while applying a shear strain at a frequency of 1 Hz using a rheometer (ARES, available from Rheometrics Scientific, Inc.), the viscoelasticity is measured in the shear mode over a temperature range of −70° C. to 150° C. at a heating rate of 5° C./min; and the temperature value at the maximum of the tan δ curve is taken as the Tg of the homopolymer.

<PSA Composition>

The acrylic PSA layer in the art disclosed herein may be formed with an acrylic PSA composition that comprises all of its monomeric components having a composition as described above as a polymerized product, non-polymerized product (i.e. in a form where the polymerizable functional group is unreacted) or a mixture of these. The PSA composition can be in various forms such as a solvent-based PSA composition containing the PSA (adhesive component(s)) in an organic solvent, a water-dispersed PSA composition containing the PSA dispersed in an aqueous solvent, an active energy ray-curable PSA composition formulated so as to cure with active energy rays such as UV rays and radioactive rays to form PSA, a hot-melt PSA composition which is applied in a heat-melted state and forms PSA when it cools to near room temperature, and the like.

The acrylic PSA composition according to a preferable embodiment preferably comprises a polymerization product of a monomer mixture. The monomer mixture (i.e. the monomeric components in the polymerization product) comprises at least part of its entire monomeric components. Thus, the polymerization product of the monomer mixture includes at least part of the entire monomeric components in a polymerized form (as a polymer). The acrylic PSA composition comprising at least part of the entire monomeric components as a polymer is advantageous in view of the handling properties (e.g. ease of application, storability) of the composition and the adhesive properties, etc.

The polymerization product of the monomer mixture can be prepared by allowing the monomer mixture to undergo polymerization at least partially. The method for polymerizing the monomer mixture is not particularly limited. Various heretofore known polymerization methods can be suitably employed. For instance, a suitable method can be used among solution polymerization, emulsion polymerization, thermal polymerization (which is typically carried out in the presence of a thermal polymerization initiator) such as bulk polymerization, photopolymerization carried out by irradiating light such as UV light (typically in the presence of a photopolymerization initiator), radiation-induced polymerization carried out by irradiating radioactive rays such as β rays and γ rays, and the like. In particular, the photopolymerization is preferable.

The embodiment of the polymerization is not particularly limited and can be carried out by suitably selecting a heretofore known monomer supply method, polymerization conditions (temperature, pressure, intensity of light irradiation, intensity of radioactive ray irradiation, etc.), other materials (polymerization initiator, surfactant, etc.) besides the monomers, and so on. For example, as the monomer supply method, the entire monomer mixture can be supplied to a reaction vessel at once (all-at-once supply) or gradually dropwise (continuous supply), or it can be divided in some portions and the respective portions can be supplied every certain time interval (portionwise supply). The monomer mixture can be supplied as a solution or dispersion in which it is partially or entirely dissolved in a solvent or emulsified in water.

For the polymerization of the monomer mixture, depending on the method and embodiment of the polymerization, one, two or more species can be suitably selected and used among known or commonly-used polymerization initiators.

[Thermal Polymerization Initiator]

The initiator for thermal polymerization is not particularly limited. For example, an azo-based polymerization initiator, peroxide-based polymerization initiator, a redox-based polymerization initiator by combination of a peroxide and a reducing agent, a substituted ethane-based polymerization initiator, and so on can be used. Thermal polymerization can be preferably carried out at a temperature of, for instance, about 20° C. to 100° C. (typically 40° C. to 80° C.).

Examples of the azo-based initiator include 2,2'-azobisisobutyronitrile (AIBN), 2,2'-azobis(2-methylpropionamidine) disulfate, 2,2'-azobis(2-amidinopropane) dihydrochloride, 2,2'-azobis[2-(5-methyl-2-imidazolin-2-yl)propane] dihydrochloride, 2,2'-azobis(N,N'-dimethyleneisobutylamidine), 2,2'-azobis[N-(2-carboxyethyl)-2-methylpropionamidine] hydrate, 2,2'-azobis(4-methoxy-2,4-dimethylvaleronitrile), 2,2'-azobis(2,4-dimethylvaleronitrile), 2,2'-azobis(2-methylbutyronitrile), 1,1'-azobis(cyclohexane-1-carbonitrile), 2,2'-azobis(2,4,4-trimethylpentane), dimethyl-2,2'-azobis(2-methylpropionate), etc.

Examples of the peroxide-based initiator include persulfates such as potassium persulfate, ammonium persulfate, etc., as well as benzoyl peroxide, t-butyl hydroperoxide, di-t-butyl peroxide, t-butyl peroxide benzoate, dicumyl peroxide, 1,1-bis(t-butylperoxy)-3,3,5-trimethylcyclohexane, 1,1-bis(t-butylperoxy)cyclododecane, hydrogen peroxide, etc.

Examples of the redox-based initiator include a combination of a peroxide and ascorbic acid (combination of hydrogen peroxide water and ascorbic acid, etc.), combination of a peroxide and an iron(II) salt (combination of hydrogen peroxide water and an iron(II) salt, etc.), combination of a persulfate salt and sodium hydrogen sulfite, etc.

Specific examples of the substituted ethane-based initiator include phenyl-substituted ethanes, etc.

[Photopolymerization Initiator]

For photopolymerization, various photopolymerization initiators can be used. The photopolymerization initiator is not particularly limited. For example, a ketal-based photopolymerization initiator, acetophenone-based photopolymerization initiator, benzoin ether-based photopolymerization initiator, acylphosphine oxide-based photopolymerization initiator, α-ketol-based photopolymerization initiator, aromatic sulfonyl chloride-based photopolymerization initiator, photoactive oxime-based photopolymerization initiator, benzoin-based photopolymerization initiator, benzil-based photopolymerization initiator, benzophenone-based photopolymerization initiator, thioxanthone-based photopolymerization initiator or the like can be used.

Specific examples of the ketal-based photopolymerization initiator include 2,2-dimethoxy-1,2-diphenylethane-1-one (e.g. trade name "IRGACURE 651" available from BASF Japan Ltd.), etc.

Specific examples of the acetophenone-based photopolymerization initiator include 1-hydroxycyclohexyl phenyl ketone (e.g. trade name "IRGACURE 184" available from BASF Japan Ltd.), 4-phenoxydichloroacetophenone, 4-t-butyl-dichloroacetophenone, 1-[4-(2-hydroxyethoxy)-phenyl]-2-hydroxy-2-methyl-1-propane-1-one (e.g. trade name "IRGACURE 2959" available from BASF Japan Ltd.), 2-hydroxy-2-methyl-1-phenyl-propane-1-one (e.g. trade name "DAROCUR 1173" available from BASF Japan Ltd.), etc.

Specific examples of the benzoin ether-based photopolymerization initiator include benzoin ethers such as benzoin methyl ether, benzoin ethyl ether, benzoin propyl ether, benzoin isopropyl ether, benzoin isobutyl ether, etc., as well as substituted benzoin ethers such as anisole methyl ether, etc.

Specific examples of the acylphosphine oxide-based photopolymerization initiator include bis(2,4,6-trimethylbenzoyl)phenylphosphine oxide (e.g. trade name "IRGACURE 819" available from BASF Japan Ltd.), bis(2,4,6-trimethylbenzoyl)-2,4-di-n-butoxyphenylphosphine oxide, 2,4,6-trimethylbenzoyldiphenylphosphine oxide (e.g. trade name "LUCIRIN TPO" available from BASF Japan Ltd.), bis(2,6-dimethoxybenzoyl)-2,4,4-trimethylpentylphosphine oxide, etc.

Specific examples of the α-ketol-based photopolymerization initiator include 2-methyl-2-hydroxypropiophenone, 1-[4-(2-hydroxyethyl)phenyl]-2-methylpropane-1-one, etc. Specific examples of aromatic sulfonyl chloride-based photopolymerization initiators include 2-naphthalenesulfonyl chloride, etc. Specific examples of the photoactive oxime-based photopolymerization initiator include 1-phenyl-1,1-propanedione-2-(o-ethoxycarbonyl)-oxime, etc. Specific examples of the benzoin-based photopolymerization initiator include benzoin, etc. Specific examples of the benzil-based photopolymerization initiator include benzil, etc.

Specific examples of the benzophenone-based photopolymerization initiator include benzophenone, benzoylbenzoic acid, 3,3'-dimethyl-4-methoxybenzophenone, polyvinylbenzophenone, α-hydroxycyclohexylphenylketone, etc.

Specific examples of the thioxanthone-based photopolymerization initiator include thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, isopropylthioxanthone, 2,4-diisopropylthioxanthone, dodecylthioxanthone, etc.

Such thermal polymerization initiator or photopolymerization initiator can be used in a typical amount in accordance with the polymerization method or embodiment, etc., without particular limitations. For example, to 100 parts by mass of the monomer mixture, the initiator can be 0.001 to 5 parts by mass (typically, 0.01 to 2 parts by mass, e.g. 0.01 to 1 part by mass).

<Polymerization Product (a)>

In a preferable embodiment of the art disclosed herein, the PSA composition may comprise a polymerization product (a) of the monomer mixture comprising an acyclic alkyl (meth)acrylate. The ratio of acyclic alkyl (meth)acrylate in the monomer mixture can be, for instance, 20% by mass or higher, usually suitably 40% by mass or higher, or preferably 50% by mass or higher. From the standpoint of the polymerization reactivity, etc., the ratio of acyclic alkyl (meth)acrylate in the monomer mixture is preferably higher than 50% by mass, more preferably 55% by mass or higher, or even more preferably 60% by mass or higher (e.g. higher than 60% by mass). From the standpoint of the adhesion to a low-polar material such as an olefinic rubber material and the cohesion, etc., the ratio is usually suitably 98% by mass or lower, preferably 95% by mass or lower, or more preferably 90% by mass or lower (e.g. 85% by mass or lower, typically 80% by mass or lower).

The monomer mixture typically has a composition corresponding to the monomeric components of the polymerization product (a). The monomer mixture may comprise at least some of the amino group-containing (meth)acrylate (monomer A) that is included in the entire monomeric components of the PSA layer. The monomer A included in the entire monomeric components can be included entirely in the monomer mixture. Alternatively, the monomer mixture may be free of the monomer A and the monomer A may be included in a portion other than the monomer mixture (e.g. in the monomeric components of an acrylic oligomer (b) described later) among the entire monomeric components.

When the monomer mixture comprises a monomer A, the monomer A content in the monomer mixture can be, for instance, greater than 0.2% by mass. From the standpoint of obtaining greater effects of the monomer A, its content is suitably 0.5% by mass or greater, preferably 0.7% by mass or greater, or more preferably 1.0% by mass or greater (e.g. 1.2% by mass or greater). From the standpoint of increasing adhesion to a low-polar material such as an olefinic rubber material, the monomer A content can be 1.5% by mass or greater (typically greater than 1.5% by mass), 2.0% by mass or greater, or even 3.0% by mass or greater. The upper limit of the monomer A content in the monomer mixture is not particularly limited. From the standpoint of the polymerization reactivity and initial adhesion, etc., for instance, it can be 20% by mass or less, and it is usually suitably 17% by mass or less, preferably 15% by mass or less, or more preferably 12% by mass or less (e.g. 10% by mass or less).

The polymerization product (a) can be a resultant obtained by polymerizing the monomer mixture at least partially. In other words, the polymerization product (a) can be a partially-polymerized product or a completely-polymerized product of the monomer mixture. The conversion (monomer conversion) of the polymerization product (a) is not particularly limited. Thus, the polymerization product (a) may include unreacted (non-polymerized) monomers or may be essentially free of these. Herein, to be essentially free of unreacted monomers means that the unreacted monomer content is less than 1% by mass (typically less than 0.1% by mass) of the polymerization product (a). The polymerization product (a) may comprise other materials (e.g. polymerization initiator, solvent, dispersion medium, etc.) besides the monomers used in the polymerization to obtain the product.

[Embodiment in which Polymerization Product (a) is Partially-Polymerized Product]

In a preferable embodiment, the polymerization product (a) can be a partially-polymerized product resulting from partial polymerization of the monomer mixture. The term "partially-polymerized product" herein refers to a polymerization product in which its monomeric components are partially polymerized. Such a partially-polymerized product is typically in a syrup-like state (in a viscous liquid state) where the polymer formed from part of the monomer mixture is present along with unreacted monomers. Hereinafter, a partially-polymerized product in such a state may be referred to as "polymer syrup" or simply "syrup." The polymerization method used in partially polymerizing the monomer mixture is not particularly limited. A suitable method can be selected and used among various polymerization methods as those described earlier. For instance, a photopolymerization method can be preferably used.

The monomer conversion of the monomer mixture in such a partially-polymerized product (typically polymer syrup) is not particularly limited. For instance, the conversion (monomer conversion) can be 70% by mass or lower, or it is preferably 60% by mass or lower. From the standpoint of the ease of preparation and application of the PSA composition comprising the partially-polymerized product, the monomer conversion is usually suitably 50% by mass or lower, or preferably 40% by mass or lower (e.g. 35% by mass or lower). The lower limit of the monomer conversion is not particularly limited, it is typically 1% by mass or higher. For instance, it can be 2% by mass or higher. From the standpoint of the adhesive properties, etc., the monomer conversion is usually suitably 5% by mass or higher, preferably 10% by mass or higher, more preferably 15% by mass or higher, yet more preferably 20% by mass or higher, or particularly preferably 25% by mass or higher.

Herein, the monomer conversion of a polymerization product is determined by the next method.

(Measurement of Monomer Conversion)

From a polymerization product, a sample of approximately 0.5 g is collected and precisely weighed (mass $Wp_1$). Subsequently, the sample is heated at 130° C. for two hours to evaporate off unreacted monomers. The sample remaining after the heating is precisely weighed (mass $Wp_2$). The monomer conversion is determined by substituting the respective values into the next equation:

Monomer conversion (%)=$(Wp_2/Wp_1)\times 100$

When partially polymerizing the monomer mixture, the polymerization method is not particularly limited. A suitable method can be selected and used among various polymerization methods as those described earlier. From the standpoint of the efficiency and convenience, as the method for partially polymerizing the monomer mixture, a photopolymerization method can be preferably used. According to a photopolymerization, depending on the polymerization conditions such as irradiation dose (light quantity), etc., the monomer conversion of the monomer mixture can be easily controlled.

With respect to the PSA composition comprising, as the polymerization product (a), a partially-polymerized product of the monomer mixture, it can be formulated so as to form PSA when unreacted monomers (possibly including a monomer other than the monomers from the monomer mixture) in the composition are polymerized by a suitable means to cure. The method for polymerizing the PSA composition to allow its curing is not particularly limited. For instance, it can be the same with or different from the polymerization method used in the partial polymerization of the monomer mixture. The PSA composition in such an embodiment may be in a form where it comprises the polymer formed from part of the monomer mixture in unreacted monomers (typically in a form where the polymer is dissolved in the unreacted monomers). Thus, it may be viscous enough to allow application at ordinary temperature without dilution with a solvent or dispersion medium. Accordingly, it is preferable as a PSA composition essentially free of a solvent (i.e. a solvent-free PSA composition). Such a solvent-free PSA composition can form a PSA layer when a suitable curing means (polymerization means) is applied, such as light irradiation, radioactive ray irradiation, etc. Being essentially free of organic solvents, the solvent-free PSA composition is preferable from the standpoint of the environmental hygiene. In addition, it is also advantageous in view that it does not require drying equipment for the PSA composition or organic solvent collecting equipment, or that these equipment can be minimized or simplified.

That a PSA composition is essentially free of organic solvents means that the PSA-forming content of the PSA composition is 95% by mass or higher (typically 98% by mass or higher, or preferably 99% by mass or higher). In other words, it means that the solvent content of the PSA composition is 5% by mass or lower (typically 2% by mass or lower, preferably 1% by mass or lower).

The PSA composition (typically a solvent-free PSA composition) comprising the partially-polymerized product as its polymerization product (a) can be easily prepared, for instance, by mixing a polymerization product (a) obtained by partially polymerizing the monomer mixture by a suitable polymerization method with other components (e.g. photopolymerization initiator, crosslinking agent, acrylic oligomer (b) described later, unreacted monomers, etc.) used as necessary.

As the curing method (polymerization method) used in forming PSA from the PSA composition comprising a partially-polymerized product as its polymerization product (a), a photopolymerization method can be preferably used. With respect to a PSA composition comprising a polymerization product (a) prepared by a photopolymerization method, it is particularly preferable to employ photopolymerization as the curing method. A polymerization product (a) obtained by photopolymerization already contains a photopolymerization initiator. When the PSA composition comprising the polymerization product (a) is cured to form PSA, the photo-curing can be carried out without any additional photopolymerization initiator. Alternatively, the PSA composition may be obtained by adding a photopolymerization initiator as necessary to the polymerization product (a) prepared by photopolymerization. The additional photopolymerization initiator may be the same as or different from the photopolymerization initiator used in preparing the polymerization product (a). If the PSA composition is prepared by a method other than photopolymerization, a photopolymerization initiator can be added to make it light-curable. The light-curable PSA composition is advantageous as it can readily form a thick PSA layer.

The amount of photopolymerization initiator used is not particularly limited. For instance, an aforementioned general amount of use of photopolymerization initiator can be suitably applied. The amount of photopolymerization initiator used herein refers to the combined amount of the photopolymerization initiator used in the partial polymerization to obtain the polymerization product (a) and any photopolymerization initiator added afterwards.

When the polymerization product (a) is a partially-polymerized product, the partially-polymerized product may have a weight average molecular weight (Mw) of, for instance, about $3 \times 10^4$ to $500 \times 10^4$. From the standpoint of the adhesive properties of the PSA composition comprising the partially-polymerized product, the Mw of the partially-polymerized product is preferably $5 \times 10^4$ or higher, or more preferably $10 \times 10^4$ or higher (e.g. $20 \times 10^4$ or higher). In a preferable embodiment of the art disclosed herein, the Mw of the partially-polymerized product can be $30 \times 10^4$ or higher (more preferably $40 \times 10^4$ or higher, even more preferably $50 \times 10^4$ or higher, e.g. $60 \times 10^4$ or higher). According to such an embodiment, greater adhesive properties can be obtained. From the standpoint of the ease of preparation and application of the PSA composition, etc., the Mw of the partially-polymerized product is usually preferably $200 \times 10^4$ or lower, or more preferably $150 \times 10^4$ or lower.

Herein, the Mw of the partially-polymerized product can be measured by gas permeation chromatography (GPC). More specifically, for instance, using trade name "HLC-8120GPC" (available from Tosoh Corporation) as the GPC measurement system, a sample of the partially-polymerized product can be subjected to a measurement under the conditions below and it can be determined as the value based on standard polystyrene (GPC Measurement Conditions)

Sample concentration: about 2.0 g/L (tetrahydrofuran solution)
Sample injection volume: 20 μL
Columns: trade name "TSK gel, super AWM-H+super AW4000+super AW2500" (available from Tosoh Corporation)
Column size: each 6.0 mm I.D.×150 mm
Eluent: tetrahydrofuran (THF)
Flow rate: 0.4 mL/min
Detector: differential refractometer (RI)
Column temperature (measurement temperature): 40° C.

Unreacted monomers possibly in the partially-polymerized product have essentially no influence on the Mw value determined from the GPC measurement. Thus, the Mw value obtained by the GPC measurement with the sample of the partially-polymerized product can be thought as the Mw of the polymer in the partially-polymerized product.

The composition of the monomeric components of the polymerization product (a) (i.e. the composition of the monomer mixture) can be selected so that when the product of complete polymerization of the monomeric components will have a Tg of −70° C. or higher, but −20° C. or lower. From the standpoint of the initial adhesion to adherend (e.g. an adherend formed of a low-polar material such as an olefinic rubber material), the Tg is preferably −30° C. or lower, or more preferably −35° C. or lower (e.g. −40° C. or lower). From the standpoint of the cohesion of the PSA, the Tg is preferably −65° C. or higher (e.g. −60° C. or higher). In a preferable embodiment of the art disclosed herein, the Tg based on the composition of the monomeric components of the polymerization product (a) can be, for instance, −60° C. to −35° C. (typically −60° C. to −40° C.).

The PSA composition comprising the partially-polymerized product of the monomer mixture as the polymerization product (a) may comprise a curing agent such as a crosslinking agent as necessary in addition to the polymerization product (a) and the initiator (which can be an initiator used for partial polymerization of the monomer mixture or an initiator added afterwards, or both of these) used as necessary. For the curing agent, solely one species or a combination of two or more species can be used.

(Polymerization Product (a) Comprising Polyfunctional Monomer)

Preferable examples of the curing agent include the polyfunctional monomers exemplified as the monomer B2. These polyfunctional monomers can be thought as crosslinking agents as well. For the polyfunctional monomer, solely one species or a combination of two or more species can be used. From the standpoint of the reactivity, etc., an acrylate-based polyfunctional monomer (i.e. a polyfunctional monomer having one, two or more acryloyl groups per molecule) is usually more preferable.

As the monomer mixture to obtain the polymerization product (a), a monomer mixture having a composition essentially free of a polyfunctional monomer (i.e. a monomer mixture formed of a monomer having one polymerizable functional group per molecule) can be preferably used. Herein, that a monomer mixture is essentially free of a polyfunctional monomer means that the polyfunctional monomer content in the monomer mixture is 0.05% by mass or lower (typically 0.01% by mass or lower). According to a monomer mixture having such a composition, the solubility of the polymer in the polymerization product (a) to unreacted monomers can be increased. It is also preferable because the viscosity of the polymerization product (a) (polymer syrup) can be for its monomer conversion. The PSA composition according to a preferable embodiment may comprise, for instance, the polymerization product (a) being a partially-polymerized product of a monomer mixture essentially free of a polyfunctional monomer and a polyfunctional monomer added (afterwards) to the polymerization product (a).

Other preferable examples of the curing agent include crosslinking agents. As the crosslinking agent, a crosslinking agent commonly known or used in the acrylic PSA field can be used. Examples include epoxy-based crosslinking agents, isocyanate-based crosslinking agents, silicone-based crosslinking agents, oxazoline-based crosslinking agents, aziridine-based crosslinking agents, silane-based crosslinking agents, alkyletherified melamine-based crosslinking agent, metal chelate-based crosslinking agent, and the like. Alternatively, the PSA composition may be essentially free of such a crosslinking agent.

The PSA composition comprising the partially-polymerized product of the monomer mixture as the polymerization product (a) may comprise, as necessary, a polymerization product (or the second polymerization product, hereinafter) prepared separately from the polymerization product (a). The second polymerization product may be a partially-polymerized product or completely-polymerized product formed from monomeric components corresponding to a portion of all monomeric components of the acrylic PSA layer, with the portion being different from the monomeric components of the polymerization product (a). The PSA composition disclosed herein may comprise, as the second polymerization product, for instance, a polymer having a lower Mw than the polymer in the polymerization product (a) (preferably a polymer having a composition whose monomeric components comprise an acrylic monomer at a ratio higher than 50% by mass). The PSA composition having such a composition may cure with irradiation of active energy rays (typically UV rays), etc., to form a PSA that provides excellent adhesion to a low-polar surface such as an olefinic rubber material surface.

In the PSA, the second polymerization product may serve as a tackifier to improve at least either its adhesion to adherend (e.g. an adherend formed of a low-polar material such as an olefinic rubber material) or the cohesion of the PSA. When the PSA composition is cured by active energy ray irradiation (e.g. UV ray irradiation), the second polymerization product is preferably less likely to cause inhibition of curing (e.g. inhibition of polymerization of unreacted monomers in the PSA composition) as compared to tackifier resins (typically rosin-based and terpene-based tackifiers, etc.) for use in general acrylic PSA. Thus, when the PSA composition disclosed herein is formulated as an active energy ray-curable PSA composition, the amount of a general tackifier resin based on such as rosin or terpene in the PSA composition is preferably 0 to 10% by mass (more preferably 0 to 5% by mass, or even more preferably 0 to 2% by mass). Herein, a content of 0% by mass means that no tackifier resins are contained.

(Acrylic Oligomer (b))

The PSA composition according to a preferable embodiment may comprise, as the second polymerization product, an acrylic oligomer (b) having a Mw of $2 \times 10^4$ or lower (typically $0.1 \times 10^4$ to $2 \times 10^4$). The acrylic oligomer (b) is a polymer comprising an acrylic monomer (i.e. a monomer having at least one (meth)acryloyl group per molecule) as its monomeric component. Accordingly, the acrylic oligomer (b) may comprise a monomer having at least one methacryloyl group per molecule as part or the entirety of its monomeric components. The acrylic monomer content in the monomeric components of the acrylic oligomer (b) is typically greater than 50% by mass, preferably 60% by mass or greater, more preferably 70% by mass or greater. In a preferable embodiment, the acrylic monomer content can be 80% by mass or greater, or even 90% by mass or greater. The acrylic oligomer (b) may have a composition essentially consisting of an acrylic monomer.

The composition of the monomeric components (i.e. the polymer composition) of the acrylic oligomer (b) can be selected so that the Tg of the acrylic oligomer (b) is, but not limited to, 10° C. or higher, but 150° C. or lower. Herein, the Tg of the acrylic oligomer (b) refers to the value determined based on the composition of the monomeric components of the acrylic oligomer (b) in the same manner as the Tg based on the composition of all monomeric components. From the standpoint of the initial adhesion to an adherend surface (e.g. a surface formed of a low-polar material such as an olefinic rubber material), the Tg of the acrylic oligomer (b) is preferably 120° C. or lower, or more preferably 100° C. or lower. From the standpoint of the cohesion of the PSA, the Tg of the acrylic oligomer (b) is preferably 15° C. or higher, or more preferably 20° C. or higher (more preferably 25° C. or higher). In a preferable embodiment of the art disclosed herein, the Tg of the acrylic oligomer (b) can be, for instance, 35° C. to 80° C.

The acrylic oligomer (b) can be prepared typically by polymerizing its monomeric components. The method or embodiment of the polymerization is not particularly limited. Various heretofore known polymerization methods (e.g. solution polymerization, emulsion polymerization, bulk polymerization, photopolymerization, radiation-induced polymerization, etc.) can be employed in suitable embodiments. The type and amount of initiator possibly used as necessary are generally as described above, and thus not repeated here.

From the standpoint of the adhesion to a low-polar surface such as an olefinic rubber material surface, the Mw of the acrylic oligomer (b) is preferably $1.5 \times 10^4$ or lower, more preferably $1 \times 10^4$ or lower, or yet more preferably $0.8 \times 10^4$ or lower (e.g. $0.6 \times 10^4$ or lower). From the standpoint of the cohesion of the PSA, etc., the Mw of the acrylic oligomer (b) is preferably 800 or higher, or more preferably $0.1 \times 10^4$ or higher (e.g. $0.2 \times 10^4$ or higher). The Mw of the acrylic oligomer (b) can be measured by GPC, similarly to the Mw of the polymer in the polymerization product (a).

To adjust the molecular weight of the acrylic oligomer (b), a chain transfer agent can be used in the polymerization. Examples of the usable chain transfer agent include a compound having a mercapto group, thioglycolic acid and its derivatives, etc. Specific examples of the mercapto group-containing compound include octylmercaptan, n-dodecyl mercaptan, t-dodecyl mercaptan, etc. Specific examples of the thioglycolic acid and its derivatives include, besides thioglycolic acid, ethyl thioglycolate, propyl thioglycolate, butyl thioglycolate, t-butyl thioglycolate, 2-ethylhexyl thioglycolate, octyl thioglycolate, decyl thioglycolate, and dodecyl thioglycolate as well as thioglycolic acid esters such as thioglycolic acid ester of ethylene glycol, thioglycolic acid ester of neopentyl glycol, thioglycolic acid ester of pentaerythritol, etc. Particularly preferable examples of the chain transfer agent include thioglycolic acid and n-dodecyl mercaptan.

The amount of the chain transfer agent used is not particularly limited. It can be suitably adjusted in accordance with the Mw of the target acrylic oligomer (b), etc. Usually, the chain transfer agent is preferably used in an amount of about 0.1 to 20 parts by mass (preferably 0.2 to 15 parts by mass, more preferably 0.3 to 10 parts by mass) relative to 100 parts by mass of the monomeric components of the acrylic oligomer (b).

In the PSA composition comprising the polymerization product (a) and acrylic oligomer (b), the acrylic oligomer (b) content can be, for instance, 1 part by mass or greater to 100 parts by mass of the polymerization product (a), and it is usually suitably 3 parts by mass or greater. From the standpoint of obtaining greater effects of the acrylic oligomer (b), the acrylic oligomer (b) content to 100 parts by mass of the polymerization product (a) is preferably 5 parts by mass or greater, or more preferably 10 parts by mass or greater (e.g. 15 parts by mass or greater). From the standpoint of the curing properties of the PSA composition, the acrylic oligomer (b) content to 100 parts by mass of the polymerization product (a) is suitably 150 parts by mass or less, or preferably 100 parts by mass or less (e.g. 70 parts by mass or less). From the standpoint of the adhesion to a low-polar surface such as an olefinic rubber material surface, etc., the acrylic oligomer (b) content is more preferably 50 parts by mass or less, or yet more preferably 40 parts by mass or less (e.g. 30 parts by mass or less).

(Monomer A Content)

The art disclosed herein can be preferably implemented in an embodiment where the PSA composition comprises the polymerization product (a) and acrylic oligomer (b), with one or each of these comprising an amino group-containing (meth)acrylate (monomer A) in its monomeric components.

In such a PSA composition comprising the polymerization product (a) and acrylic oligomer (b), when the polymerization product (a) comprises a monomer A as its monomeric component, the monomer A content can be, for instance, 0.1% by mass or higher (typically 0.2% by mass or higher). From the standpoint of obtaining greater effects of the monomer A, the monomer A content is suitably higher than 0.2% by mass, preferably 0.5% by mass or higher, more preferably 0.7% by mass or higher, or yet more preferably 1.0% by mass or higher (e.g. 1.2% by mass or higher). From the standpoint of further increasing the adhesion to a low-polar material such as an olefinic rubber material, the monomer A content can be 1.5% by mass or higher (typically higher than 1.5% by mass), 2.0% by mass or higher, or even 3.0% by mass or higher. From the standpoint of the polymerization reactivity and initial adhesion, etc., the monomer A content in the monomeric components of the polymerization product (a) is usually suitably 25% by mass or lower, or it can be typically 20% by mass or lower, preferably 15% by mass or lower, more preferably 12% by mass or lower (e.g. 10% by mass or lower).

When the acrylic oligomer (b) comprises a monomer A in its monomeric components, the monomer A content is suitably 0.5% by mass or higher of the monomeric components, or preferably 1% by mass or higher (e.g. 2% by mass or higher, typically 3% by mass or higher). From the standpoint of further increasing the adhesion to a surface of a low-polar material such as an olefinic rubber material, it is preferably 10% by mass or higher, more preferably 15% by mass or higher, or yet more preferably 20% by mass or higher (e.g. 25% by mass or higher). The upper limit of the monomer A content in the monomeric components of the acrylic oligomer (b) is not particularly limited. For instance, the acrylic oligomer (b) can be a homopolymer of the monomer A. From the standpoint of the polymerization reactivity and initial adhesion, etc., the monomer A content in the monomeric components of the acrylic oligomer (b) is suitably 90% by mass or lower and can be typically 80% by mass or lower, preferably 70% by mass or lower, or more preferably 65% by mass or lower (e.g. 60% by mass or lower).

In the PSA composition according to a preferable embodiment, each of the polymerization product (a) and acrylic oligomer (b) comprises a monomer A in its monomeric components. In the PSA composition in such an embodiment, there are no particular limitations to the ratio ($A_O/A_S$) of mass $A_O$ of monomer A included as a monomeric component of the acrylic oligomer (b) to mass $A_S$ of monomer A included as a monomeric component of the polymerization product (a). For instance, it can be about 0.1 to 25 (typically 0.2 to 20). From the standpoint of the adhesion to a low-polar surface such as an olefinic rubber material surface, etc., the ratio ($A_O/A_S$) is suitably 0.5 or higher, preferably 0.7 or higher, more preferably 1.0 or higher, or even more preferably 1.2 or higher (e.g. 1.5 or higher). The ratio ($A_O/A_S$) is usually suitably 15 or lower. It can be, for instance, 10 or lower (typically 7 or lower).

(Composition of Polymerization Product (a))

The art disclosed herein can be preferably implemented in an embodiment where the monomeric components of the polymerization product (a) comprises an acyclic alkyl (meth)acrylate as the monomer B1. Its content can be 30% by mass or more of the monomeric components of the polymerization product (a), and it is usually suitably 40% by mass or greater, preferably 50% by mass or greater, or more preferably 60% by mass or greater (typically greater than 60% by mass). When the monomer A is included in the monomeric components of the polymerization product (a), the ratio of acyclic alkyl (meth)acrylate to monomeric components excluding the monomer A can be preferably 50% by mass or greater, more preferably 60% by mass or greater (e.g. 70% by mass or greater). All other component(s) besides the monomer A can be acyclic alkyl (meth)acrylate(s). That is, the monomeric components of the polymerization product (a) may have a composition consisting of an acyclic alkyl (meth)acrylate and a monomer A.

The art disclosed herein can be preferably implemented in an embodiment where the monomeric components of the polymerization product (a) comprises, as the monomer B1, a cycloalkyl (meth)acrylate. Such an embodiment may combine high levels of adhesion to a surface of a low-polar material such as an olefinic rubber material and cohesion of the PSA. The cycloalkyl (meth)acrylate content in the monomeric components of the polymerization product (a) can be, for instance, 1% by mass or greater, or it is usually suitably 3% by mass or greater, preferably 5% by mass or greater, or more preferably 10% by mass or greater (e.g. 15% by mass or greater). From the standpoint of the polymerization reactivity, its content is usually suitably less than 50% by mass, or can be preferably 40% by mass or less, more preferably 35% by mass or less (e.g. 30% by mass or less, typically 25% by mass or less).

In a preferable embodiment, the monomeric components of the polymerization product (a) comprises an acyclic alkyl (meth)acrylate and a cycloalkyl (meth)acrylate. The mass ratio of acyclic alkyl (meth)acrylate to cycloalkyl (meth)acrylate (acyclic alkyl (meth)acrylate/cycloalkyl (meth)acrylate) can be, for instance, 1 to 20, or usually preferably 2 to 10, or more preferably 3 to 5.

When the monomeric components of the polymerization product (a) comprises a monomer A, the ratio of total amount of acyclic alkyl (meth)acrylate and cycloalkyl (meth)acrylate to monomeric components excluding the monomer A is preferably 80% by mass or higher, more preferably 85% by mass or higher, or yet more preferably 90% by mass or higher (e.g. 95% by mass or higher). The art disclosed herein can be preferably implemented in an embodiment where the monomeric components of the polymerization product (a) consist of an acyclic alkyl (meth)acrylate, a cycloalkyl (meth)acrylate and a monomer A.

Specific preferable examples of the monomeric components of the polymerization product (a) include a composition comprising 2EHA, CHA and DMAEM; a composition comprising 2EHA, BA, CHA and DMAEM; a composition comprising BA, CHA and DMAEM; a composition comprising 2EHA, CHA and DMAEA; a composition comprising 2EHA, BA, CHA and DMAEA; a composition comprising BA, CHA and DMAEA; a composition comprising 2EHA, CHMA and DMAEM; a composition comprising 2EHA, BA, CHMA and DMAEM; a composition comprising BA, CHMA and DMAEM; a composition comprising 2EHA, CHMA and DMAEA; a composition comprising 2EHA, BA, CHMA and DMAEA; a composition comprising BA, CHMA and DMAEA; and the like. In particular, a composition comprising at least CHA is preferable.

(Composition of Acrylic Oligomer (b))

The art disclosed herein can be preferably implemented in an embodiment where the acrylic oligomer (b) comprises a cycloalkyl (meth)acrylate as the monomer B1. From the standpoint of the adhesion to a surface of a low-polar material such as an olefinic rubber material and cohesion of the PSA, its content can be, for instance, 5% by mass or more of the monomeric components of the acrylic oligomer (b), or is usually suitably 10% by mass or more, preferably 20% by mass or more, or more preferably 30% by mass or more (e.g. 40% by mass or more).

When a monomer A is included in the monomeric components of the acrylic oligomer (b), the ratio of cycloalkyl (meth)acrylate to monomeric components excluding the monomer A is suitably 70% by mass or higher, or can be preferably 80% by mass or higher, or more preferably 90% by mass or higher (e.g. 95% by mass or higher, typically 97% by mass or higher). The art disclosed herein can be preferably implemented in an embodiment where the monomeric components of the acrylic oligomer (b) consist of a cycloalkyl (meth)acrylate and a monomer A.

As the cyclohexyl (meth)acrylate, species such as CHA, CHMA, IBXA and IBXMA described earlier can be used. These can be used singly as one species or in a combination of two or more species.

Specific preferable examples of the acrylic oligomer (b) include a copolymer of CHMA and DMAEM, copolymer of CHMA, IBXMA and DMAEM; copolymer of CHMA, IBXA and DMAEM; copolymer of CHA and DMAEM; copolymer of CHA, IBXMA and DMAEM; copolymer of CHA, IBXA and DMAEM; copolymer of CHMA and DMAEA; copolymer of CHMA, IBXMA and DMAEA; copolymer of CHMA, IBXA and DMAEA; copolymer of CHA and DMAEA; copolymer of CHA, IBXMA, DMAEA; copolymer of CHA, IBXA and DMAEA, etc. In particular, a copolymer comprising at least CHMA is preferable.

(Conditions of UV Irradiation)

In a preferable embodiment, the photopolymerization for forming a PSA from the PSA composition can be carried out by irradiation of UV rays. As the UV lamp used for the UV irradiation, a lamp having its spectral distribution in a wavelength range of 300 nm to 400 nm can be preferably used. For instance, a chemical lamp, a chemical lamp, black light (e.g. a black light available from Toshiba Lighting and Technology Corporation), metal halide lamp and the like can be used as the light source. In particular, it is preferable to irradiate UV rays so that the intensity at 300 nm to 400 nm is 1 mW/cm$^2$ to 50 mW/cm$^2$. The intensity of UV rays being 50 mW/cm$^2$ or lower (typically 40 mW/cm$^2$ or lower, for instance, 30 mW/cm$^2$ or lower) is advantageous from the standpoint of obtaining greater adhesive properties. The intensity of UV rays being 1 mW/cm$^2$ or higher (more preferably 2 mW/cm$^2$ or higher, for instance, 3 mW/cm$^2$ or higher) is advantageous from the standpoint of the productivity. The intensity of UV rays can be measured, using an industrial UV checker (available from Topcon Corporation, trade name "UVR-T1" with light detector model number "UD-T36") with peak sensitivity at 350 nm in wavelength.

[Embodiment where Polymerization Product (a) is Completely-Polymerized Product]

The art disclosed herein can be preferably practiced also in an embodiment where the polymerization product (a) is a completely-polymerized product at a monomer conversion of greater than 95% by mass (typically greater than 99% by mass). The PSA composition comprising such a polymerization product (a) is preferably essentially free of unreacted monomers. For instance, the unreacted monomer content is preferably less than 1% by mass, or more preferably less than 0.5% by mass. When the polymerization product (a) is a completely-polymerized product, its Mw can be preferably 20×10$^4$ or higher, more preferably 30×10$^4$ or higher, for instance, 40×10$^4$ or higher. The upper Mw limit of the polymerization product (a) is not particularly limited. From the standpoint of the ease of preparation and application of the PSA composition, etc., the Mw of the polymerization product (a) is usually preferably 200×10$^4$ or lower, or more preferably 150×10$^4$ or lower.

For example, such an embodiment can be preferably applied to a PSA composition whose adhesive components are diluted (dissolved or dispersed) to suitable viscosity with a solvent, such as in, for instance, a solvent-based PSA composition, water-dispersed PSA composition (typically an emulsion-type PSA composition), etc. The PSA composition in such an embodiment can form a high performance PSA upon a simple curing treatment such as drying the PSA composition because it includes the completely-polymerized product having a relatively high molecular weight. In a preferable embodiment, the monomeric components of the polymerization product (a) may have essentially the same composition as that of all monomeric components in the acrylic PSA layer.

A solvent-based PSA composition can be easily prepared by, for instance, subjecting a monomer mixture having a composition corresponding to the monomeric components of the polymerization product (a) to solution polymerization. As the polymerization solvent, organic solvents commonly known or used in solution polymerization of an acrylic monomer can be used, such as ethyl acetate, toluene, hexane, a solvent mixture of these, etc. The embodiment of solution polymerization is not particularly limited and a heretofore known embodiment can be suitably applied. The type and amount of initiator that can be used as necessary are generally as described above. Thus, they are not repeated here. The solvent-based PSA composition can be prepared by dissolving a polymerization product obtained by a polymerization method other than solution polymerization into a suitable organic solvent. From the standpoint of the productivity, etc., it is preferably prepared by solution polymerization.

An emulsion-type PSA composition can be easily prepared by, for instance, subjecting a monomer mixture having a composition corresponding to the monomeric components of the polymerization product (a) to emulsion polymerization. The embodiment of emulsion polymerization is not particularly limited and a heretofore known embodiment can be suitably applied. The type and amount of initiator that can be used as necessary are generally as described above. Thus, they are not repeated here. Alternatively, the emulsion-type PSA composition can be prepared by emulsifying a polymerization product obtained by a polymerization method other than emulsion polymerization into an aqueous solvent (typically water). From the standpoint of the productivity, etc., it is preferably prepared by emulsion polymerization.

In addition to the polymerization product (a), the PSA composition (typically a solvent-based or water-dispersed PSA composition) can comprise, as necessary, a crosslinking agent as those described earlier. For the crosslinking agent, solely one species or a combination of two or more species can be used. Examples of a particularly preferable crosslinking agent include an isocyanate-based crosslinking agent and epoxy-based crosslinking agent.

As the isocyanate-based crosslinking agent, various polyfunctional isocyanate compounds can be used. Specific examples include lower aliphatic polyisocyanates such as 1,2-ethylene diisocyanate, 1,4-butylene diisocyanate, 1,6-hexamethylene diisocyanate, etc.; alicyclic polyisocyanates such as cyclopentylene diisocyanate, cyclohexylene diisocyanate, isophorone diisocyanate, hydrogenated tolylene diisocyanate, hydrogenated xylene diisocyanate, etc.; aromatic polyisocyanates such as 2,4-tolylene diisocyanate, 2,6-tolylene diisocyanate, 4,4'-diphenylmethane diisocyanate, xylylene diisocyanate, etc.; and the like. Among these, solely one species or a combination of two or more species can be used.

Examples of a commercial product that can be used as the isocyanate-based crosslinking agent include an adduct of trimethylolpropane and tolylene diisocyanate (trade name "CORONATE L" available from Nippon Polyurethane Industry Co., Ltd.), an adduct of trimethylolpropane and hexamethylene diisocyanate (trade name "CORONATE HL" available from Nippon Polyurethane Industry Co., Ltd.), an isocyanurate of hexamethylene diisocyanate (available from Nippon Polyurethane Industry, Co., Ltd.; trade name "CORONATE HX"), and an adduct of trimethylolpropane and xylylene diisocyanate (trade name "TAKENATE D-110N" available from Mitsui Chemicals, Inc.).

As the epoxy-based crosslinking agent, various polyfunctional epoxy compounds can be used. Specific examples include N,N,N',N'-tetraglycidyl-m-xylenediamine, diglycidylaniline, 1,3-bis(N,N-diglycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ethers, polypropylene glycol diglycidyl ethers, sorbitol polyglycidyl ethers, glycerol polyglycidyl ethers, pentaerythritol polyglycidyl ethers, polyglycerol polyglycidyl ethers, sorbitan polyglycidyl ethers, trimethylolpropane polyglycidyl ethers, diglycidyl adipate, o-diglycidyl phthalate, triglycidyl tris(2-hydroxyethyl)isocyanurate, resorcinol diglycidyl ether and bisphenol-S diglycidyl ether; as well as epoxy-based resins having two or more epoxy groups per molecule. These can be used singly as one species or in a combination of two or more species.

As the epoxy-based crosslinking agent, a commercial product can be used as well, such as trade name "TETRAD C" (1,3-bis(N,N-diglycidylaminomethyl)cyclohexane) available from Mitsubishi Gas Chemical Company, Inc., trade name "TETRAD X" (N,N,N',N'-tetraglycidyl-m-xylenediamine) from the same company and the like.

The amount of crosslinking agent is usually suitably about 0.01 to 15 parts by mass relative to 100 parts by mass of all monomeric components in the acrylic PSA layer and preferably about 0.1 to 10 parts by mass (e.g. about 0.2 to 2 parts by mass). The PSA composition comprising a crosslinking agent used in such an amount is preferable because it is likely to form a PSA with well-balanced adhesion to a low-polar material such as an olefinic rubber material and cohesion.

The PSA composition (typically a solvent-based or water-dispersed PSA composition) can comprise a tackifier as necessary. As the tackifier, a tackifier resin commonly known or used in the acrylic PSA field can be used, such as rosin-based, terpene-based, hydrocarbon-based, epoxy-based, polyamide-based, phenol-based, ketone-based species, etc. These tackifier resins can be used singly as one species or in a combination of two or more species. The amount of the tackifier resin used is not particularly limited. In view of the balance between adhesion to a low-polar material such as an olefinic rubber material and cohesion of the PSA, to 100 parts by mass of all monomeric components in the acrylic PSA layer, it is usually suitably about 10 to 100 parts by mass (more preferably 15 to 80 parts by mass, or yet more preferably 20 to 60 parts by mass).

As the tackifier, the acrylic oligomer (b) described above may be used, or a tackifier resin as described above and the acrylic oligomer (b) can be used together.

<Additives>

The PSA composition in the art disclosed herein may further comprise, as necessary, known additives that can be used in acrylic PSA, such as plasticizer, softener, filler, colorant (pigment, dye, etc.), antioxidant, leveling agent, stabilizer, preservative, etc., as far as the effects of the present invention are not significantly hindered.

For instance, when the PSA composition is cured by photopolymerization to form a PSA layer, to color the PSA layer, a pigment (coloring pigment) can be used as a colorant in an amount that does not hinder the photopolymerization. When the color of the PSA layer is desirably black, for instance, carbon black can be preferably used as the colorant. In view of the extent of coloring, photopolymerization reactivity, etc., the amount of carbon black used is desirably selected from a range of, for instance, 0.15 part by mass or less (e.g. 0.001 to 0.15 part by mass), or preferably 0.01 to 0.1 part by mass.

<Gel Fraction of PSA>

In the acrylic PSA layer included in a PSA sheet disclosed herein, the PSA constituting the PSA layer preferably has a gel fraction of, for instance, about 10% by mass or higher. To obtain such a gel fraction, suitable conditions can be selected with respect to the composition of the monomeric components of the PSA composition used for forming the PSA layer, conversion of the monomeric components, Mw of the polymer in the PSA composition, whether or not to use a polyfunctional monomer and its amount used if any, whether or not to use a crosslinking agent and its amount used if any, conditions for forming the PSA layer (curing conditions for the PSA composition, such as light irradiation conditions and drying conditions) and so on. From the standpoint of the cohesion, the gel fraction is suitably 15% or higher, preferably 20% or higher, or more preferably 25% or higher (e.g. 30% or higher). From the standpoint of the adhesion (e.g. adhesion to a low-polar material such as an olefinic rubber material), the gel fraction is suitably 90% or lower, preferably 85% or lower, or more preferably 80% or lower (e.g. 75% or lower). In a preferable embodiment, the gel fraction can be 70% or lower, preferably 60% or lower, or more preferably 50% or lower (yet more preferably 45% or lower, for instance, 40% or lower).

The gel fraction can be measured by the following method: In particular, a measurement sample weighing approximately 0.1 g is wrapped into a pouch with a porous tetrafluoroethylene resin sheet of 0.2 μm average pore diameter, and the opening is tied with twine. The mass of the wrapping (the combined mass of the porous tetrafluoroethylene resin sheet and the twine) Wa (mg) is measured in advance. The mass of the pouch (the combined mass of the PSA and the wrapping) Wb (mg) is measured. The pouch is placed in a screw vial of volume 50 mL (one screw vial used for each pouch), and the screw vial is filled with ethyl acetate. This is set still at room temperature (typically at 23° C.) for seven days, and the pouch is then removed and allowed to dry at 120° C. for two hours. The mass Wc (mg) of the pouch after dried is measured. The gel fraction of the PSA can be determined by substituting the Wa, Wb and Wc into the following:

$$\text{Gel fraction (\%)}=(Wc-Wa)/(Wb-Wa)\times 100$$

As the porous tetrafluoroethylene resin sheet, can be used trade name "NITOFLON® NTF1122" (0.2 μm average pore diameter, 75% porosity, 85 μm thick) available from Nitto Denko Corporation or an equivalent product can be used.

<Filler>

The PSA sheet disclosed herein may comprise a PSA layer comprising some filler. The inclusion of filler in a PSA layer may increase the cohesion of the PSA layer. The use of filler allows adjustment of the 10% compression hardness and breaking strength of the PSA sheet described later. The filler-containing PSA layer can be a PSA layer constituting an adhesive face or a PSA layer not constituting an adhesive face. The filler-containing PSA layer can be a bubble-containing layer or a bubble-free layer.

As the filler, various particulate substances can be used. Examples of a material constituting such a particulate substance include metals such as copper, nickel, aluminum, chromium, iron, stainless steel, etc.; metal oxides such as alumina, zirconia, etc.; carbides such as silicon carbide, boron carbide, nitrogen carbide, etc.; nitrides such as aluminum nitride, silicon nitride, boron nitride, etc.; inorganic materials such as calcium carbide, calcium carbonate, aluminum hydroxide, glass, silica, etc.; polymers such as a polystyrene, acrylic resin (e.g. poly(methyl methacrylate)), phenol resin, benzoguanamine resin, urea resin, silicone resin, nylon, polyester, polyurethane, polyethylene, polypropylene, polyamide, polyimide, silicone, vinylidene chloride, etc.; and the like. Alternatively, particles of natural materials such as volcanic shirasu, sand and the like can be used. The external form of such a particulate substance is not particularly limited, and can be, for instance, globular, flaky, irregularly-shaped, etc. The particle structure of the particulate substance is not particularly limited. For instance, it may have a dense structure, a porous structure, a hollow structure, etc.

In a preferable embodiment, as the filler, a particulate substance having a hollow structure, that is, hollow particles, can be used. When the PSA layer comprising hollow particles is formed from a PSA composition that is light-curing (e.g. UV-curing), from the standpoint of the light curability (polymerization reactivity) of the PSA composition, it is preferable to use hollow particles formed from an inorganic material. Examples of such hollow particles include balloons made of glass such as hollow glass balloons, etc.; hollow balloons made of metal compounds such as hollow alumina balloons, etc.; hollow balloons made of ceramics such as hollow ceramic balloons, etc.; and the like.

As the hollow glass balloon, can be used commercial products such as trade names "GLASS MICRO BALLOON" available from Fuji Silysia Chemical Ltd.; trade names "CEL-STAR Z-20," "CEL-STAR Z-27," "CEL-STAR CZ-31T," "CEL-STAR Z-36," "CEL-STAR Z-39," "CEL-STAR T-36" and "CEL-STAR PZ-6000" available from Tokai Kogyo Co. Ltd.; trade names "SEILAX FINE BALLOON" available from Fine Balloon KK; trade names "G-CEL® 5020," "G-CEL® 7014," "SPHERICEL® 110P8," "SPHERICEL® 25P45," "SPHERICEL® 34P30" and "SPHERICEL® 60P18" available from Potters-Ballotini Co., Ltd.; trade names "SUPER BALLOON BA-15" and "SUPER BALLOON 732C" available from Showa Chemical Industry Co., Ltd.; and the like.

The average particle diameter of the hollow particles used is not particularly limited. For example, it can be selected from a range of 1 μm to 500 μm, preferably 5 μm to 400 μm, more preferably 10 μm to 300 μm, or yet more preferably 10 μm to 200 μm (e.g. 10 μm to 150 μm). The average particle diameter of the hollow particles is usually suitably at most 50% of the thickness of the layer containing the hollow particles, or preferably at most 30% (e.g. at most 10 V.

The specific gravity of the hollow particles is not particularly limited. In view of the uniform dispersibility in the PSA composition, mechanical strength, UV permeability, etc., for instance, it can be selected from a range of 0.1 g/cm$^3$ to 1.8 g/cm$^3$, preferably 0.1 g/cm$^3$ to 1.5 g/cm$^3$, or more preferably 0.1 g/cm$^3$ to 0.5 g/cm$^3$ (e.g. 0.2 g/cm$^3$ to 0.5 g/cm$^3$). The amount of the hollow particles used is not particularly limited. For instance, it can be about 10 to 50% by volume of the volume of the PSA layer comprising the hollow particles.

In a PSA sheet comprising a non-adhesive layer, such filler (e.g. hollow particles) may be included in the non-adhesive layer. The type of preferable filler in a non-adhesive layer and its structure, average particle diameter, specific gravity, etc., can be the same as when the filler is included in an adhesive layer. Each of an adhesive layer and a non-adhesive layer may comprise filler.

The PSA sheet disclosed herein can be preferably made in an embodiment where a bubble-containing layer that does not constitute an adhesive face such as the intermediate layer 223 in FIG. 4 comprises filler while a bubble-free layer that constitutes an adhesive face such as the first and second adhesive layers 221 and 222 in FIG. 4 are free of filler. The PSA sheet having such constitution may combine adhesion and cohesion at a high level.

<Thickness of PSA Sheet>

In the PSA sheet disclosed herein, the acrylic PSA layer constituting the adhesive face has a thickness of, for instance, 1 μm or larger. From the standpoint of the adhesiveness, it has a thickness of suitably 5 μm or larger, preferably 10 μm or larger, or more preferably 20 μm or larger (e.g. 30 μm or larger, typically 35 μm or larger). In a preferable embodiment, the thickness of the acrylic PSA layer constituting the adhesive face can be 40 μm or larger (typically 50 μm or larger). The thickness of the acrylic PSA layer constituting the adhesive face can be 70 μm or larger (e.g. 90 μm or larger) as well. For instance, in a PSA sheet having the first adhesive face formed with an acrylic PSA layer and the second adhesive face formed with another PSA layer, these thickness ranges can also be preferably applied to the PSA layer forming the second adhesive face.

In the PSA sheet in an embodiment comprising, in addition to an acrylic PSA layer constituting an adhesive face, another PSA layer not constituting an adhesive face—that is, a PSA layer not exposed to the surface of the PSA sheet, the lower limit of the thickness of the other PSA layer is not particularly limited. For instance, it can be 0.05 μm or larger (typically 0.1 μm or larger).

The upper limit of the thickness of the PSA layer constituting the adhesive face is not particularly limited. The preferable upper limit of the thickness may also vary depending on the constitution of the entire PSA sheet including the PSA layer, etc.

For instance, when the acrylic PSA layer is a bubble-free adhesive layer, its thickness can be, for example, about 1000 μm or smaller. From the standpoint of the cohesion, etc., usually, the thickness is suitably 700 μm or smaller, or preferably 600 μm or smaller (e.g. smaller than 500 μm). In a preferable embodiment, the thickness can be 250 μm or smaller (more preferably 200 μm or smaller, typically 120 μm or smaller, e.g. 70 μm or smaller). These thickness ranges can be preferably applied to a bubble-free adhesive layer not constituting an adhesive face and a non-acrylic bubble-free adhesive layer constituting an adhesive face.

When the acrylic PSA layer constituting an adhesive face is a bubble-containing adhesive layer, its thickness can be, for instance, about 10 mm or smaller. From the standpoint of the ease of formation (e.g. light-curing properties of the PSA layer, the thickness is usually suitably 5 mm or smaller, or preferably 2 mm or smaller (e.g. 1 mm or smaller). The thickness ranges can be preferably applied to a bubble-containing adhesive layer not constituting an adhesive face or a non-acrylic bubble-containing adhesive layer constituting an adhesive face.

When the PSA sheet disclosed herein comprises a bubble-free non-adhesive layer (e.g. a plastic film), its thickness is not particularly limited. It can be, for instance, 0.001 μm or larger (typically 0.01 μm or larger, e.g. 0.1 μm or larger). The upper limit of the thickness of the bubble-free non-adhesive layer is not particularly limited. From the standpoint of the flexibility of the PSA sheet, etc., it is usually suitably smaller than 500 μm, preferably smaller than 250 μm, or more preferably smaller than 200 μm (e.g. smaller than 100 μm).

When the PSA sheet disclosed herein comprises a bubble-containing non-adhesive layer (e.g. a polyolefinic foam sheet such as a polyethylene-based foam sheet), its thickness is not particularly limited. In a preferable embodiment, the bubble-containing non-adhesive layer has a thickness of 10 µm or larger, but about 10 mm or smaller (more preferably 20 µm or larger, but smaller than 5 mm, typically 50 µm or larger, but smaller than 2 mm, for instance, 100 µm or larger, but smaller than 1 mm).

The overall thickness (not including the thickness of any release liner) of the PSA sheet disclosed herein is not particularly limited. The preferable overall thickness of the PSA layer may also vary depending on the construction, purpose of use and form of use of the PSA sheet, etc.

Herein, the overall thickness of a PSA sheet refers to the thickness from the first adhesive face 21A through the second adhesive face 22A in a double-faced PSA sheet as shown in FIG. 2; and it refers to the thickness from the first adhesive face 21A through the back face (second surface 31A) in a substrate-supported single-faced PSA sheet as shown in FIG. 3. In other words, the overall thickness of a PSA sheet herein does not include the thickness of any release liner.

When the PSA sheet is free of a bubble-containing layer, the sheet usually has a thickness of suitably 5 µm or larger, and from the standpoint of the adhesion, preferably 10 µm or larger, or more preferably 20 µm or larger (e.g. 30 µm or larger, typically 35 µm or larger). From the standpoint of the adhesion to EPDM and other olefinic rubber materials, the sheet thickness is preferably 50 µm or larger, more preferably 70 µm or larger, or yet more preferably 80 µm or larger (e.g. 90 µm or larger). The thickness of the PSA sheet can be, for instance, about 1000 µm or smaller. From the standpoint of the cohesion, etc., it is suitably 800 µm or smaller, or preferably 700 µm or smaller (e.g. smaller than 600 µm). In a preferable embodiment, the thickness can be 300 µm or smaller (more preferably 250 µm or smaller, typically 150 µm or smaller, e.g. 100 µm or smaller).

When the PSA sheet comprises a bubble-containing layer, its thickness can be, for instance, 10 µm or larger, or it is usually preferably 50 µm or larger (typically 100 µm or larger). From the standpoint of the cushioning properties, the thickness of the PSA sheet is suitably 300 µm or larger, preferably 500 µm or larger, or more preferably 700 µm or larger (e.g. 1000 µm or larger). The thickness of the PSA sheet can be, for instance, about 15 mm or smaller, or it is usually suitably about 10 mm or smaller, preferably 7 mm or smaller, or more preferably 5 mm or smaller (e.g. 3 mm or smaller).

In the PSA sheet comprising a bubble-containing layer and a bubble-free layer, the ratio of the thickness of the bubble-containing layer in the overall thickness of the PSA sheet is not particularly limited and can be, for instance, 10% or higher. From the standpoint of the cushioning properties and flexibility of the PSA sheet, the ratio of the bubble-containing layer is preferably 25% or higher, more preferably 50% or higher, or even more preferably 70% or higher. From the standpoint of obtaining yet greater cushioning properties, etc., the ratio of the thickness of the bubble-containing layer in the overall thickness of the PSA sheet can be 80% or higher, 85% or higher, or even 90% or higher. For instance, as shown in FIG. 5, the art disclosed herein can also be preferably implemented in an embodiment where the PSA sheet is formed solely of a bubble-containing adhesive layer. In this case, the ratio of the thickness of the bubble-containing layer in the overall thickness of the PSA sheet is 100%.

For instance, as shown in FIG. 4, in a PSA sheet 20 constituted with adhesive face-constituting PSA layers 221 and 222 backed with an intermediate layer 223, the ratios of the thicknesses of adhesive face-constituting PSA layers 221 and 222 in the overall thickness of the PSA sheet can be individually, for instance, 0.1% or higher. From the standpoint of the adhesion, etc., the ratios of their thicknesses are usually suitably 0.5% or higher, preferably 1% or higher, more preferably 2% or higher, or yet more preferably 3% or higher.

When the PSA sheet disclosed herein comprises a bubble-free non-adhesive layer (e.g. a plastic film), the ratio of the thickness of the bubble-free non-adhesive layer in the overall thickness of the PSA sheet is not particularly limited, but it is usually suitably 20% or lower. From the standpoint of obtaining greater conformability, the ratio of the thickness of the bubble-free non-adhesive layer is preferably 10% or lower, or more preferably 5% or lower.

<Properties of PSA Sheet>

[Compression Hardness]

When the PSA sheet disclosed herein comprises a bubble-containing layer, its 10% compression hardness is preferably, but not particularly limited to, 0.2 Pa or less. Herein the 10% compression hardness of a PSA sheet refers to the load applied when at a measurement temperature of 25° C., the PSA sheet is placed between plates and compressed to 90% of its initial thickness (100%). When the overall thickness of the PSA sheet is less than 25 mm, a minimal number of layers of the PSA sheet are overlaid to at least 25 mm and the resulting laminate is placed between the plates and measured for 10% compression hardness.

With the 10% compression hardness being 0.2 Pa or less, the conformability of the PSA sheet to the surface structure of adherend or its deformation will increase, allowing tighter adhesion of the PSA sheet to the adherend surface. From the standpoint of obtaining greater conformability, the 10% compression hardness of the PSA sheet can be, for instance, 0.1 Pa or less, and is preferably 0.07 Pa or less, or more preferably 0.05 Pa or less. From the standpoint of the handling properties of the PSA sheet, the 10% compression hardness is suitably 0.007 Pa or greater, preferably 0.01 Pa or greater, or more preferably 0.02 Pa or greater.

The 10% compression hardness of a PSA sheet can be measured based on JIS K 6767. The 10% compression hardness of the PSA sheet can be controlled through the type (composition, bubble content, thickness, etc.) of bubble-containing layer, presence or absence of a bubble-free layer, ratio of thickness of bubble-containing layer to overall PSA sheet thickness, use or absence of filler, and so on.

[Breaking Strength]

When the PSA sheet disclosed herein comprises a bubble-containing layer, its breaking strength is preferably, but not particularly limited to, 5 Pa or less. The breaking strength of a PSA sheet herein refers to the load at break when a 10 mm wide strip as a test piece is cut out along the length direction (MD) of the PSA sheet, and at a measurement temperature of 25° C., the test piece is stretched in the MD direction at a tensile speed of 300 mm/min at a chuck distance of 50 mm based on JIS K7161. With the breaking strength being 5 Pa or less, the conformability of the PSA sheet to the surface structure of adherend or its deformation will increase, allowing tighter adhesion of the PSA sheet to the adherend surface. From the standpoint of obtaining greater conformability, the breaking strength of the PSA sheet is preferably 3 Pa or less, or more preferably 2.5 Pa or less (e.g. 2 Pa or less). From the standpoint of the handling properties and cohesion of the PSA sheet, etc., the breaking strength is suitably 0.1 Pa or greater, or preferably 0.3 Pa or greater (e.g. 0.5 Pa or greater). The breaking strength of the PSA sheet can be controlled through the type (composition, bubble content, thickness, etc.) of bubble-containing layer, presence or absence of a bubble-free layer, ratio of thickness of bubble-containing layer to overall PSA sheet thickness, use or absence of filler, and so on.

[Cohesion]

The PSA sheet disclosed herein preferably exhibits a level of cohesion that provides a holding time of 15 minutes or longer before its sample falls off in the following holding power test.

(Holding Power Test)

A 20 mm wide strip prepared from a PSA sheet to be measured is used as the measurement sample. When the PSA sheet to be measured is in a form of double-faced PSA sheet, 50 µm thick polyethylene terephthalate (PET) film should be applied to back one adhesive face in advance.

To a stainless steel (SUS) plate as the adherend, the sample is press-bonded at its one end over a 20 mm wide by 20 mm long bonding area with a 5 kg roller rolled once in one direction. The resultant is stored in the standard environment for 24 hours. Subsequently, based on JIS Z0237 (2004), the SUS plate is vertically suspended in an environment at 40° C. and a 500 g load is applied to the free end of the sample. With the load being applied, it is stored in the environment at 40° C. and the time taken for the sample to peel from the SUS plate and fall off is measured.

The measurement was taken with two or more measurement samples for each PSA sheet and their arithmetic average value is used as its holding time.

A PSA sheet having a holding time of 15 minutes or longer according to the holding power test is preferable, for instance, when used in a form of double-faced PSA sheet for applications for joining various types of adherend to desirable locations. From the standpoint of the reliability of the joint, the holding time is preferably 20 minutes or longer, or more preferably 30 minutes or longer.

<Adherend>

The PSA sheet disclosed herein has an adhesive face that provides excellent adhesion to EPDM. Accordingly, it may exhibit great adhesion to surfaces formed of various materials including surfaces of EPDM and other olefinic rubbers as well as surfaces of other low-polar materials. The adherend material to which the adhesive face is applied is not particularly limited. The adherend may have a surface formed of, for instance, metallic materials such as stainless steel (SUS), aluminum, zinc-plated steel plate, etc.; inorganic materials such as glass, ceramic, etc.; resin materials such as polyolefinic resins including polycarbonate, polymethyl methacrylate (PMMA), polyethylene and polypropylene as well as acrylonitrile-butadiene-styrene copolymer (ABS), polystyrene, polyethylene terephthalate (PET), etc.; olefinic rubber materials such as EPDM and thermoplastic olefinic elastomer; non-olefinic rubber materials such as natural rubber, acrylic rubber, styrene-based thermoplastic elastomer, etc.; a composite material of these; or the like. It can be applied to a surface painted with an acrylic, polyester-based, alkyd-based, melamine-based, urethane-based, acid-epoxy crosslinking-based, their composite-based (e.g. acrylic melamine-based, alkyd melamine-based) paint or the like.

The PSA sheet disclosed herein can be preferably used in an embodiment where the adhesive face formed with the acrylic PSA layer (e.g. a PSA layer (A)) is applied to a surface formed of an olefinic rubber material, non-olefinic rubber material or polyolefinic resin. Examples of the polyolefinic resin include polyethylene such as LDPE, LLDPE, HDPE, metallocene catalyst-based LDPE, polypropylene, ethylene-propylene copolymer, ethylene-vinyl acetate copolymer, etc.

A particularly preferable embodiment of the use of the PSA sheet disclosed herein is an embodiment where the adhesive face formed with the acrylic PSA layer (e.g. a PSA layer (A)) is applied to a surface formed of an olefinic rubber material (or an olefinic rubber surface, hereinafter). The adhesive face is highly adhesive to the standard EPDM plate. Thus, it may exhibit excellent adhesion to EPDM and other olefinic rubber materials.

A preferable embodiment of the use of the PSA sheet that comprises a bubble-containing layer and has an adhesive face formed with a PSA layer (A) is an embodiment where the adhesive face is applied to a surface formed of an olefinic rubber material, non-olefinic rubber material or polyolefinic resin. The adhesive face formed with the PSA layer (A) may have a high affinity to a low-polar surface because of the effects of the monomer A. Such effects of the monomer A in combination with the tight adhesion (great conformability to a surface structure and deformation of adherend) due to the inclusion of the bubble-containing layer in the PSA sheet can bring about excellent adhesion to surfaces of low-polar materials such as olefinic rubber materials and polyolefinic resins. In addition, since it can conform well to deformation of the adherend because of the high conformability, it may also exhibit excellent adhesion to an adherend formed of a material susceptible to elastic deformation, such as an olefinic rubber material and other rubber materials.

A particularly preferable embodiment of the use of the PSA sheet that comprises a bubble-containing layer and has an adhesive face formed with a PSA layer (A) is an embodiment where the adhesive face formed as a surface of the PSA layer (A) is applied to an olefinic rubber surface. Because of the monomer $A_S$ effects, the adhesive face has a high affinity to an olefinic rubber surface (e.g. a surface formed of EPDM). Such monomer $A_S$ effects in combination with the high conformability to a surface structure and deformation of an olefinic rubber material due to the inclusion of the bubble-containing layer in the PSA sheet can bring about excellent adhesion to the olefinic rubber material.

Herein, the olefinic rubber material refers to a material comprising an olefinic rubber (typically a material whose olefinic rubber content exceeds 50% by mass or the material). Specific examples include olefinic rubbers such as ethylene-propylene rubber (EPM), ethylene-propylene-diene rubber (EPDM) and butyl rubber (IIR) as well as various resin material comprising such olefinic rubbers. The olefinic rubber-containing resin material can be a resin material as a blend of a thermoplastic resin (e.g. a polyolefin such as polypropylene) and an olefinic rubber. Typical examples of such a resin material include a thermoplastic olefinic elastomer (TPO) that comprises the thermoplastic resin as its hard segment and the olefinic rubber as its soft segment.

Besides the olefinic rubber, the olefinic rubber material may comprise, as necessary, known additives that can be used in molded rubber parts, such as carbon black, colorant, plasticizer, filler, vulcanizing agent, vulcanization accelerator, foaming agent, and so on.

As the plasticizer, for instance, paraffin oils, waxes, naphthenics, aromatics, asphalts, drying oils (e.g. linseed oil), animal and vegetable oils, low molecular weight polymers, phthalic acid esters, phosphoric acid esters, alkyl sulfonic acid esters, etc., can be used.

As the filler, for instance, carbon black, zinc oxide, calcium carbonate, magnesium carbonate, silicic acid or a salt thereof, talk, mica, bentonite, silica, alumina, aluminum silicate, acetylene black, aluminum powder, etc., can be used.

As the vulcanizing agent, for instance, sulfur, sulfur compounds, selenium, magnesium oxide, lead monoxide, zinc oxide, organic peroxides, polyamines, oximes (e.g. p-quinone dioxime, p,p'-dibenzoylquinone dioxime), nitroso compounds (e.g. p-dinitrosobenzine), resins (e.g. alkylphenol-formaldehyde resin, melamine-formaldehyde condensate), ammonium salts (e.g. ammonium benzoate), etc., can be used.

As the vulcanizsation accelerator, for instance, dithiocarbamic acids (e.g. sodium dimethyldithiocarbamate, sodium diethyldithiocarbamate, zinc dimethyldithiocarbamate, zinc diethyldithiocarbamate, etc.), thiazoles (e.g. 2-mercaptobenzothiazole, dibenzothiazyl disulfide, etc.), guanidines (e.g. diphenylguanidine, di-o-tolylguanidine, etc.), sulfenamides (e.g. benzothiazyl-2-diethylsulfenamide, N-cyclohexyl-2-benzothiazyl sulfenamide, etc.), thiurams (e.g. tetramethylthiuram monosulfide, tetramethylthiuram disulfide, etc.), xanthogenic acids (e.g. sodium isopropylxanthogenate, zinc isopropylxanthogenate, etc.), aldehyde ammonias (e.g. acetaldehyde ammonia, hexamethylenetetramine, etc.), aldehyde amines (e.g. n-butylaldehyde aniline, butylaldehyde monobutylamine, etc.) and thioureas (e.g. diethyl thiourea, trimethyl thiourea, etc.) can be used.

An example of a preferable object of application (object of adhesion) of the PSA sheet disclosed herein is an olefinic rubber material having a composition in which an olefinic rubber (e.g. EPDM) is mixed with either carbon black or paraffin oil or with the both of these. When the acrylic PSA layer constituting the adhesive face is a PSA layer (A), according to an embodiment where it is applied to such an olefinic rubber material, greater effects can be produced by the PSA layer (A) comprising the monomer A in its monomeric components.

<PSA Sheet-Bearing Part>

When the PSA sheet disclosed herein is used in an embodiment where the adhesive face constituted with the PSA layer (A) is applied to surfaces of parts (components) formed of various materials, it may show great adhesion (e.g. peel strength) to these surfaces. Accordingly, in another aspect, the present invention provides a PSA sheet-bearing part comprising a part and a PSA sheet having an adhesive face constituted with the acrylic PSA layer, with the adhesive face (surface of the acrylic PSA layer) being adhered to a surface of the part.

A preferable example of the PSA sheet-bearing part comprises a part comprising an olefinic rubber surface and a PSA sheet having an adhesive face constituted with the acrylic PSA layer, with the adhesive face being adhered to the olefinic rubber surface. As the PSA sheet, a PSA sheet disclosed herein can be preferably used.

Such a PSA sheet-bearing part may be in an embodiment where the adhesive face is directly applied to the olefinic rubber surface. Herein, to be directly applied means that no other layers (primer layer, etc.) are present between the adhesive face and the olefinic rubber surface. In comparison to an embodiment where, for instance, a primer layer is present between the olefinic rubber material surface and the adhesive face, the production process can be simplified for the PSA sheet-bearing part in such an embodiment, thereby leading to great productivity. A heretofore typical primer layer is formed by applying a primer solution (a solution containing a primer layer-forming component in an organic solvent) and allowing it to dry. From the standpoint of reducing environmental stress, it is preferable to be able to omit the use of such a solution. In addition, since no device is necessary for the application and drying of a primer solution, the production facility for the PSA sheet-bearing part can be simplified. Furthermore, as it does not require a step of drying a primer solution, it is also advantageous in terms of the energy efficiency.

Specific examples of the olefinic rubber surface-bearing part include, but not particularly limited to, vehicle rubber parts such as weather strips, moldings including pillar moldings, belt moldings and roof moldings, bumpers, hoses including radiator hoses and heater hoses, brake couplings, vehicle interior materials and so on; rubber parts for buildings such as roofing sheets; electric cable jacket materials; conveyor belts; and so on. Herein, a weather strip is a part that is applied typically to bodies and/or parts of vehicles to seal gaps between openings (vehicle doors, windows, trunk lids, bonnets, etc.) and parts that close these openings (door panels, windshields, etc.). Specific examples of the weather strips include so-called door weather strips, opening trim weather strips, window weather strips, glass run channels, etc. The art disclosed herein can be preferably implemented in an embodiment where, for instance, the olefinic rubber surface-bearing part is a vehicle rubber part (in particular, flexible hollow parts such as weather strips).

The PSA sheet-bearing part disclosed herein has a peel strength of preferably 5 N/10 mm or greater or more preferably 7 N/10 mm or greater when the adhesive face is directly adhered to an olefinic rubber surface and the PSA sheet is peeled from the olefinic rubber surface in the 180° direction at a tensile speed of 50 mm/min. Such a PSA sheet-bearing part is preferable since it has a highly reliable joint between the part and the PSA sheet. From the standpoint of such joint reliability, etc., the peel strength is preferably 10 N/10 mm or greater, more preferably 15 N/10 mm or greater, or yet more preferably 20 N/10 mm or greater.

In a preferable embodiment, the PSA sheet-bearing part may be in an embodiment comprising a double-faced PSA sheet whose both surfaces are formed as adhesive faces and one adhesive face of the double-faced PSA sheet is directly adhered on the olefinic rubber surface of the part. With respect to the PSA sheet-bearing part in such an embodiment, by applying the other adhesive face of the PSA sheet to a desirable location, the olefinic rubber surface-bearing part can be easily fixed to the location. For instance, when the olefinic rubber surface-bearing part is a vehicle weather strip, the weather strip can be easily attached to a vehicle body or its component (door panel, etc.).

FIG. 4 schematically illustrates an example of the PSA sheet-bearing part disclosed herein. PSA sheet-bearing part 50 comprises a PSA sheet 5 formed of an acrylic PSA layer (PSA layer (A)) 51 comprising a monomer A in its monomeric components, and a door weather strip 52 molded (typically co-extruded) in a hollow strip of an olefinic rubber material. The first adhesive face 51A of PSA sheet 5 is a surface of the PSA layer (A) and is directly applied to a surface 52A of door weather strip 52. In the PSA sheet-bearing part 50 thus constituted, by press-bonding the second adhesive face 51B of PSA sheet 5 to a surface 60A of a door panel 60, door weather strip 52 can be easily fixed to the door panel 60. Even without special heating of the second adhesive face 51B of PSA sheet 5 and the surface 60A of door panel 60, the press-bonding can be done quickly at ordinary temperature.

FIG. 9 shows another example of the PSA sheet-bearing part disclosed herein. PSA sheet-bearing part 50 comprises a PSA sheet 20 having a structure shown in FIG. 4 which corresponds to Configurational Example 4 described above and further comprises a door weather strip 52 molded (typically extruded) from an olefinic rubber material into a hollow strip. The first adhesive face 221A of PSA sheet 20 is a surface of an acrylic PSA layer (preferably a PSA layer (A)) and is directly applied to the surface 52A of door weather strip 52. In PSA sheet-bearing part 50 thus constructed, by press-bonding the second adhesive face 222A of PSA sheet 20 to a surface 60A of a door panel 60, door weather strip 52 can be easily fixed to the door panel 60. The press-bonding can be completed quickly at ordinary temperature without special heating of the second adhesive face 222A of PSA sheet 20 or the surface 60A of door panel 60.

A typical weather strip has a long shape (e.g. as long as or longer than about 100 cm). Since a weather strip is generally produced by extrusion, it has a linear or gently curved form in its length direction when it is in its free state. Such a weather strip is usually installed in a vehicle while it is deformed (curved) in the length direction along a prescribed line marked for installation. Accordingly, it is desirable that the double-faced PSA sheet for fastening the weather strip is highly conformable to the deformation. The high conformability of the double-faced PSA sheet is especially meaningful when the weather strip is installed in a prescribed location in an embodiment where the PSA sheet-bearing weather strip (PSA sheet-bearing part) is deformed, with one surface of the double-faced PSA sheet being adhered to the weather strip, and the other adhesive face is press-bonded to the prescribed location of a vehicle body, etc.

When the part is a long rubber part such as a weather strip, as for the PSA sheet that is applied to the part to constitute a PSA sheet-bearing part, it is particularly preferable to use a PSA sheet that has an adhesive face formed with the PSA layer (A) and comprises at least one bubble-containing layer. The PSA sheet thus constituted is flexible because of the inclusion of the bubble-containing layer and has great conformability to surface structures and deformation of adherend. Thus, it is preferable as a component of a PSA sheet-bearing strip as described above. With the bubble-containing layer, the PSA sheet also has great cushioning properties. This contributes to increase the conformability to a surface structure of a weather strip and it is also advantageous from the standpoints of increasing the conformability to a surface structure (a step, etc.) of the surface to which the weather strip is applied, from the standpoint of absorbing variation of gaps between the weather strip surface and the surface on which the weather strip is attached.

<Method for Producing PSA Sheet-Bearing Part>

As the method for producing the PSA sheet-bearing part disclosed herein, a method can be preferably employed, the method comprising obtaining a molded olefinic rubber body (olefinic rubber part) that has an olefinic rubber surface, obtaining a PSA sheet that has an adhesive face formed with an acrylic PSA layer, and applying the adhesive face to a surface of the molded olefinic rubber body.

In the PSA sheet disclosed herein, the adhesive face formed as the surface of the acrylic PSA layer (preferably a PSA layer (A)) has great affinity to an olefinic rubber surface. Accordingly, the adhesive face can be applied to the molded olefinic rubber body without special heating of the adhesive face and the surface (the surface to which the PSA sheet is applied, or the "surface subject to adhesion") of the molded olefinic rubber body; and even when thus applied, it can show great adhesion to the molded olefinic rubber body. Alternatively, from the standpoint of increasing the productivity, etc., the PSA sheet disclosed herein can be applied to an olefinic rubber surface in an embodiment where the surface subject to adhesion and/or the adhesive face are heated. It is usually preferable to employ an embodiment of application where the surface subject to adhesion and the abrasive face are not especially heated. According to such an embodiment, energy costs can be saved as compared to the heating embodiment. It is also preferable because the application can be done with simpler equipment and the application conditions are also easy to manage. The application can be carried out typically at ordinary temperature (e.g. 0° C. to 50° C., typically in an environment at a temperature of about 10° C. to 40° C.).

When the PSA sheet disclosed herein is used in an embodiment where it is applied to various types of adherend at ordinary temperature, it may show sufficient adhesion to the adherend. On the other hand, the PSA sheet disclosed herein can be applied to an adherend in an embodiment where the surface subject to adhesion and/or the adhesive face are heated. For instance, it is preferable to apply an embodiment where the PSA sheet is applied while the temperature (typically almost equal to the temperature of the surface subject to adhesion) of the adherend is purposely elevated above ordinary temperature. This can bring about yet greater peel strength. The heating temperature is not particularly limited and can be suitably set in view of the balance among the heat resistance of the adherend, workabilities, extent of effects obtainable by heating, and so on. For instance, the temperature of the adherend can be above 50° C. and is preferably 75° C. or higher, or more preferably 100° C. or higher. The upper limit of the heating temperature can be, for instance, 200° C. or lower and is usually suitably 175° C. or lower. Like this embodiment, the technique of applying the PSA sheet to an adherend at an elevated temperature can be preferably applied, for instance, in application to a low-polar adherend such as an olefinic rubber. It may also produce significant effects when it is applied in application to various other types of adherend. The preferable temperature ranges can be used as the heating temperature for the adherend (surface subject to adhesion) and also as the heating temperature for the adhesive face.

The PSA sheet-bearing part production method disclosed herein can be preferably practiced in an embodiment where the surface (surface subject to adhesion) of the molded olefinic rubber body is subjected to a suitable cleaning treatment and the adhesive face is applied (preferably directly applied) to the cleaned surface. According to such an embodiment, the PSA sheet-bearing part can be produced, with the PSA sheet being more firmly adhered to the olefinic rubber surface.

As the cleaning treatment, a treatment where a cleaning liquid is allowed to make contact with the surface subject to adhesion can be preferably used. The cleaning liquid used is not particularly limited. For instance, a cleaning liquid comprising an organic solvent can be preferably used. Examples of the organic solvent include lower alcohols such as methyl alcohol, ethyl alcohol, isopropyl alcohol, etc.; lower ketones such as acetone, methyl isobutyl ketone, cyclohexanone, etc.; acetic acid esters such as ethyl acetate, butyl acetate, etc.; acyclic or cyclic amides such as dimethylformamide, dimethylacetamide, 2-methylpyrrolidone, etc.; aromatic solvents such as toluene, xylene, etc.; and the like. These can be used singly as one species or in a combination of two or more species. Alternatively, a cleaning liquid comprising water can be used. For instance, a mixed solvent of an organic solvent as listed above and water can be preferably used. As it is unlikely to degrade a molded olefinic rubber body and is easy to handle, it is usually preferable to use a mixed solvent of a lower alcohol or water and another lower alcohol. A preferable example of the cleaning liquid is isopropyl alcohol (IPA).

The cleaning treatment using a cleaning liquid may be, for instance, a treatment where a portion of the molded olefinic rubber body that includes the surface subject to adhesion is immersed in the cleaning liquid, a treatment where the surface subject to adhesion (treated surface) is wiped with cloth impregnated with the cleaning liquid, a treatment where the cleaning liquid is sprayed to the surface subject to adhesion, and so on. These treatments can be applied singly as one type or in a combination of two or more types. The extent (immersing time in the cleaning liquid, number of times to wipe the surface subject to adhesion, spraying rate of the cleaning liquid, etc.) and embodiment of the treatment can be suitably selected in view of the purpose and embodiment of the use of the PSA sheet-bearing part. From the standpoint of the convenience of the operation, the treatment where the surface is treated with cloth impregnated with the cleaning liquid can be preferably used. The number of times to wipe the treated surface with cloth with the cleaning liquid can be, but not particularly limited to, for instance, about 1 to 50 times. From the standpoint of the productivity, etc., it is usually suitably about 1 to 30 times.

With reference to FIG. 10, the PSA sheet-bearing part production method according to a preferable embodiment is described. In particular, a treatment is performed, where a molded olefinic rubber body (e.g. door weather strip 52 shown in FIG. 9) is obtained and its surface 52A (a surface subject to adhesion) is cleaned with a cleaning liquid (step S10). For instance, the surface 52A subject to adhesion is wiped with cloth impregnated with the cleaning liquid about 1 to 20 times. To the cleaned surface 52A subject to adhesion, the PSA sheet is press-bonded (step S20). For instance, as shown in FIG. 9, the first adhesive face 221A of PSA sheet 20 shown in FIG. 4 is press-bonded to the surface 52A subject to adhesion. The press-bonding can be carried out in an environment at ordinary temperature without special heating of the molded olefinic rubber body and the PSA sheet. In such a manner, a PSA sheet-bearing part in which a PSA sheet is directly bonded to a surface of a molded olefinic rubber body can be preferably produced.

Several working examples relating to the present invention are described below, but the present invention is not intended to be limited to these examples. In the description below, "parts" and "%" are based on the mass unless otherwise specified.

<List of Abbreviations>

In the description below, names of monomers and crosslinking agents are sometimes indicated with the following abbreviations.

[Monomers]

2EHA: 2-ethylhexyl acrylate
BA: n-butyl acrylate
CHA: cyclohexyl acrylate
CHMA: cyclohexyl methacrylate
IBXMA: isobornyl methacrylate
DMAEA: dimethylaminoethyl acrylate
DMAEM: dimethylaminoethyl methacrylate
ACMO: N-acryloylmorpholine
AA: acrylic acid
MAA: methacrylic acid
2HEA: 2-hydroxyethyl acrylate

[Crosslinking Agents]

TMPTA: trimethylolpropane triacrylate
TMP-3P: ethylene oxide-modified trimethylolpropane tri(meth)acrylate (available from Osaka Organic Chemical Industry, Ltd., trade name "VISCOAT 360")
HDDA: 1,6-hexanediol diacrylate
DPHA: dipentaerythritol hexaacrylate Experiment 1

[Preparation of PSA Sheets]

Example H1

In a four-neck flask, was placed a monomer mixture consisting of 77.9 parts of 2-ethylhexyl acrylate (2EHA), 20.5 parts of cyclohexyl acrylate (CHA) and 1.5 parts of N,N-dimethylaminoethyl methacrylate (DMAEM) along with 0.05 part 2,2-dimethoxy-1,2-diphenylethane-1-on (available from BASF Corporation, trade name "IRGACURE 651") and 0.05 part of 1-hydroxy-cyclohexyl phenyl ketone (available from BASF Corporation, trade name "IRGACURE 184"). In a nitrogen atmosphere, the resulting mixture was exposed to UV rays to undergo partial photopolymerization, whereby syrup (h1) was obtained comprising a polymer having a weight average molecular weight (Mw) of $30 \times 10^4$ and unreacted monomers. The conversion of the monomer mixture in this syrup (h1) was about 30%.

To a monomer mixture consisting of 70 parts of cyclohexyl methacrylate (CHMA) and 30 parts of DMAEM, n-dodecyl mercaptan was added and the mixture was purged with nitrogen to remove dissolved oxygen. Subsequently, the mixture was heated to 90° C. and 0.005 part of trade name "PERHEXYL O" and 0.01 part of trade name "PERHEXYL D" both available from NOF Corporation were added as peroxide-based initiators. This was stirred at 90° C. for one hour, heated to 150° C. over one hour, and stirred at 150° C. for one hour. The mixture was then heated to 170° C. over one hour and stirred at 170° C. for 60 minutes. The mixture was then placed under reduced pressure at 170° C. and stirred for one hour to remove remaining monomers, whereby an acrylic oligomer (h1) was obtained, having a Mw of $0.5 \times 10^4$.

To 100 parts of the syrup (h1), were added and mixed 20 parts of the oligomer (h1), 0.12 part of TMPTA as a crosslinking agent and 0.30 part of trade name "P-02" available from Soken Chemical & Engineering Co., Ltd., as a photopolymerization initiator to prepare a PSA composition according to this example.

Two sheets of 38 μm thick polyethylene terephthalate (PET) film were obtained, with one surface of each sheet being a release that had been face that had been treated with a silicone-based release agent. To the release face of the first sheet of PET film, the PSA composition was applied to a thickness of 500 μm after light irradiation. To the PSA composition applied, the second sheet of PET film was laid over and the resultant was irradiated with UV rays to cure the PSA composition and form a PSA layer. UV ray irradiation was performed with a black light (15 W/cm) at an irradiance of 3 mW/cm² (measured with an industrial UV checker (available from Topcon Corporation, trade name "UVR-T1" with light detector model number "UD-T36") with peak sensitivity at 350 nm in wavelength) for two minutes, and then with a low illuminance metal halide lamp available from Toshiba Lighting & Technology Corporation at an irradiance of 8 mW/cm² (measured with the UV checker). A PSA sheet was thus obtained formed of a PSA layer resulting from UV ray-curing of the PSA composition. The first and second adhesive faces of the PSA sheet are protected with the two sheets of PET film (release liner), respectively.

In this example, to the monomer mixture to obtain the acrylic oligomer (h1), 6 parts of n-dodecylmercaptan was added relative to 100 parts of monomers. In this and other experiments, when preparing an acrylic oligomer other than the acrylic oligomer (h1), the amount of n-dodecyl mercaptan was adjusted if needed so as to obtain an acrylic oligomer (b) having a desired Mw.

Example H2

The photopolymerization initiator was changed to 0.25 part of 2,2-dimethoxy-1,2-diphenylethane-1-on (available from BASF Corporation, trade name "IRGACURE 651"). Otherwise in the same manner as Example H1, a PSA composition according to this example was prepared. Using this PSA composition, but otherwise in the same manner as Example H1, a PSA sheet according to this example was obtained.

Example H3

The crosslinking agent was changed to 0.14 part of 1,6-hexanediol diacrylate (HDDA), but otherwise in the same manner as Example H2, a PSA sheet according to this example was obtained.

Example H4

The crosslinking agent was changed to 0.13 part of dipentaerythritol hexaacrylate (DPHA), but otherwise in the same manner as Example H2, a PSA sheet according to this example was obtained.

Example H5

Using a monomer consisting of 50 parts of CHMA and 50 parts of DMAEM, but otherwise in the same manner as the preparation of the acrylic oligomer (h1), an acrylic oligomer (h5) was obtained having a Mw of $0.5 \times 10^4$.

To 100 parts of the syrup (h1) prepared in Example H1, were added and mixed 20 parts of the acrylic oligomer (h5), 0.12 part of TMPTA and 0.20 part of bis(2,4,6-trimethylbenzoyl)phenylphosphine oxide (available from BASF Japan Ltd., trade name "IRGACURE 819") as a photopolymerization initiator to prepare a PSA composition according to this example. Using this PSA composition, but otherwise in the same manner as Example H1, a PSA sheet according to this example was obtained.

Examples H6 to H8

The amounts of photopolymerization initiator were changed to 0.30 part, 0.40 part and 0.50 part, but otherwise in the same manner as Example H5, PSA sheets according to Examples H6 to H8 were obtained, respectively.

Example H9

A monomer mixture consisting of 80 parts of 2EHA and 20 parts of CHA was subjected to partial photopolymerization in the same manner as Example H1 to obtain syrup (h9) comprising a polymer having a Mw of $30 \times 10^4$ and unreacted monomers. The monomer conversion was about 30%.

Using solely CHMA as the monomer, but otherwise in the same manner as the preparation of the acrylic oligomer (h1), an acrylic oligomer (h9) was obtained having a Mw of $0.5 \times 10^4$.

To 100 parts of the syrup (h9), were added and mixed 20 parts of the acrylic oligomer (h9), 0.12 part of TMPTA as a crosslinking agent and 0.30 part of trade name "P-02" available from Soken Chemical & Engineering Co., Ltd., as a photopolymerization initiator to prepare a PSA composition according to this example. Using this PSA composition, but otherwise in the same manner as Example H1, a PSA sheet according to this example was obtained.

[Evaluation of Properties]
(To-EPDM Initial Peel Strength (20-min Peel Strength))

Each PSA sheet obtained above was cut into a 10 mm wide strip to fabricate a measurement sample. The PET film (release liner) covering its first adhesive face was removed and 50 µm thick PET film with no release treatment was applied to back the PSA sheet.

The surface of the standard EPDM plate as the adherend was cleaned by wiping twice in one direction with IPA-wet cloth.

In a standard environment at 23° C. and 50% RH, the release liner covering the second adhesive face of the sample was removed and the PSA sheet was press-bonded to the standard EPDM plate after cleaned with a 2 kg roller moved back and forth once. This was stored in the standard environment for 20 minutes. Subsequently, in the same environment, 180° peel strength (N/10 mm) was measured at a tensile speed of 50 mm/min, using a universal tensile and compression testing machine (available from Minebea Co., Ltd., system name "Tensile/Compression Tester, TG-1kN"), based on JIS Z0237(2004). Two measurements were taken and their arithmetic average value wad determined.

(Post-Aging to-EPDM Peel Strength (7-Day Peel Strength))

After the measurement sample was press-bonded to the standard EPDM plate, the time stored in the standard environment was changed from 20 minutes to 7 days, but otherwise in the same manner as the measurement of to-EPDM initial peel strength, 180° peel strength (N/10 mm) was measured. Two measurements were taken and their arithmetic average value wad determined.

(Holding Power)

Each PSA sheet obtained above was cut into a 20 mm wide strip to fabricate a measurement sample. The PET film (release liner) covering its first adhesive face was removed and 50 µm thick PET film with no release treatment was applied to back the PSA sheet. Subsequently, the release liner covering the second adhesive face of the sample was removed and the sample was applied at its one end to a stainless steel (SUS) plate as the adherend over a 20 mm wide by 20 mm long bonding area with a 5 kg roller rolled once in one direction. This was stored in a standard environment at 23° C. and 50% RH for 24 hours. Based on JIS Z0237(2004), the SUS plate was then vertically suspended in an environment at 40° C. and a 500 g load was applied to the free end of the sample. After stored with the load applied thereto for two hours in the environment at 40° C., the time taken for the sample to peel from the SUS plate and fall off was measured.

The measurement was taken using two measurement samples for each PSA sheet and their arithmetic average value was determined.

The results are shown in Table 1. The symbol "-" in the column for the peel strength measurement results indicates that the peel strength was not measured. Table 1 also shows the gel fractions measured by the aforementioned method with respect to the PSA layers constituting the PSA sheets according to the respective examples.

TABLE 1

|  |  |  | Ex. | | | | | | | | |
| --- | --- | --- | --- | --- | --- | --- | --- | --- | --- | --- | --- |
|  |  |  | H1 | H2 | H3 | H4 | H5 | H6 | H7 | H8 | H9 |
| Syrup composition (parts) | 2EHA | | 77.9 | 77.9 | 77.9 | 77.9 | 77.9 | 77.9 | 77.9 | 77.9 | 80 |
|  | CHA | | 20.5 | 20.5 | 20.5 | 20.5 | 20.5 | 20.5 | 20.5 | 20.5 | 20 |
|  | DMAEM | | 1.5 | 1.5 | 1.5 | 1.5 | 1.5 | 1.5 | 1.5 | 1.5 | — |
|  | Total | | 99.9 | 99.9 | 99.9 | 99.9 | 99.9 | 99.9 | 99.9 | 99.9 | 100 |
| Oligomer composition (parts) | CHMA | | 70 | 70 | 70 | 70 | 50 | 50 | 50 | 50 | 100 |
|  | DMAEM | | 30 | 30 | 30 | 30 | 50 | 50 | 50 | 50 | — |
|  | Total | | 100 | 100 | 100 | 100 | 100 | 100 | 100 | 100 | 100 |
| Oligomer Mw | | ($\times 10^4$) | 0.5 | 0.5 | 0.5 | 0.5 | 0.5 | 0.5 | 0.5 | 0.5 | 0.5 |
| PSA composition (parts) | Syrup | | 100 | 100 | 100 | 100 | 100 | 100 | 100 | 100 | 100 |
|  | Oligomer | | 20 | 20 | 20 | 20 | 20 | 20 | 20 | 20 | 20 |
|  | Crosslinking agent | TMPTA | 0.12 | 0.12 | — | — | 0.12 | 0.12 | 0.12 | 0.12 | 0.12 |
|  |  | HDDA | — | — | 0.14 | — | — | — | — | — | — |
|  |  | DPHA | — | — | — | 0.13 | — | — | — | — | — |
|  | Initiator | P-02 | 0.30 | — | — | — | — | — | — | — | 0.30 |
|  |  | Irgacure 819 | — | — | — | — | 0.20 | 0.30 | 0.40 | 0.50 | — |
|  |  | Irgacure 651 | — | 0.25 | 0.25 | 0.25 | — | — | — | — | — |
| $m_A/m_T$ | | (%) | 6.3 | 6.3 | 6.3 | 6.3 | 9.6 | 9.6 | 9.6 | 9.6 | — |
| $A_O/A_S$ | | | 4.0 | 4.0 | 4.0 | 4.0 | 6.7 | 6.7 | 6.7 | 6.7 | — |
| $m_C/m_T$ | | (%) | 28.8 | 28.8 | 28.8 | 28.8 | 25.4 | 25.4 | 25.4 | 25.4 | 33.3 |
| $m_A/m_C$ | | | 0.22 | 0.22 | 0.22 | 0.22 | 0.38 | 0.38 | 0.38 | 0.38 | — |
| Gel fraction | | (%) | 45 | 37 | 40 | 35 | 42 | 36 | 30 | 36 | 35 |
| to-EPDM peel strength (initial) 50 mm/min (N/10 mm) | After 20 min | | 5.0 | 7.0 | 6.2 | 6.4 | 7.0 | 9.0 | 18.0 | 9.0 | 3.2 |
| to-EPDM peel strength (aged) 50 mm/min (N/10 mm) | After 7 days | | — | — | — | — | 9.0 | 13.0 | 19.0 | 11.0 | 3.5 |
| Holding power 40° C., 500 g, 2 hr | | | 20 min | 5 min | 12 min | 9 min | 86 min | 27 min | 28 min | 15 min | 6 min |

(Thickness of PSA sheet: 500 μm)

As shown in Table 1, the PSA sheets of Examples H1 to H8 all exhibited to-EPDM initial peel strength values of 5 N/10 mm or greater, showing excellent initial adhesion to EPDM. From comparison of Examples H1 and H2 to H4 and comparison of Examples H5 and H6 to H8, when the gel fraction was 40% or lower, the to-EPDM initial peel strength had a tendency to increase.

In addition, the PSA sheets of Examples H6 to H8 all exhibited to-EPDM initial peel strength values of 7 N/10 mm or greater and also post-aging to-EPDM peel strength values of 10 N/10 mm or greater, showing great adhesion after aged as well.

With respect to the PSA sheets of Examples H5 to H8, their holding time (time taken for their samples to fall in the holding power test) was all 15 minutes or longer, showing their sufficient cohesion for practical use.

Experiment 2

Example K1

To 100 parts of the syrup (h1) prepared in Example H1, were added and mixed 20 parts of the acrylic oligomer (h1), 0.12 part of TMPTA as a crosslinking agent and 0.20 part of bis(2,4,6-trimethylbenzoyl)phenylphosphine oxide (e.g. trade name "IRGACURE 819" available from BASF Japan Ltd.) as a photopolymerization initiator to prepare a PSA composition according to this example.

Two sheets of 38 μm thick polyethylene terephthalate (PET) film were obtained, with one surface of each sheet being a release face that had been treated with a silicone-based release agent. To the release face of the first sheet of PET film, the PSA composition was applied to a thickness of 100 μm after light irradiation. To the PSA composition applied, the second sheet of PET film was laid over and the resultant was irradiated with UV rays to cure the PSA composition and form a PSA layer. UV ray irradiation was performed with a black light (15 W/cm) at an irradiance of 5 mW/cm² (measured with an industrial UV checker (available from Topcon Corporation, trade name "UVR-T1" with light detector model number "UD-T36") with peak sensitivity at 350 nm in wavelength) at a light dose of 1500 mJ/cm². A PSA sheet was thus obtained formed of a PSA layer resulting from UV ray-curing of the PSA composition. The first and second adhesive faces of the PSA sheet are protected with the two sheets of PET film (release liner), respectively.

Example K2

To 100 parts of the syrup (h1) prepared in Example H1, were added and mixed 20 parts of the acrylic oligomer (h1), 0.12 part of TMPTA as a crosslinking agent, 0.4 part of bis(2,4,6-trimethylbenzoyl)phenylphosphine oxide (available from BASF Japan Ltd., trade name "IRGACURE 819") as a photopolymerization initiator and 4 parts of glass balloon to prepare a PSA composition according to this example. As the glass balloon, hollow glass beads (made of borosilicate glass, trade name "SPHERICEL® 25P45," particle diameter range 30 μm to 60 μm, average particle diameter 45 μm, density 0.25 g/cm³) available from Potters-Ballotini Co., Ltd., were used. Using this PSA composition, but otherwise in the same manner as Example K1, a PSA sheet according to this example was obtained.

Example K3

The amount of the glass balloon was changed to 8 parts to 100 parts of the syrup (h1), but otherwise in the same manner as Example K2, a PSA sheet according to this example was obtained.

Example K4

The amount of the glass balloon was changed to 12 parts to 100 parts of the syrup (h1), but otherwise in the same manner as Example K2, a PSA sheet according to this example was obtained.

Example K5

To 100 parts of the syrup (h1) prepared in Example H1, were added and mixed 20 parts of the acrylic oligomer (h1), 0.12 part of TMPTA as a crosslinking agent, 0.4 part of bis(2,4,6-trimethylbenzoyl)phenylphosphine oxide (available from BASF Japan Ltd., trade name "IRGACURE 819") as a photopolymerization initiator and 5 parts of calcium carbonate to prepare a PSA composition according to this example. As the calcium carbonate, heavy calcium carbonate (average particle diameter 3.2 μm, specific surface area 0.7 m²/g) available from Maruo Calcium Co., Ltd., was used. Using this PSA composition, but otherwise in the same manner as Example K1, a PSA sheet according to this example was obtained.

Example K6 to K8

The amounts of calcium carbonate were changed to 10 parts, 15 parts and 20 parts to 100 parts of the syrup (h1), but otherwise in the same manner as Example K5, PSA sheets according to Examples K6 to K8 were obtained, respectively.

Example K9

To 100 parts of the syrup (h1) prepared in Example H1, were added and mixed 20 parts of the acrylic oligomer (h1), 0.12 part of TMPTA as a crosslinking agent, 0.4 part of bis(2,4,6-trimethylbenzoyl)phenylphosphine oxide (available from BASF Japan Ltd., trade name "IRGACURE 819") as a photopolymerization initiator and 12.5 parts of shirasu balloon to prepare a PSA composition according to this example. As the shirasu balloon, trade name "SUPER BALLOON BA-15" (particle diameter range 20 μm to 300 μm, bulk density 0.12 g/cm³ to 0.18 g/cm³) available from Showa Chemical Industry Co., Ltd., was used. Using this PSA composition, but otherwise in the same manner as Example K1, a PSA sheet according to this example was obtained.

[Evaluation of Properties]

In the same manner as Experiment 1, they were tested for to-EPDM initial peel strength, post-aging to-EPDM peel strength and holding power. The results are shown in Table 2.

TABLE 2

| | | | | | | | Ex. | | | | |
|---|---|---|---|---|---|---|---|---|---|---|---|
| | | | K1 | K2 | K3 | K4 | K5 | K6 | K7 | K8 | K9 |
| Syrup composition (parts) | | 2EHA | 77.9 | 77.9 | 77.9 | 77.9 | 77.9 | 77.9 | 77.9 | 77.9 | 77.9 |
| | | CHA | 20.5 | 20.5 | 20.5 | 20.5 | 20.5 | 20.5 | 20.5 | 20.5 | 20.5 |
| | | DMAEM | 1.5 | 1.5 | 1.5 | 1.5 | 1.5 | 1.5 | 1.5 | 1.5 | 1.5 |
| Oligomer composition (parts) | | CHMA | 70 | 70 | 70 | 70 | 70 | 70 | 70 | 70 | 70 |
| | | DMAEM | 30 | 30 | 30 | 30 | 30 | 30 | 30 | 30 | 30 |
| Oligomer Mw | | (×10⁴) | 0.5 | 0.5 | 0.5 | 0.5 | 0.5 | 0.5 | 0.5 | 0.5 | 0.5 |
| PSA composition (parts) | Syrup | | 100 | 100 | 100 | 100 | 100 | 100 | 100 | 100 | 100 |
| | Oligomer | | 20 | 20 | 20 | 20 | 20 | 20 | 20 | 20 | 20 |
| | Filler | Glass balloon | — | 4 | 8 | 12 | — | — | — | — | — |
| | | CaCO₃ | — | — | — | — | 5 | 10 | 15 | 20 | — |
| | | Shirasu balloon | — | — | — | — | — | — | — | — | 12.5 |
| | Crosslinking agent | TMPTA | 0.12 | 0.12 | 0.12 | 0.12 | 0.12 | 0.12 | 0.12 | 0.12 | 0.12 |
| | Initiator | Irgacure 819 | 0.4 | 0.4 | 0.4 | 0.4 | 0.4 | 0.4 | 0.4 | 0.4 | 0.4 |
| $m_A/m_T$ | | (%) | 6.3 | 6.3 | 6.3 | 6.3 | 6.3 | 6.3 | 6.3 | 6.3 | 6.3 |
| $A_O/A_S$ | | | 4.0 | 4.0 | 4.0 | 4.0 | 4.0 | 4.0 | 4.0 | 4.0 | 4.0 |
| $m_C/m_T$ | | (%) | 28.8 | 28.8 | 28.8 | 28.8 | 28.8 | 28.8 | 28.8 | 28.8 | 28.8 |
| $m_A/m_C$ | | | 0.22 | 0.22 | 0.22 | 0.22 | 0.22 | 0.22 | 0.22 | 0.22 | 0.22 |
| Gel fraction | | (%) | 20 | 11 | 12 | 15 | 18 | 14 | 18 | 21 | 22 |
| to-EPDM peel strength (initial) 50 mm/min (N/10 mm) | After 20 min | | 7.3 | 11.4 | 9.9 | 9.9 | 12.5 | 11.5 | 11.5 | 11.5 | 6.8 |
| to-EPDM peel strength (aged) 50 mm/min (N/10 mm) | After 7 days | | 13.0 | 9.8 | 9.0 | 7.0 | 10.7 | 10.4 | 10.1 | 9.5 | 8.6 |
| Holding power 40° C., 500 g, 2 hr | | | 55 min | 7 min | 4 min | 4 min | 12 min | 5 min | 4 min | 3 min | 10 min |

(Thickness of PSA sheet: 100 μm)

As shown in Table 2, the PSA sheets of Examples K1 to K9 all exhibited to-EPDM initial peel strength at or above 5 N/10 mm and post-aging to-EPDM peel strength at or above 7 N/10 mm, showing excellent adhesion to EPDM. Particularly great results were obtained in Examples K2 and K5 to K8.

Experiment 3

[Preparation of PSA Sheets Comprising Bubble-Containing Layers]

Example L1

Fabrication of Bubble-Containing Adhesive Layers

To a monomer mixture consisting of 90 parts of 2EHA and 15 parts of acrylic acid (AA), were added 0.05 part of 2,2-dimethoxy-1,2-diphenylethane-1-one (available from BASF Japan Ltd., "IRGACURE 651") and 0.05 part of 1-hydroxy-cyclohexyl phenyl ketone (available from BASF Japan Ltd., trade name "IRGACURE 184") as photopolymerization initiators. Subsequently, the reaction mixture was irradiated with UV rays to a monomer conversion of 7.0% to prepare syrup (L1) comprising a polymer having a weight average molecular weight (Mw) of 500×10⁴ and unreacted monomers.

To 100 parts of the syrup (L1), were uniformly mixed 0.10 part of dipentaerythritol hexaacrylate (DPHA) (available from Nippon Kayaku Co., Ltd., trade name "KAYARAD DPHA" (97 equivalence of acrylates)) (0.028 mol to 100 mol of monomers), 0.03 part of 2,2-dimethoxy-1,2-diphenylethane-1-one (available from BASF Japan Ltd., "IRGA- CURE 651") as a photopolymerization initiator and 9.0 part of glass balloon (available from Tokai Kogyo Co. Ltd., trade name "CEL-STAR Z-27," specific gravity 0.27) of 45 µm in average particle diameter. The resultant was deaerated. After deaerated, was added 0.7 part of a fluorine-based surfactant (trade name "SURFLON S-393" available from AGC Seimi Chemical Co., Ltd.; an acrylic copolymer having polyoxyethylene and fluorinated hydrocarbon side chains; Mw 8300) to prepare a PSA composition precursor.

Using a device comprising a stator made of a finely toothed disc with a central open hole and a rotor opposing the stator and similarly made of a finely toothed disc, the PSA composition precursor was poured between the teeth on the stator and the teeth on the rotor. While spinning the rotor at a high speed, nitrogen was introduced into the PSA composition precursor via the open hole. By this, bubbles were mixed in the PSA composition precursor to prepare a bubble-containing PSA composition. Bubbles were mixed to about 20% by volume with respect to the total volume of the bubble-containing PSA composition.

Two sheets of 38 µm thick polyethylene terephthalate (PET) film were obtained with one face thereof being a release face treated with a silicone-based release agent. To the bubble-containing PSA composition 2B, was added 0.03 part of "IRGACURE 651" and was further added 0.5 part of an antioxidant (available from BASF Japan Ltd., "IRGANOX 1010") and 0.02 part of pigment (available from Dainichiseika Color and Chemicals Mfg. Co., Ltd., trade name "AT DN101") and mixed. This was applied to the release face of the first sheet of PET film to a thickness of 1.2 mm after light irradiation. To the PSA composition applied, the second sheet of PET film was laid over and the resultant was irradiated with UV rays to cure the bubble-containing PSA composition to form a 1.2 mm thick bubble-containing PSA layer. UV ray irradiation was performed for a time period needed to reach a monomer conversion of 99%, using a black light at an irradiance of 5 mW/cm$^2$ (measured with an industrial UV checker (available from Topcon Corporation, trade name "UVR-T1" with light detector model number "UD-T36") with peak sensitivity at 350 nm in wavelength).

Fabrication of Bubble-Free Adhesive Layers:

A monomer mixture consisting of 37.9 parts of 2EHA, 37.9 parts of n-butyl acrylate (BA), 21.1 parts of CHA and 3.1 parts of DMAEM was subjected to partial photopolymerization in the same manner as Example H1 to obtain syrup (L1) comprising a polymer having a Mw of 70×10$^4$ and unreacted monomers. The monomer conversion was about 30%.

To 100 parts of the syrup (L1), were added and mixed 20 parts of the acrylic oligomer (h1), 0.12 part of TMPTA and 0.30 part of a photopolymerization initiator (trade name "P-02") available from Soken Chemical & Engineering Co., Ltd., to prepare a PSA composition according to this example.

Two sheets of 38 µm thick polyethylene terephthalate (PET) film were obtained, with one surface of each sheet being a release face that had been treated with a silicone-based release agent. To the release face of the first sheet of PET film, the PSA composition was applied to a thickness of 40 µm after light irradiation. To the PSA composition applied, the second sheet of PET film was laid over and the resultant was irradiated with UV rays to cure the PSA composition. UV ray irradiation was performed with a black light (15 W/cm) at an irradiance of 5 mW/cm$^2$ (measured with an industrial UV checker (available from Topcon Corporation, trade name "UVR-T1" with light detector model number "UD-T36") with peak sensitivity at 350 nm in wavelength) at a light dose of 1500 mJ/cm$^2$. A 40 µm thick PSA sheet (L1) was thus obtained. The PSA sheet (L1) is formed of a bubble-free adhesive layer (PSA layer (A)) comprising a monomer A in its monomeric components.

Preparation of PSA Sheet Comprising Bubble-Containing Layer:

To one surface of the bubble-containing adhesive layer (1.2 mm thick) prepared above, the PSA sheet (L1) (40 µm thick) prepared above was adhered. A PSA sheet having a total thickness of about 1.24 mm was thus obtained, comprising a bubble-containing adhesive layer and a bubble-free adhesive layer (PSA layer (A)) overlaid on one face thereof.

Example L2

Fabrication of Bubble-Free Adhesive Layer

A monomer mixture consisting of 91 parts of 2EHA and 9 parts of acrylic acid (AA) was subjected to partial photopolymerization in the same manner as Example H1 to obtain syrup (L2) comprising a polymer having a Mw of 115×10$^4$ and unreacted monomers.

To 100 parts of the syrup (L2), were added and mixed 0.12 part of TMPTA and 0.30 part of a photopolymerization initiator (trade name "P-02") available from Soken Chemical & Engineering Co., Ltd., to prepare a PSA composition according to this example.

This composition was allowed to cure in the same manner as the fabrication of the bubble-free adhesive layer in Example L1 to obtain a 40 µm thick PSA sheet (L2). This PSA sheet (L2) is formed of the bubble-free adhesive layer whose monomeric components are free of a monomer A.

Preparation of PSA Sheet Comprising Bubble-Containing Layer:

To one surface of the bubble-containing adhesive layer (1.2 mm thick) prepared in Example L1, in place of the PSA sheet (L1) prepared in Example L1, the PSA sheet (L2) was adhered. Otherwise in the same manner as Example L1, a PSA sheet having a total thickness of about 1.24 mm was obtained, comprising a bubble-containing adhesive layer and a bubble-free adhesive layer overlaid on one face thereof.

[Evaluation of Properties]

(To-EPDM Initial Peel Strength)

The standard EPDM plate surface was wiped ten times in one direction with IPA-wet cloth and the measurement samples were press-bonded to the standard EPDM plate with a 5 kg roller moved back and forth once. Otherwise in the same manner as Experiment 1, 180° peel strength (N/10 mm) was measured. The measurement was taken twice for each and their arithmetic average value was determined. The results are shown in Table 3.

TABLE 3

| | Ex. | | L1 | L2 |
|---|---|---|---|---|
| Bubble-containing adhesive layer (1.2 mm thick) | Syrup composition (parts) | 2EHA | 90 | 90 |
| | | AA | 10 | 10 |
| | PSA composition (parts) | Syrup | 100 | 100 |
| | Crosslinking agent | DPHA | 0.10 | 0.10 |
| | Initiator | Irgacure 651 | 0.06 | 0.06 |
| | Filler | Z-27 | 9.0 | 9.0 |
| | Surfactant | S-393 | 0.7 | 0.7 |
| | Antioxidant | Irganox 1010 | 0.5 | 0.5 |
| | Pigment | AT DN101 | 0.02 | 0.02 |
| Bubble-free adhesive layer (40 μm thick) | Syrup composition (parts) | 2EHA | 37.9 | 91 |
| | | BA | 37.9 | — |
| | | CHA | 21.1 | — |
| | | DMAEM | 3.1 | — |
| | | AA | — | 9 |
| | Oligomer composition (parts) | CHMA | 70 | — |
| | | DMAEM | 30 | — |
| | Oligomer Mw (×10⁴) | | 0.5 | — |
| | PSA composition (parts) | Syrup | 100 | 100 |
| | | Oligomer | 20 | — |
| | Crosslinking agent | TMPTA | 0.12 | 0.12 |
| | Initiator | P-02 | 0.30 | 0.30 |
| to-EPDM initial peel strength 50 mm/min (N/10 mm) | Cleaned | After 20 min | 20.9 | 8.5 |

As shown in the table, the PSA sheet of Example L1 exhibited high initial peel strength to EPDM. It was also confirmed that clearly at least 10 N/10 mm of to-EPDM peel strength could be obtained even when the standard EPDM plate surface was wiped two times instead of ten times.

The PSA sheet according to Example L1 was further subjected to the following tests. As the adherend, standard EPDM pieces were used. After the adherend surface was cleaned by wiping 10 times in one direction with IPA-wet cloth and the surface of the bubble-free adhesive layer of the PSA sheet according to Example L1 was press-bonded to the cleaned adherend surface. The peel strength was measured after 20 minutes from the press-bonding. The results are shown in Table 4. In Table 4, in the column for "Initial Peel Strength," the values of to-EPDM initial peel strength measured above are shown.

(Peel Strength in Normal State)

Each PSA sheet was cut into a 10 mm wide strip to prepare a measurement sample. The PET film (release liner) covering its first adhesive face (the surface of the bubble-containing adhesive layer) was removed and 50 μm thick PET film with no release treatment was applied to back the PSA sheet. In a standard environment at 23° C. and 50% RH, the release liner covering the second adhesive face (the surface of the bubble-free adhesive layer) of the sample was removed and the PSA sheet was press-bonded to the adherend with a 5 kg roller moved back and forth once. This was stored in the standard environment for 72 hours. Subsequently, in the same environment, 180° peel strength (normal-state peel strength in N/10 mm) was measured at a tensile speed of 50 mm/min, using a universal tensile and compression testing machine (available from Minebea Co., Ltd., system name "Tensile/Compression Tester, TG-1kN"), based on JIS Z0237(2004).

(Peel Strength at High Temperature)

The peel test environment was changed from the standard environment to an environment at 80° C., but otherwise in the same manner as for the normal-state peel strength, 180° peel strength (high-temperature peel strength in N/10 mm) was measured.

(Heat-Resistant Peel Strength)

In the same manner as for the initial peel strength, the PSA sheet was press-bonded to the adherend and the resultant was stored in the standard environment for 72 hours and then in an environment at 80° C. for 7 days. After this was store in the standard environment for one day, 180° peel strength (heat-resistant peel strength in N/10 mm) was measured in the same environment in the same manner as for the initial peel strength.

(Initial Peel Strength at Low Temperature)

In the measurement of initial peel strength, the environment in which the PSA sheet was adherend to the adherend, environment in which it was stored after press-bonded and environment in which the peel strength was measured were changed from the standard environment to an environment at 5° C. Otherwise in the same manner as for the initial peel strength, 180° peel strength (low-temperature initial peel strength in N/10 mm) was measured.

(Peel Strength Upon Storage in Humid Conditions)

In the same manner as for the initial peel strength, the PSA sheet was press-bonded to the adherend and the resultant was stored in the standard environment for 72 hours and then in hot and humid conditions at 50° C. and 98% RH for 7 days. After this was store in the standard environment for one day, 180° peel strength (post-moisturization peel strength in N/10 mm) was measured in the same environment in the same manner as for the initial peel strength.

(Peel Strength Upon Immersion/Storage in Warm Water)

In the same manner as for the initial peel strength, the PSA sheet was press-bonded to the adherend and the resultant was stored in the standard environment for 72 hours and then in water at 40° C. for 7 days. This was removed from water and stored in the standard environment for one say. After this, 180° peel strength (peel strength after warm water immersion in N/10 mm) was measured in the same environment in the same manner as for the initial peel strength.

The respective measurements were carried out twice. Table 4 shows their arithmetic average values.

TABLE 4

| Peel strength tested | Press-bonding temperature | Storage conditions | Measurement temperature | to-EPDM peel strength 50 mm/min (N/10 mm) |
|---|---|---|---|---|
| Initial | 23° C. | Stored at 23° C. for 20 min | 23° C. | 20.9 |
| In normal state | 23° C. | Stored at 23° C. for 72 hr | 23° C. | 20.9 |
| At high temp. | 23° C. | Stored at 23° C. for 72 hr | 80° C. | 10.4 |
| Heat-resistant | 23° C. | Stored at 23° C. for 72 hr then stored at 80° C. for 7 days then stored at 23° C. for 1 day | 23° C. | 27.8# |
| Initial, at low temp. | 5° C. | Stored at 5° C. for 20 min | 5° C. | 22.2 |
| Post-moisturization | 23° C. | Stored at 23° C. for 72 hr then stored at 50° C., 98% RH for 7 days then stored at 23° C. for 1 day | 23° C. | 21.2 |
| Upon immersion in warm water | 23° C. | Stored at 23° C. for 72 hr, then stored/immersed in water at 40° C. for 7 days then stored at 23° C. for 1 day | 23° C. | 20.7 |

*The symbol "#" following a peel strength value indicates cohesive failure.

As shown in the table, it has been confirmed that the PSA sheet according to Example L1 shows excellent adhesion to EPDM under various test conditions.

Experiment 4

[Preparation of PSA Sheets]

Example A1

In a four-neck flask, was placed a monomer mixture consisting of 78 parts of 2-ethylhexyl acrylate (2EHA), 20 parts of n-butyl acrylate (BA) and 2 parts of N-dimethylaminoethyl acrylate (DMAEA) along with 0.05 part 2,2-dimethoxy-1,2-diphenylethane-1-on (available from BASF Corporation, trade name "IRGACURE 651") and 0.05 part of 1-hydroxycyclohexyl phenyl ketone (available from BASF Corporation, trade name "IRGACURE 184"). In a nitrogen atmosphere, the resulting mixture was exposed to UV rays to undergo partial photopolymerization, whereby syrup (a1) was obtained comprising a polymer having a weight average molecular weight (Mw) of $45 \times 10^4$ and unreacted monomers. The conversion of the monomer mixture in this syrup (a1) was about 30%.

To 100 parts of the syrup (a1), were added and mixed 0.10 part of trimethylolpropane triacrylate (TMPTA) and 0.12 part of 2,2-dimethoxy-1,2-diphenylethane-1-on (available from BASF Corporation, trade name "IRGACURE 651") to prepare a PSA composition according to this example.

Two sheets of 38 μm thick polyethylene terephthalate (PET) film were obtained, with one surface of each sheet being a release face that had been treated with a silicone-based release agent. To the release face of the first sheet of PET film, the PSA composition was applied to a thickness of 40 μm after light irradiation. To the PSA composition applied, the second sheet of PET film was laid over and the resultant was irradiated with UV rays to cure the PSA composition and form a PSA layer. UV ray irradiation was performed with a black light (15 W/cm) at an irradiance of 5 mW/cm$^2$ (measured with an industrial UV checker (available from Topcon Corporation, trade name "UVR-T1" with light detector model number "UD-T36") with peak sensitivity at 350 nm in wavelength) at a light dose of 1500 mJ/cm$^2$. A PSA sheet was thus obtained formed of a PSA layer resulting from UV ray-curing of the PSA composition. The first and second adhesive faces of the PSA sheet are protected with the two sheets of PET film (release liner), respectively.

In the PSA layer (PSA sheet), 2.0% of the monomeric components of all polymers in the PSA layer is attributed to the mass of an amino group-containing (meth)acrylate (DMAEA herein). That is, the ratio ($m_A/m_T$) of mass ($m_A$) of amino group-containing (meth)acrylate to mass ($m_T$) of monomeric components of all the polymers is 2.0%.

Example A2

Using a monomer mixture consisting of 76 parts of 2EHA, 20 parts of BA and 4 parts of DMAEA, but otherwise in the same manner as Example A1, syrup (a2) was obtained comprising a polymer having a Mw of $34 \times 10^4$ and unreacted monomers. Using the syrup (a2), a PSA composition was prepared, applied and irradiated with UV rays in the same manner as Example A1 to obtain a PSA sheet according to this example. In the PSA layer (PSA sheet), 4.0% of the monomeric components of all polymers in the PSA layer is an amino group-containing (meth)acrylate (DMAEA herein).

Example A3

Using a monomer mixture comprising 2 parts of N,N-dimethylaminoethyl methacrylate (DMAEM) in place of DMAEA, but otherwise in the same manner as Example A1, syrup (a3) was obtained comprising a polymer having a Mw of $54 \times 10^4$ and unreacted monomers. Using the syrup (a3), a PSA composition was prepared, applied and irradiated with UV rays in the same manner as Example A1 to obtain a PSA sheet according to this example. In the PSA layer (PSA sheet), 2.0% of the monomeric components of all polymers in the PSA layer is an amino group-containing (meth)acrylate (DMAEM herein).

Example A4

Using a monomer mixture consisting of 76 parts of 2EHA, 20 parts of BA, 4 parts of acrylic acid (AA) and 0.15 part of 2-hydroxyethyl acrylate (2HEA), but otherwise in the same manner as Example A1, syrup (a4) was obtained comprising a polymer having a Mw of $115 \times 10^4$ and unreacted monomers. Using the syrup (a4), a PSA composition was prepared, applied and irradiated with UV rays in the same manner as Example A1 to obtain a PSA sheet according to this example.

Example A5

Using a monomer mixture comprising 2 parts of N-acryloylmorpholine (ACMO) in place of DMAEA, but otherwise in the same manner as Example A1, syrup (a5) was obtained comprising a polymer having a Mw of $68 \times 10^4$ and unreacted monomers. Using the syrup (a3), a PSA composition was prepared, applied and irradiated with UV rays in the same manner as Example A1 to obtain a PSA sheet according to this example.

[Evaluation of Properties]
(To-EPDM Peel Strength at Tensile Speed 300 mm/min)

Using a standard EPDM piece described earlier as the adherend, 180° adhesive strength (to-EPDM peel strength) was measured by the following procedure. In particular, each PSA sheet obtained above was cut into a 10 mm wide strip to fabricate a measurement sample. The PET film (release liner) covering its first adhesive face was removed and 25 µm thick PET film with no release treatment was applied to back the PSA sheet. In a standard environment at 23° C. and 50% RH, the release liner covering the second adhesive face of the sample was removed and the PSA sheet was press-bonded to the adherend with a 2 kg roller moved back and forth once. This was stored in the standard environment for a prescribed time period. Subsequently, in the same environment, 180° peel strength (N/10 mm) was measured at a tensile speed of 300 mm/min, using a universal tensile and compression testing machine (available from Minebea Co., Ltd., system name "Tensile/Compression Tester, TG-1kN"), based on JIS Z0237(2004).

The peel strength was measured after 30 minutes and after 7 days from the press-bonding of the PSA sheets for the following two cases: (1) the PSA sheet was press-bonded to the adherend surface as it was (i.e. without the cleaning treatment) and (2) the PSA sheet was press-bonded after the adherend surface was wiped twice in one direction with IPA-wet cloth.

The results are shown in Table 5.

As shown in the table, with respect to the PSA sheets of Examples A1 to A3 obtained using the syrup (polymerization product (a)) as the partially-polymerized product of a monomer mixture comprising an amino group-containing (meth)acrylate (monomer A), their adhesion (peel strength) to EPDM was clearly high as the adherend when compared to the PSA sheets of Examples A4 and A5 with each comprising no monomer A in its monomeric components. More specifically, as compared to Example A4 using AA and 2HEA in place of the monomer A, with or without cleaning treatment, the peel strength was higher both initially (after 30 minutes) and after aged (after 7 days). They also exhibited greater adhesion to EPDM even when compared to Example A5 using an amide group-containing (meth)acrylate (ACMO) in place of the monomer A. In particular, with respect to EPDM after cleaned, more significant effects of the use of the monomer A to improve the adhesion to EPDM was observed.

In Example A3 using DMAEM among monomers A, as compared to Examples A1 and A2 using DMAEA, more preferable results were obtained as its peel strength decreased less with time without cleaning treatment and increased with time with cleaning treatment.

Experiment 5

[Preparation of PSA Sheets]

Example B1

A monomer mixture consisting of 76 parts of 2EHA, 20 parts of BA, 4 parts of AA and 0.15 part of 2HEA was subjected to partial photopolymerization in the same manner as Example A1 to obtain syrup (b1) comprising a polymer having a Mw of $115 \times 10^4$ and unreacted monomers.

To a monomer mixture consisting of 97 parts of cyclohexyl methacrylate (CHMA) and 3 parts of DMAEM, n-dodecyl mercaptan was added and the mixture was purged with nitrogen to remove dissolved oxygen. Subsequently, the mixture was heated to 90° C. and 0.005 part of trade name "PERHEXYL 0" and 0.01 part of trade name "PERHEXYL D" both available from NOF Corporation were added as peroxide-based initiators. This was stirred at 90° C. for one hour, heated to 150° C. over one hour, and stirred at 150° C. for one hour. The mixture was then heated to 170° C. over one hour and stirred at 170° C. for 60 minutes. The

TABLE 5

| | | | Ex. | | | | |
|---|---|---|---|---|---|---|---|
| | | | A1 | A2 | A3 | A4 | A5 |
| Syrup composition (parts) | | 2EHA | 78 | 76 | 78 | 76 | 78 |
| | | BA | 20 | 20 | 20 | 20 | 20 |
| | | DMAEA | 2 | 4 | — | — | — |
| | | DMAEM | — | — | 2 | — | — |
| | | ACMO | — | — | — | — | 2 |
| | | AA | — | — | — | 4 | — |
| | | 2HEA | — | — | — | 0.15 | — |
| | | Total | 100 | 100 | 100 | 100.15 | 100 |
| PSA composition (parts) | Syrup | | 100 | 100 | 100 | 100 | 100 |
| | Crosslinking agent | TMPTA | 0.10 | 0.10 | 0.10 | 0.10 | 0.10 |
| | Initiator | Irgacure 651 | 0.12 | 0.12 | 0.12 | 0.12 | 0.12 |
| $m_A/m_T$ | | (%) | 2.0 | 4.0 | 2.0 | — | — |
| to-EPDM | Not cleaned | After 30 min | 1.8 | 2.2 | 2.7 | 1.0 | 1.8 |
| Peel strength | | After 7 days | 1.5 | 1.7 | 2.5 | 1.4 | 1.0 |
| 300 mm/min | Cleaned | After 30 min | 2.6 | 2.7 | 2.7 | 1.5 | 2.3 |
| (N/10 mm) | | After 7 days | 2.8 | 2.5 | 4.5 | 1.5 | 2.2 |

(Thickness of PSA sheet: 40 µm)

mixture was then placed under reduced pressure at 170° C. and stirred for one hour to remove remaining monomers, whereby an acrylic oligomer (b1) was obtained, having a Mw of $0.2 \times 10^4$.

To 100 parts of the syrup (b1), were added and mixed 20 parts of the oligomer (b1), 0.10 part of TMPTA and 0.10 part of 2,2-dimethoxy-1,2-diphenylethane-1-on (available from BASF Corporation, trade name "IRGACURE 651") to prepare a PSA composition according to this example.

Using this PSA composition, but otherwise in the same manner as Example A1, a PSA sheet according to this example was obtained. In this PSA sheet, the ratio ($m_A/m_T$) of mass ($m_A$) of amino group-containing (meth)acrylate (DMAEM herein) to mass ($m_T$) of monomeric components of all polymers in the PSA layer is 0.5%. The ratio ($m_c/m_T$) of mass ($m_c$) of cycloalkyl (meth)acrylate (CHMA herein) to $m_T$ is 16.2%.

Examples B2 to B5

In preparing the acrylic oligomer (b1), the amount of n-dodecyl mercaptan was adjusted to obtain acrylic oligomers (b2) to (b5) having Mw values shown in Table 6. Using these oligomers (b2) to (b5), but otherwise in the same manner as Example B1, PSA sheets according to Examples B2 to B5 were obtained.

Example B6

Using a monomer mixture consisting of 94 parts of CHMA and 6 parts of DMAEM, but otherwise in the same manner as the preparation of the acrylic oligomer (b1), an acrylic oligomer (b6) was obtained, having a Mw of $0.6 \times 10^4$. Using this oligomer (b6), but otherwise in the same manner as Example B1, a PSA sheet according to this example was obtained.

Example B7

Using a monomer mixture consisting of 91 parts of CHMA and 9 parts of DMAEM, but otherwise in the same manner as the preparation of the acrylic oligomer (b1), an acrylic oligomer (b7) was obtained, having a Mw of $0.63 \times 10^4$. Using this oligomer (b7), but otherwise in the same manner as Example B1, a PSA sheet according to this example was obtained.

Example B8

Using solely CHMA as the monomer, but otherwise in the same manner as the preparation of the acrylic oligomer 1), an acrylic oligomer (b8) was obtained, having a Mw of $0.5 \times 10^4$. Using this oligomer (b8), but otherwise in the same manner as Example B1, a PSA sheet according to this example was obtained.

[Evaluation of Properties]

(To-EPDM Peel Strength at Tensile Speed 300 mm/min)

The respective PSA sheets obtained above were measured for to-EPDM peel strength in the same manner as in Experiment 4.

The results are shown in Table 6.

TABLE 6

| | | | Ex. | | | | | | | |
|---|---|---|---|---|---|---|---|---|---|---|
| | | | B1 | B2 | B3 | B4 | B5 | B6 | B7 | B8 |
| Syrup composition (parts) | | 2EHA | 76 | 76 | 76 | 76 | 76 | 76 | 76 | 76 |
| | | BA | 20 | 20 | 20 | 20 | 20 | 20 | 20 | 20 |
| | | AA | 4 | 4 | 4 | 4 | 4 | 4 | 4 | 4 |
| | | 2HEA | 0.15 | 0.15 | 0.15 | 0.15 | 0.15 | 0.15 | 0.15 | 0.15 |
| | | Total | 100.15 | 100.15 | 100.15 | 100.15 | 100.15 | 100.15 | 100.15 | 100.15 |
| Oligomer composition (parts) | | CHMA | 97 | 97 | 97 | 97 | 97 | 94 | 91 | 100 |
| | | DMAEM | 3 | 3 | 3 | 3 | 3 | 6 | 9 | — |
| | | Total | 100 | 100 | 100 | 100 | 100 | 100 | 100 | 100 |
| Oligomer Mw | | ($\times 10^4$) | 0.2 | 0.3 | 0.54 | 0.7 | 1 | 0.6 | 0.63 | 0.5 |
| PSA composition (parts) | Syrup | | 100 | 100 | 100 | 100 | 100 | 100 | 100 | 100 |
| | Oligomer | | 20 | 20 | 20 | 20 | 20 | 20 | 20 | 20 |
| | Crosslinking agent | TMPTA | 0.10 | 0.10 | 0.10 | 0.10 | 0.10 | 0.10 | 0.10 | 0.10 |
| | Initiator | Irgacure 651 | 0.10 | 0.10 | 0.10 | 0.10 | 0.10 | 0.10 | 0.10 | 0.10 |
| $m_A/m_T$ | | (%) | 0.5 | 0.5 | 0.5 | 0.5 | 0.5 | 1.0 | 1.5 | — |
| $m_C/m_T$ | | (%) | 16.2 | 16.2 | 16.2 | 16.2 | 16.2 | 15.7 | 15.2 | 16.7 |
| $m_A/m_C$ | | | 0.03 | 0.03 | 0.03 | 0.03 | 0.03 | 0.06 | 0.10 | — |
| to-EPDM Peel strength 300 mm/min (N/10 mm) | Not cleaned | After 30 min | 1.8 | 1.7 | 1.3 | 1.5 | 1.1 | 1.7 | 1.0 | 1.1 |
| | | After 7 days | 2.0 | 1.7 | 1.7 | 1.6 | 1.5 | 1.7 | 2.3 | 1.0 |
| | Cleaned | After 30 min | 2.8 | 1.9 | 1.8 | 1.4 | 1.5 | 1.8 | 1.5 | 1.3 |
| | | After 7 days | 2.3 | 3.1 | 2.9 | 2.6 | 2.2 | 2.5 | 2.3 | 1.9 |

(Thickness of PSA sheet: 40 μm)

As shown in the table, with respect to the PSA sheets of B1 to B7 obtained using PSA compositions each prepared by mixing a partially-polymerized product (syrup) of a monomer mixture and an oligomer comprising a monomer A-derived monomer unit, they exhibited greater to-EPDM adhesion, with or without cleaning treatment, as compared to the PSA sheet of Example B8 obtained with the use of a PSA composition free of a monomer A-derived monomer unit. More specifically, the PSA sheets of Examples B1 to B7 exhibited peel strength comparable to or higher than Example B8 initially (after 30 minutes) and clearly higher peel strength than Example B8 when aged (after 7 days). In other words, the effect of the use of monomer A to increase the to-EPDM peel strength was observed even in an initial stage and had a tendency to increase when aged. From comparison of Examples B1 to B5, it is evident that in a Mw range of $0.2 \times 10^4$ or higher, with decreasing Mw of the oligomer used, the effect to increase the to-EPDM peel strength (especially the initial peel strength) had a general tendency to increase.

Experiment 6

[Preparation of PSA Sheets]

Example C1

A monomer mixture consisting of 78 parts of 2EHA, 20 parts of cyclohexyl acrylate (CHA) and 2 parts of DMAEM was subjected to partial photopolymerization in the same manner as Example A1 to obtain syrup (c1) comprising a polymer having a weight average molecular weight (Mw) of $30 \times 10^4$ and unreacted monomers. The conversion of the monomer mixture in the syrup (c1) was about 30%.

To 100 parts of the syrup (c1), were added and mixed 0.16 part of TMPTA and 0.12 part of 2,2-dimethoxy-1,2-diphenylethane-1-on (available from BASF Corporation, trade name "IRGACURE 651") to prepare a PSA composition according to this example. Using this PSA composition, at a light dose of 3000 mJ/cm², but otherwise in the same manner as Example A1, a PSA sheet according to this example was obtained.

In the PSA layer constituting this PSA sheet, the ratio $(m_A/m_T)$ of mass $(m_A)$ of amino group-containing (meth)acrylate (DMAEM herein) to mass $(m_T)$ of all monomeric components is 2.0%. The ratio $(m_C/m_T)$ of mass $(m_C)$ of cycloalkyl (meth)acrylate (CHA herein) to $m_T$ is 20.0%. The ratio $(m_A/m_C)$ of mass $(m_A)$ of amino group-containing (meth)acrylate to mass $(m_C)$ of cycloalkyl (meth)acrylate in the monomeric components of the PSA layer is 0.10.

Example C2

Using a monomer mixture consisting of 97 parts of CHMA and 3 parts of methacrylic acid (MAA), but otherwise in the same manner as the preparation of the acrylic oligomer (b1), an acrylic oligomer (c2) was obtained, having a Mw of $0.35 \times 10^4$.

To 100 parts of the syrup (c1) prepared in Example C1, were added and mixed 20 parts of the oligomer (c2), 0.16 part of TMPTA and 0.10 part of 2,2-dimethoxy-1,2-diphenylethane-1-on (available from BASF Corporation, trade name "IRGACURE 651") to prepare a PSA composition according to this example. Using this PSA composition, but otherwise in the same manner as Example C1, a PSA sheet according to this example was obtained.

Example C3

Using a monomer mixture consisting of 97 parts of CHMA and 3 parts of DMAEM, but otherwise in the same manner as the preparation of the acrylic oligomer (b1), an acrylic oligomer (c3) was obtained, having a Mw of $0.5 \times 10^4$.

To 100 parts of the syrup (c1) prepared in Example C1, were added and mixed 20 parts of the oligomer (c3), 0.16 part of TMPTA and 0.10 part of 2,2-dimethoxy-1,2-diphenylethane-1-on (available from BASF Corporation, trade name "IRGACURE 651") to prepare a PSA composition according to this example. Using this PSA composition, but otherwise in the same manner as Example C1, a PSA sheet according to this example was obtained. In the PSA layer constituting this PSA sheet, the ratio $(m_A/m_T)$ of mass $(m_A)$ of DMAEM to mass $(m_T)$ of monomeric components of all polymers is 2.2%. The ratio $(A_O/A_S)$ of mass $(A_O)$ of oligomer (c3)-derived DMAEM to mass $(A_S)$ of syrup (c1)-derived DMAEM is 0.3.

Example C4

Using a monomer mixture consisting of 70 parts of CHMA and 30 parts of DMAEM, but otherwise in the same manner as the preparation of the acrylic oligomer (b1), an acrylic oligomer (c4) was obtained, having a Mw of $0.5 \times 10^4$.

To 100 parts of the syrup (c1) prepared in Example C1, were added and mixed 20 parts of the oligomer (c4), 0.16 part of TMPTA and 0.12 part of 2,2-dimethoxy-1,2-diphenylethane-1-on (available from BASF Corporation, trade name "IRGACURE 651") to prepare a PSA composition according to this example. Using this PSA composition, but otherwise in the same manner as Example C1, a PSA sheet according to this example was obtained.

To the monomer mixture to obtain the acrylic oligomer (c4) in this example, for 100 parts of monomers, 6 parts of n-dodecyl mercaptan was added. In this and other experiments, when preparing an acrylic oligomer other than the acrylic oligomer (c4), the amount of n-dodecyl mercaptan was adjusted if needed so as to obtain an acrylic oligomer (b) having a desired Mw.

Example C5

Using a monomer mixture consisting of 50 parts of CHMA and 50 parts of DMAEM, but otherwise in the same manner as the preparation of the acrylic oligomer (b1), an acrylic oligomer (c5) was obtained, having a Mw of $0.5 \times 10^4$.

Using this oligomer (c5), but otherwise in the same manner as Example C4, a PSA composition according to this example was prepared. Using this PSA composition, but otherwise in the same manner as Example C1, a PSA sheet according to this example was obtained.

Example C6

A monomer mixture consisting of 76 parts of 2EHA, 20 parts of CHA and 4 parts of DMAEM was used, but otherwise in the same manner as the preparation of the syrup (c1), syrup (c6) was obtained comprising a polymer having a weight average molecular weight (Mw) of $30 \times 10^4$ and unreacted monomers. The monomer conversion was 30%.

To 100 parts of the syrup (c6), were added and mixed 0.16 part of TMPTA and 0.10 part of 2,2-dimethoxy-1,2-diphenylethane-1-on (available from BASF Corporation, trade name "IRGACURE 651") to prepare a PSA composition according to this example. Using this PSA composition, but otherwise in the same manner as Example C1, a PSA sheet according to this example was obtained.

Example C7

To 100 parts of the syrup (c6) prepared in Example C6, were added and mixed 20 parts of the oligomer (c4) prepared in Example C4, 0.16 part of TMPTA and 0.10 part of 2,2-dimethoxy-1,2-diphenylethane-1-on (available from BASF Corporation, trade name "IRGACURE 651") to prepare a PSA composition according to this example. Using this PSA composition, but otherwise in the same manner as Example C1, a PSA sheet according to this example was obtained.

Example C8

Using the oligomer (c5) in place of the oligomer (c4), but otherwise in the same manner as Example C7, a PSA sheet according to this example was obtained.

Example C9

A monomer mixture consisting of 80 parts of 2EHA and 20 parts of CHA was used, but otherwise in the same manner as the preparation of the syrup (c1), syrup (c9) was obtained, comprising a polymer having a weight average molecular weight (Mw) of $30 \times 10^4$ and unreacted monomers. The monomer conversion was 30%.

To 100 parts of the syrup (c9), were added and mixed 20 parts of the oligomer (c2) prepared in Example C2, 0.16 part of TMPTA and 0.12 part of 2,2-dimethoxy-1,2-diphenylethane-1-on (available from BASF Corporation, trade name "IRGACURE 651") to prepare a PSA composition according to this example. Using this PSA composition, but otherwise in the same manner as Example C1, a PSA sheet according to this example was obtained.

[Evaluation of Properties]
(To-EPDM Peel Strength at Tensile Speed 300 mm/min)

The respective PSA sheets obtained above were measured for to-EPDM peel strength in the same manner as in Experiment 4. In this experiment, peel strength was measured just after 30 minutes from the press-bonding, with respect to the adherend cleaned by wiping twice in one direction with IPA-wet cloth.

The results are shown in Table 7.

According to Examples C3, C4, C5, C7 and C8 in each of which both the syrup and oligomer comprised the monomer A as their monomeric components, the to-EPDM peel strength was higher as compared to Example C2 using an oligomer whose monomeric components were free of a monomer A or Examples C1 and C6 using no oligomers. In particular, with respect to Examples C4, C5, C7 and C8 with $A_O/A_S$ at or above 0.5, yet greater to-EPDM peel strength was obtained as compared to Example C3 with $A_O/A_S$ below 0.5. With respect to PSA compositions using the same syrup, according to Examples C4 and C5 with $m_A/m_C$ above 0.20, higher to-EPDM peel strength was obtained as compared with Example C3 with $m_A/m_C$ at or below 0.20. Similarly, with respect to PSA compositions using the same syrup, according to Examples C7 and C8 with a $m_A/m_C$ value above 0.20, higher to-EPDM peel strength was obtained as compared with Example C6 with a $m_A/m_C$ value at or below 0.20.

Experiment 7

[Preparation of PSA Sheets]

Example D1

A monomer mixture consisting of 38.2 parts of 2EHA, 38.2 parts of BA, 21.2 parts of CHA and 2.3 parts of DMAEM was subjected to partial photopolymerization in the same manner as Example A1 to obtain syrup (d1) comprising a polymer having a Mw of $70 \times 10^4$ and unreacted monomers. The monomer conversion was about 30%.

TABLE 7

| | | Ex. | | | | | | | | |
|---|---|---|---|---|---|---|---|---|---|---|
| | | C1 | C2 | C3 | C4 | C5 | C6 | C7 | C8 | C9 |
| Syrup composition (parts) | 2EHA | 78 | 78 | 78 | 78 | 78 | 76 | 76 | 76 | 80 |
| | CHA | 20 | 20 | 20 | 20 | 20 | 20 | 20 | 20 | 20 |
| | DMAEM | 2 | 2 | 2 | 2 | 2 | 4 | 4 | 4 | — |
| | Total | 100 | 100 | 100 | 100 | 100 | 100 | 100 | 100 | 100 |
| Oligomer composition (parts) | CHMA | — | 97 | 97 | 70 | 50 | — | 70 | 50 | 97 |
| | DMAEM | — | — | 3 | 30 | 50 | — | 30 | 50 | — |
| | MAA | — | 3 | — | — | — | — | — | — | 3 |
| | Total | — | 100 | 100 | 100 | 100 | — | 100 | 100 | 100 |
| Oligomer Mw | ($\times 10^4$) | — | 0.35 | 0.5 | 0.5 | 0.5 | — | 0.5 | 0.5 | 0.5 |
| PSA composition (parts) | Syrup | 100 | 100 | 100 | 100 | 100 | 100 | 100 | 100 | 100 |
| | Oligomer | — | 20 | 20 | 20 | 20 | 0 | 20 | 20 | 20 |
| | Crosslinking agent TMPTA | 0.16 | 0.16 | 0.16 | 0.16 | 0.16 | 0.16 | 0.16 | 0.16 | 0.16 |
| | Initiator Irgacure 651 | 0.12 | 0.10 | 0.10 | 0.12 | 0.12 | 0.10 | 0.10 | 0.10 | 0.12 |
| $m_A/m_T$ | (%) | 2.0 | 1.7 | 2.2 | 6.7 | 10.0 | 4.0 | 8.3 | 11.7 | — |
| $A_O/A_S$ | | — | — | 0.3 | 3.0 | 5.0 | — | 1.5 | 2.5 | — |
| $m_C/m_T$ | (%) | 20.0 | 32.8 | 32.8 | 28.3 | 25.0 | 20.0 | 28.3 | 25.0 | 32.8 |
| $m_A/m_C$ | | 0.10 | 0.05 | 0.07 | 0.24 | 0.40 | 0.20 | 0.29 | 0.47 | — |
| to-EPDM Peel strength 300 mm/min (N/10 mm) | Cleand After 30 min | 2.0 | 1.9 | 2.9 | 4.2 | 3.3 | 2.5 | 3.0 | 4.0 | 1.2 |

(Thickness of PSA sheet: 40 μm)

As shown in the table, it was confirmed that according to the PSA sheets of Examples C1 to C8 in each of which at least either its syrup or oligomer comprised a monomer A as its monomeric component, the to-EPDM peel strength was greater as compared to the PSA sheet of Example C9 in which neither included a monomer A in the monomeric components. Example C4 with $m_A/m_T$ above 2.6% produced yet greater to-EPDM peel strength as compared to Example C3 with $m_A/m_T$ at or below 2.6%.

To 100 parts of the syrup (d1), were added and mixed 20 parts of the oligomer (c4) prepared in Example C4, 0.10 part of TMPTA and 0.30 part of a photopolymerization initiator (trade name "P-02") available from Soken Chemical & Engineering Co., Ltd., to prepare a PSA composition according to this example. Using this PSA composition, but otherwise in the same manner as Example A1, a PSA sheet according to this example was obtained.

Examples D2, D3

The amounts of TMPTA to 100 parts of the syrup (d1) were modified to 0.12 part and 0.14 part, but otherwise in the same manner as Example D1, PSA sheets according to Examples D2 and D3 were obtained, respectively.

Examples D4, D5

In place of TMPTA, to 100 parts of the syrup (d1), 0.16 part and 0.18 part of ethylene oxide-modified trimethylolpropane tri(meth)acrylate (available from Osaka Organic Chemical Industry, Ltd., trade name "VISCOAT 360") (TMP-3P) were added, respectively. Otherwise in the same manner as Example D1, PSA sheets according to Examples D4 and D5 were obtained.

Examples D6 to D10

Using the oligomer (c5) prepared in Example C5 in place of the oligomer (c4), but otherwise in the same manner as Examples D1 to D5, PSA sheets according to Examples D6 to D10 were obtained, respectively.

Examples E1 to E10

A monomer mixture consisting of 37.9 parts of 2EHA, 37.9 parts of BA, 21.1 parts of CHA and 3.1 parts of DMAEM was subjected to partial photopolymerization in the same manner as Example A1 to obtain syrup (e1) comprising a polymer having a weight average molecular weight (Mw) of $70 \times 10^4$ and unreacted monomers. The monomer conversion was about 30%.

Using the syrup (e1) in place of the syrup (d1), but otherwise in the same manner as Examples D1 to D10, PSA sheets according to Examples E1 to E10 were obtained, respectively.

The Tg of the syrup (e1) used in Examples E1 to E10 is about −48° C., the Tg of the oligomer (c4) used in Examples E1 to E5 is about 50° C., and the Tg of the oligomer (c5) used in Examples E6 to E10 is about 40° C. The Tg values determined from the compositions of the entire monomeric components constituting the PSA layers of the PSA sheets according to Examples E1 to E10 are around −36° C. to −38° C.

Example E11

A monomer mixture consisting of 40 parts of 2EHA, 40 parts of BA and 20 parts of CHA was subjected to partial photopolymerization in the same manner as Example C1 to obtain syrup (e11) comprising a polymer having a weight average molecular weight (Mw) of $70 \times 10^4$ and unreacted monomers. The monomer conversion was about 30%.

To 100 parts of the syrup (e11), were added and mixed 20 parts of the oligomer (b8) prepared in Example B8, 0.12 part of TMPTA and 0.30 part of a photopolymerization initiator (trade name "P-02") available from Soken Chemical & Engineering Co., Ltd., to prepare a PSA composition according to this example. Using this PSA composition, but otherwise in the same manner as Example A1, a PSA sheet according to this example was obtained.

Examples F1 to F10

A monomer mixture consisting of 37.6 parts of 2EHA, 37.6 parts of BA, 20.9 parts of CHA and 3.8 parts of DMAEM was subjected to partial photopolymerization in the same manner as Example A1 to obtain syrup (f1) comprising a polymer having a weight average molecular weight (Mw) of $70 \times 10^4$ and unreacted monomers. The monomer conversion was about 30%.

Using the syrup (f1) in place of the syrup (d1), but otherwise in the same manner as Examples D1 to D10, PSA sheets according to Examples F1 to F10 were obtained, respectively.

[Evaluation of Properties]

(To-EPDM Peel Strength at Tensile Speed 300 mm/min)

Using a standard EPDM piece described earlier as the adherend, 180° adhesive strength (to-EPDM peel strength) was measured by the following procedure. In particular, each PSA sheet obtained above was cut into a 15 mm wide strip to fabricate a measurement sample. The PET film (release liner) covering its first adhesive face was removed and 25 μm thick PET film with no release treatment was applied to back the PSA sheet. In a standard environment at 23° C. and 50% RH, the release liner covering the second adhesive face of the sample was removed and the PSA sheet was press-bonded to the adherend with a 2 kg roller moved back and forth once. This was stored in the standard environment for a prescribed time period. Subsequently, in the same environment, 180° peel strength (N/15 mm) was measured at a tensile speed of 300 mm/min, using a universal tensile and compression testing machine (available from Minebea Co., Ltd., system name "Tensile/Compression Tester, TG-1kN"), based on JIS Z0237(2004).

In the peel strength measurement, the PSA sheet was press-bonded after the adherend surface was cleaned by wiping twice in one direction with IPA-wet cloth. The peel strength was measured after 20 minutes and after 7 days from the press-bonding.

(Holding Power)

Each PSA sheet obtained above was cut into a 20 mm wide strip to fabricate a measurement sample. The PET film (release liner) covering its first adhesive face was removed and 25 μm thick PET film with no release treatment was applied to back the PSA sheet. Subsequently, the release liner covering the second adhesive face of the sample was removed and the sample was applied at its one end to a stainless steel (SUS) plate as the adherend over a 20 mm wide by 20 mm long bonding area. This was stored in a standard environment at 23° C. and 50% RH for 30 minutes. Based on JIS Z0237(2004), the SUS plate was then vertically suspended in an environment at 40° C. and a 500 g load was applied to the free end of the sample. After stored with the load applied thereto for two hours in the environment at 40° C., the time taken for the sample to peel from the SUS plate and fall off was measured. With respect to a sample that did not fall after two hours, the distance (mm) moved from the initially-adhered location was measured. Two measurements (i.e. n=2) were taken and the average time to fall or the average distance moved after two hours wad determined. When one sample fell, but the other did not, both results were noted.

The results are shown in Table 8 to Table 10. These tables also show the gel fractions measured by the aforementioned method with respect to the PSA layers constituting the PSA sheets according to the respective examples.

TABLE 8

| | | Ex. | | | | | | | | | |
|---|---|---|---|---|---|---|---|---|---|---|---|
| | | D1 | D2 | D3 | D4 | D5 | D6 | D7 | D8 | D9 | D10 |
| Syrup composition (parts) | 2EHA | 38.2 | 38.2 | 38.2 | 38.2 | 38.2 | 38.2 | 38.2 | 38.2 | 38.2 | 38.2 |
| | BA | 38.2 | 38.2 | 38.2 | 38.2 | 38.2 | 38.2 | 38.2 | 38.2 | 38.2 | 38.2 |
| | CHA | 21.2 | 21.2 | 21.2 | 21.2 | 21.2 | 21.2 | 21.2 | 21.2 | 21.2 | 21.2 |
| | DMAEM | 2.3 | 2.3 | 2.3 | 2.3 | 2.3 | 2.3 | 2.3 | 2.3 | 2.3 | 2.3 |
| | Total | 99.9 | 99.9 | 99.9 | 99.9 | 99.9 | 99.9 | 99.9 | 99.9 | 99.9 | 99.9 |
| Oligomer composition (parts) | CHMA | 70 | 70 | 70 | 70 | 70 | 50 | 50 | 50 | 50 | 50 |
| | DMAEM | 30 | 30 | 30 | 30 | 30 | 50 | 50 | 50 | 50 | 50 |
| | Total | 100 | 100 | 100 | 100 | 100 | 100 | 100 | 100 | 100 | 100 |
| Oligomer Mw | (×10$^4$) | 0.5 | 0.5 | 0.5 | 0.5 | 0.5 | 0.5 | 0.5 | 0.5 | 0.5 | 0.5 |
| PSA composition (parts) | Syrup | 100 | 100 | 100 | 100 | 100 | 100 | 100 | 100 | 100 | 100 |
| | Oligomer | 20 | 20 | 20 | 20 | 20 | 20 | 20 | 20 | 20 | 20 |
| | Crosslinking agent TMPTA | 0.10 | 0.12 | 0.14 | — | — | 0.10 | 0.12 | 0.14 | — | — |
| | TMP-3P | — | — | — | 0.16 | 0.18 | — | — | — | 0.16 | 0.18 |
| | Initiator P-02 | 0.30 | 0.30 | 0.30 | 0.30 | 0.30 | 0.30 | 0.30 | 0.30 | 0.30 | 0.30 |
| $m_A/m_T$ | (%) | 6.9 | 6.9 | 6.9 | 6.9 | 6.9 | 10.3 | 10.3 | 10.3 | 10.3 | 10.3 |
| $A_O/A_S$ | | 2.6 | 2.6 | 2.6 | 2.6 | 2.6 | 4.3 | 4.3 | 4.3 | 4.3 | 4.3 |
| $m_C/m_T$ | (%) | 29.4 | 29.4 | 29.4 | 29.4 | 29.4 | 26.0 | 26.0 | 26.0 | 26.0 | 26.0 |
| $m_A/m_C$ | | 0.24 | 0.24 | 0.24 | 0.24 | 0.24 | 0.39 | 0.39 | 0.39 | 0.39 | 0.39 |
| Gel fraction | (%) | 25.5 | 33.9 | 36.9 | 30.8 | 30.3 | 0.3 | 6.5 | 32.4 | 1.5 | 24.8 |
| to-EPDM Peel strength 300 mm/min (N/15 mm) | After 20 min | 2.8 | 2.4 | 2.6 | 2.9 | 2.9 | 3.1 | 2.6 | 2.7 | 2.6 | 2.6 |
| | After 7 days | 3.3 | 2.9 | 3.1 | 3.2 | 3.2 | 3.5 | 3.0 | 2.8 | 3.2 | 3.2 |
| Holding power 40° C., 500 g, 2 hr | | 34 min | 1.7 mm | 0.8 mm | 5.1 mm | 2.1 mm | 5 min | 41 min | 3.3 mm | 18 min | 47 min |

(Thickness of PSA sheet: 40 μm)

TABLE 9

| | | Ex. | | | | | | | | | | |
|---|---|---|---|---|---|---|---|---|---|---|---|---|
| | | E1 | E2 | E3 | E4 | E5 | E6 | E7 | E8 | E9 | E10 | E11 |
| Syrup composition (parts) | 2EHA | 37.9 | 37.9 | 37.9 | 37.9 | 37.9 | 37.9 | 37.9 | 37.9 | 37.9 | 37.9 | 40 |
| | BA | 37.9 | 37.9 | 37.9 | 37.9 | 37.9 | 37.9 | 37.9 | 37.9 | 37.9 | 37.9 | 40 |
| | CHA | 21.1 | 21.1 | 21.1 | 21.1 | 21.1 | 21.1 | 21.1 | 21.1 | 21.1 | 21.1 | 20 |
| | DMAEM | 3.1 | 3.1 | 3.1 | 3.1 | 3.1 | 3.1 | 3.1 | 3.1 | 3.1 | 3.1 | — |
| | Total | 100 | 100 | 100 | 100 | 100 | 100 | 100 | 100 | 100 | 100 | 100 |
| Oligomer composition (parts) | CHMA | 70 | 70 | 70 | 70 | 70 | 50 | 50 | 50 | 50 | 50 | 100 |
| | DMAEM | 30 | 30 | 30 | 30 | 30 | 50 | 50 | 50 | 50 | 50 | — |
| | Total | 100 | 100 | 100 | 100 | 100 | 100 | 100 | 100 | 100 | 100 | 100 |
| Oligomer Mw | (×10$^4$) | 0.5 | 0.5 | 0.5 | 0.5 | 0.5 | 0.5 | 0.5 | 0.5 | 0.5 | 0.5 | 0.5 |
| PSA composition (parts) | Syrup | 100 | 100 | 100 | 100 | 100 | 100 | 100 | 100 | 100 | 100 | 100 |
| | Oligomer | 20 | 20 | 20 | 20 | 20 | 20 | 20 | 20 | 20 | 20 | 20 |
| | Crosslinking agent TMPTA | 0.10 | 0.12 | 0.14 | — | — | 0.10 | 0.12 | 0.14 | — | — | 0.12 |
| | TMP-3P | — | — | — | 0.16 | 0.18 | — | — | — | 0.16 | 0.18 | — |
| | Initiator P-02 | 0.30 | 0.30 | 0.30 | 0.30 | 0.30 | 0.30 | 0.30 | 0.30 | 0.30 | 0.30 | 0.30 |
| $m_A/m_T$ | (%) | 7.6 | 7.6 | 7.6 | 7.6 | 7.6 | 10.9 | 10.9 | 10.9 | 10.9 | 10.9 | — |
| $A_O/A_S$ | | 1.9 | 1.9 | 1.9 | 1.9 | 1.9 | 3.2 | 3.2 | 3.2 | 3.2 | 3.2 | — |
| $m_C/m_T$ | (%) | 29.3 | 29.3 | 29.3 | 29.3 | 29.3 | 25.9 | 25.9 | 25.9 | 25.9 | 25.9 | 33.3 |
| $m_A/m_C$ | | 0.26 | 0.26 | 0.26 | 0.26 | 0.26 | 0.42 | 0.42 | 0.42 | 0.42 | 0.42 | — |
| Gel fraction | (%) | 33 | 32.1 | 42.6 | 33.1 | 34.5 | 0.4 | 12.3 | 33.2 | 0.4 | 31.2 | 35.2 |
| to-EPDM Peel strength 300 mm/min (N/15 mm) | After 20 min | 3.4 | 3.1 | 2.9 | 3.1 | 3.5 | 4.0 | 3.2 | 3.2 | 3.4 | 3.7 | 1.2 |
| | After 7 days | 4.8 | 4.7 | 4.0 | 4.4 | 4.5 | 5.1 | 4.6 | 4.6 | 5.7 | 5.9 | 1.5 |
| Holding power 40° C., 500 g, 2 hr | | 8.4 mm 42 min | 3.0 mm | 0.7 mm | 10.4 mm 50 min | 1.2 mm | 7 min | 36 min | 1.9 mm | 6 min | 40 min | 1.2 mm |

(Thickness of PSA sheet: 40 μm)

TABLE 10

| | | Ex. | | | | | | | | | |
|---|---|---|---|---|---|---|---|---|---|---|---|
| | | F1 | F2 | F3 | F4 | F5 | F6 | F7 | F8 | F9 | F10 |
| Syrup composition (parts) | 2EHA | 37.6 | 37.6 | 37.6 | 37.6 | 37.6 | 37.6 | 37.6 | 37.6 | 37.6 | 37.6 |
| | BA | 37.6 | 37.6 | 37.6 | 37.6 | 37.6 | 37.6 | 37.6 | 37.6 | 37.6 | 37.6 |
| | CHA | 20.9 | 20.9 | 20.9 | 20.9 | 20.9 | 20.9 | 20.9 | 20.9 | 20.9 | 20.9 |
| | DMAEM | 3.8 | 3.8 | 3.8 | 3.8 | 3.8 | 3.8 | 3.8 | 3.8 | 3.8 | 3.8 |
| | Total | 99.9 | 99.9 | 99.9 | 99.9 | 99.9 | 99.9 | 99.9 | 99.9 | 99.9 | 99.9 |
| Oligomer composition (parts) | CHMA | 70 | 70 | 70 | 70 | 70 | 50 | 50 | 50 | 50 | 50 |
| | DMAEM | 30 | 30 | 30 | 30 | 30 | 50 | 50 | 50 | 50 | 50 |
| | Total | 100 | 100 | 100 | 100 | 100 | 100 | 100 | 100 | 100 | 100 |
| PSA composition (parts) | Syrup | 100 | 100 | 100 | 100 | 100 | 100 | 100 | 100 | 100 | 100 |
| | Oligomer | 20 | 20 | 20 | 20 | 20 | 20 | 20 | 20 | 20 | 20 |
| | Crosslinking agent TMPTA | 0.10 | 0.12 | 0.14 | — | — | 0.10 | 0.12 | 0.14 | — | — |
| | TMP-3P | — | — | — | 0.16 | 0.18 | — | — | — | 0.16 | 0.18 |
| | Initiator P-02 | 0.30 | 0.30 | 0.30 | 0.30 | 0.30 | 0.30 | 0.30 | 0.30 | 0.30 | 0.30 |
| $m_A/m_T$ | (%) | 8.2 | 8.2 | 8.2 | 8.2 | 8.2 | 11.5 | 11.5 | 11.5 | 11.5 | 11.5 |
| $A_O/A_S$ | | 1.6 | 1.6 | 1.6 | 1.6 | 1.6 | 2.6 | 2.6 | 2.6 | 2.6 | 2.6 |
| $m_C/m_T$ | (%) | 29.1 | 29.1 | 29.1 | 29.1 | 29.1 | 25.8 | 25.8 | 25.8 | 25.8 | 25.8 |
| $m_A/m_C$ | | 0.28 | 0.28 | 0.28 | 0.28 | 0.28 | 0.45 | 0.45 | 0.45 | 0.45 | 0.45 |
| Gel fraction | (%) | 28.1 | 33 | 41.9 | 29.4 | 36.7 | 0.4 | 12.2 | 34.4 | 1.6 | 30 |
| to-EPDM Peel strength 300 mm/min [N/15 mm] | After 20 min | 2.4 | 2.4 | 2.8 | 3.4 | 2.6 | 2.8 | 3.0 | 2.6 | 3.0 | 2.9 |
| | After 7 days | 3.7 | 3.9 | 4.4 | 5.0 | 3.5 | 3.7 | 3.9 | 3.6 | 4.4 | 4.2 |
| Holding power 40° C., 500 g, 2 hr | | 5.5 mm | 1.2 mm | 0.6 mm | 3.9 mm | 0.8 mm | 10 min | 46 min | 1.3 mm | 26 min | 4.1 mm |

(Thickness of PSA sheet: 40 μm)

As shown in Table 8 to Table 10, with respect to the PSA sheet of Examples D1 to D10, E1 to E10 and F1 to F10 each comprising a monomer A as a monomeric component of the acrylic polymer in the adhesive layer, clearly high to-EPDM peel strength was produced both initially (after 20 minutes) and after aged (after 7 days) as compared with the PSA sheet of Example E11 not including a monomer A in its monomeric components. From the results shown in these table, in view of the cohesion (holding power) of the PSA, it can be seen that the gel fraction is preferably 25% or higher, or more preferably 30% or higher.

Experiment 8

[Preparation of PSA Sheets]

Example G1

A monomer mixture consisting of 79 parts of 2EHA, 20.3 parts of CHA and 0.8 part of DMAEM was subjected to partial photopolymerization in the same manner as Example A1 to obtain syrup (g1) comprising a polymer having a weight average molecular weight (Mw) of $30 \times 10^4$ and unreacted monomers. The monomer conversion was about 30%.

To 100 parts of the syrup (g1), were added and mixed 20 parts of the oligomer (c4) prepared in Example C4, 0.10 part of TMPTA and 0.30 part of a photopolymerization initiator (trade name "P-02") available from Soken Chemical & Engineering Co., Ltd., to prepare a PSA composition according to this example. Using this PSA composition, but otherwise in the same manner as Example A1, a PSA sheet according to this example was obtained.

Example G2

Using a monomer mixture consisting of 50 parts of CHMA, 20 parts of isobornyl methacrylate (IBXMA) and 30 parts of DMAEM, but otherwise in the same manner as the preparation of the acrylic oligomer (b1), an acrylic oligomer (g2) was obtained, having a Mw of $0.5 \times 10^4$. Using the oligomer (g2) in place of the oligomer (c4), but otherwise in the same manner as Example G1, a PSA sheet according to this example was obtained.

Example G3

Using a monomer mixture consisting of 15 parts of CHMA, 35 parts of IBXMA and 50 parts of DMAEM, but otherwise in the same manner as the preparation of the acrylic oligomer (b1), an acrylic oligomer (g3) was obtained, having a Mw of $0.5 \times 10^4$. Using the oligomer (g3) in place of the oligomer (c4), but otherwise in the same manner as Example G1, a PSA sheet according to this example was obtained.

Example G4

Using the oligomer (c5) prepared in Example C5 in place of the oligomer (c4) prepared in Example C4, but otherwise in the same manner as Example G1, a PSA sheet according to this example was obtained.

[Evaluation of Properties]

(To-EPDM Peel Strength at Tensile Speed 300 mm/min)

The respective PSA sheets obtained above were measured for to-EPDM peel strength in the same manner as in Experiment 4.

The peel strength was measured after 20 minutes and after 7 days from the press-bonding of the PSA sheets for the following two cases: (1) the PSA sheet was press-bonded to the adherend surface as it was (i.e. without the cleaning treatment) and (2) the PSA sheet was press-bonded after the adherend surface was wiped twice in one direction with IPA-wet cloth.

The results are shown in Table 11.

TABLE 11

| | | Ex. | | | |
|---|---|---|---|---|---|
| | | G1 | G2 | G3 | G4 |
| Syrup composition (parts) | 2EHA | 79 | 79 | 79 | 79 |
| | CHA | 20.3 | 20.3 | 20.3 | 20.3 |
| | DMAEM | 0.8 | 0.8 | 0.8 | 0.8 |
| | Total | 100.1 | 100.1 | 100.1 | 100.1 |
| Oligomer composition (parts) | CHMA | 70 | 50 | 15 | 50 |
| | IBXMA | — | 20 | 35 | — |
| | DMAEM | 30 | 30 | 50 | 50 |
| | Total | 100 | 100 | 100 | 100 |
| Oligomer Mw | ($\times 10^4$) | 0.5 | 0.5 | 0.5 | 0.5 |
| PSA composition (parts) | Syrup | 100 | 100 | 100 | 100 |
| | Oligomer | 20 | 20 | 20 | 20 |
| | Crosslinking agent TMPTA | 0.10 | 0.10 | 0.10 | 0.10 |
| | Initiator P-02 | 0.30 | 0.30 | 0.30 | 0.30 |
| $m_A/m_T$ | (%) | 5.7 | 5.7 | 9.0 | 9.0 |
| $A_O/A_S$ | | 7.5 | 7.5 | 12.5 | 12.5 |
| $m_C/m_T$ | (%) | 28.6 | 28.6 | 25.2 | 25.2 |
| $m_A/m_C$ | | 0.20 | 0.20 | 0.36 | 0.36 |
| to-EPDM Peel strength 300 mm/min (N/15 mm) | Not cleaned After 20 min | 3.2 | 2.8 | 4.4 | 2.0 |
| | After 7 days | 3.2 | 3.0 | 3.6 | 2.3 |
| | Cleaned After 20 min | 4.5 | 3.7 | 5.1 | 2.3 |
| | After 7 days | 3.0 | 3.2 | 15.5# | 2.8 |

(Thickness of PSA sheet: 40 μm)
*The symbol "#" following a peel strength value indicates cohesive failure.

As shown in the table, the PSA sheets of Examples G2 and G3 each using a copolymer of CHMA, IBXMA and a monomer A showed great adhesion to EPDM, comparable to the PSA sheets of Examples G1 and G4 each using a copolymer of CHMA and a monomer A as the oligomer. In particular, the results of Example G3 suggests that the use of an oligomer having a copolymer composition comprising IBXMA and a monomer A can bring about a PSA sheet that exhibits particularly excellent to-EPDM peel strength.

Experiment 9

[Preparation of PSA Sheets]

Examples J1 to J4

PSA compositions according to Examples E2, E5, E7 and E10 were used and the PSA compositions were applied each to a thickness of 50 μm after light irradiation, but otherwise in the same manner as Example D1, PSA sheets according to Examples J1, J2, J3 and J4 were obtained.

Example J5

To 100 parts of the syrup (e11) prepared in Example E11, were added and mixed 20 parts of the oligomer (c4) prepared in Example C4, 0.12 part of TMPTA and 0.30 part of a photopolymerization initiator (trade name "P-02") available from Soken Chemical & Engineering Co., Ltd., to prepare a PSA composition according to this example. Using this PSA composition, but otherwise in the same manner as Example J1, a PSA sheet according to this example was obtained.

Example J6

The PSA composition according to Example E11 was used and the PSA composition was applied to a thickness of 50 μm after light irradiation, but otherwise in the same manner as Example D1, a PSA sheet according to this example was obtained.

The PSA sheets obtained above were measured for peel strength to various adherends.

(To-EPDM Peel Strength)

Using a standard EPDM piece described earlier as the adherend, 180° adhesive strength (to-EPDM peel strength) was measured by the following procedure. In particular, each PSA sheet obtained above was cut into a 10 mm wide strip to fabricate a measurement sample. The PET film (release liner) covering its first adhesive face was removed and 25 μm thick PET film with no release treatment was applied to back the PSA sheet. In a standard environment at 23° C. and 50% RH, the release liner covering the second adhesive face of the sample was removed and the PSA sheet was press-bonded to the adherend with a 2 kg roller moved back and forth once. This was stored in the standard environment for a prescribed time period. Subsequently, in the same environment, 180° peel strength (N/10 mm) was measured at a tensile speed of 300 mm/min, using a universal tensile and compression testing machine (available from Minebea Co., Ltd., system name "Tensile/Compression Tester, TG-1kN"), based on JIS Z0237(2004).

In the peel strength measurement, the PSA sheet was press-bonded after the adherend surface was cleaned by wiping twice in one direction with IPA-wet cloth. The peel strength was measured after 7 days from the press-bonding.

(To-PP Peel Strength)

As the adherend, a polypropylene plate (PP plate) available from Shin-Kobe Electric Machinery Co., Ltd., was used. In the cleaning treatment before press-bonding, ethanol was used in place of IPA and the wiping with the ethanol was performed twice in one direction. Otherwise in the same manner as the to-EPDM peel strength measurement, the other adhesive face of the measurement sample was press-bonded to the adherend. After 20 minutes and after 7 days from the press-bonding, 180° peel strength (N/10 mm) was measured at a tensile speed of 300 mm/min in the same manner as the to-EPDM peel strength measurement.
(To-ABS Peel Strength)

As the adherend, an acrylonitrile-butadiene-styrene copolymer resin plate (ABS plate) available from Shin-Kobe Electric Machinery Co., Ltd., was used, but otherwise in the same manner as the to-PP peel strength measurement, 180° peel strength (N/10 mm) after 20 minutes and after 7 days from the press-bonding was measured.
(To-PS Peel Strength)

As the adherend, a high-density polystyrene plate (PS plate) available from PR Topla, Ltd., was used, but otherwise in the same manner as the to-PP peel strength measurement, 180° peel strength (N/10 mm) after 20 minutes and after 7 days from the press-bonding was measured.

The results are shown in Table 12.

TABLE 12

| | | J1 | J2 | J3 | J4 | J5 | J6 |
|---|---|---|---|---|---|---|---|
| Syrup composition (parts) | 2EHA | 37.9 | 37.9 | 37.9 | 37.9 | 40 | 40 |
| | BA | 37.9 | 37.9 | 37.9 | 37.9 | 40 | 40 |
| | CHA | 21.1 | 21.1 | 21.1 | 21.1 | 20 | 20 |
| | DMAEM | 3.1 | 3.1 | 3.1 | 3.1 | — | — |
| | Total | 100 | 100 | 100 | 100 | 100 | 100 |
| Oligomer composition (parts) | CHMA | 70 | 70 | 50 | 50 | 70 | 100 |
| | DMAEM | 30 | 30 | 50 | 50 | 30 | — |
| | Total | 100 | 100 | 100 | 100 | 100 | 100 |
| Oligomer Mw (×10⁴) | | 0.5 | 0.5 | 0.5 | 0.5 | 0.5 | 0.5 |
| PSA composition (parts) | Syrup | 100 | 100 | 100 | 100 | 100 | 100 |
| | Oligomer | 20 | 20 | 20 | 20 | 20 | 20 |
| | Crosslinking agent | TMPTA | 0.12 | — | 0.12 | — | 0.12 | 0.12 |
| | | TMP-3P | — | 0.18 | — | 0.18 | — | — |
| | Initiator | P-02 | 0.30 | 0.30 | 0.30 | 0.30 | 0.30 | 0.30 |
| $m_A/m_T$ | (%) | 7.6 | 7.6 | 10.9 | 10.9 | 5.0 | — |
| $A_O/A_S$ | | 1.9 | 1.9 | 3.2 | 3.2 | — | — |
| $m_C/m_T$ | (%) | 29.3 | 29.3 | 25.9 | 25.9 | 28.3 | 33.3 |
| $m_A/m_C$ | | 0.26 | 0.26 | 0.42 | 0.42 | 0.18 | — |
| Peel strength 300 mm/min (N/10 mm) | to-EPDM | After 7 days | 3.8 | 2.6 | 10.4 | 13.8# | 2.5 | 1.5 |
| | to-PP | After 20 min | 5.3 | 4.0 | 3.9 | 3.4 | 3.8 | 2.1 |
| | | After 7 days | 5.8 | 4.8 | 4.1 | 3.6 | 4.4 | 3.3 |
| | to-ABS | After 20 min | 4.9 | 4.6 | 5.4 | 5.0 | 4.5 | 3.8 |
| | | After 7 days | 6.8 | 6.0 | 8.6 | 7.0 | 5.2 | 4.5 |
| | to-PS | After 20 min | 6.3 | 5.5 | 5.9 | 5.3 | 5.1 | 3.2 |
| | | After 7 days | 9.4 | 8.4 | 8.7 | 8.1 | 7.5 | 4.8 |

(Thickness of PSA sheet: 50 μm)
*The symbol "#" following a peel strength value indicates cohesive failure.

As shown in the table, the PSA sheets of Examples J1 to J5 obtained from PSA compositions comprising a monomer A in their monomeric components were clearly superior in to-EPDM peel strength as compared to the PSA sheet of Example J6 obtained from a PSA composition comprising no monomer A in its monomeric components. These PSA sheets of Examples J1 to J5 also showed great adhesion to a polyolefin (polypropylene herein) being a low-polar material. It also exhibited high peel strength relative to the ABS plate and polystyrene plate. As described here, the PSA sheets of Examples J1 to J5 exhibited excellent adhesion to various types of adherend due to their improved adhesion to low-polar surfaces. Among Examples J1 to J4 obtained from PSA compositions in each of which both the syrup and oligomer included the monomer A in their monomeric components, there was a tendency to produce even greater results as compared to Example J5 obtained from a PSA composition in which just one of the syrup and oligomer comprised the monomer A in its monomeric components.

Experiment 10

[Preparation of PSA Sheets Comprising Bubble-Containing Layers]

Example M1

The PSA composition was applied to a thickness of 90 μm after light irradiation, but otherwise in the same manner as Example E2, a PSA sheet consisting of a bubble-free layer was prepared. The PSA sheet was adhered to one surface of the 12 mm thick bubble-containing adhesive layer prepared in Example L1. A PSA sheet having a total thickness of about 1.29 mm was thus obtained, having a bubble-containing adhesive layer and a bubble-free adhesive layer (PSA layer (A)) overlaid on one face thereof. The PSA sheet according to Example M1 was subjected to the following evaluation of properties.

[Evaluation of Properties]

Each PSA sheet was cut into a 10 mm wide strip to prepare a measurement sample. The PET film (release liner) covering its first adhesive face (the surface of the bubble-containing adhesive layer) was removed and 50 μm thick PET film with no release treatment was applied to back the PSA sheet. In a standard environment at 23° C. and 50% RH, the release liner covering the second adhesive face (the surface of the bubble-free adhesive layer) of the measurement sample was removed and the PSA sheet was press-bonded to the adherend with a 2 kg roller moved back and forth three times.

As the adherend, a standard EPDM piece was used. The back face of the adherend was lightly wiped with IPA-wet cloth and the back face was fixed via double-coated tape to a PP plate to fabricate an adherend unit. The adherend unit was stored in an environment at a prescribed temperature to condition the adherend to the prescribed temperature (adherend temperature); and the measurement sample was press-bonded immediately after the adherend unit was removed and placed in the standard environment without cleaning the adherend surface (surface subject to adhesion). The adherend temperature was 0° C., 23° C., 60° C., 80° C., 120° C. or 150° C. The storage time was about two minutes.

The measurement sample press-bonded to the adherend was stored in the standard environment for 72 hours. Subsequently, in the same environment, 180° peel strength (N/10 mm) was measured at a tensile speed of 50 mm/min, using a universal tensile and compression testing machine (available from Minebea Co., Ltd., system name "Tensile/Compression Tester, TG-1kN"), based on JIS Z0237(2004). The results are shown in Table 13.

TABLE 13

| Press-bonding Temperature | Adherend Temperature | Measurement Temperature | To-EPDM peel strength at 50 mm/min (N/10 mm) |
|---|---|---|---|
| 23° C. | 0° C. | 23° C. | 5.7 |
| 23° C. | 23° C. | 23° C. | 5.6 |
| 23° C. | 60° C. | 23° C. | 6.0 |
| 23° C. | 80° C. | 23° C. | 9.4 |
| 23° C. | 120° C. | 23° C. | 9.9 |
| 23° C. | 150° C. | 23° C. | 10.1 |

As shown in the table, it was found that when the PSA sheet was applied to the adherend heated to a temperature above ordinary temperature, the peel strength tended to further increase. Particularly great results were obtained at or above 75° C. of adherend temperature.

Although specific embodiments of the present invention have been described in detail above, these are merely for illustrations and do not limit the scope of the claims. The art according to the claims includes various modifications and changes made to the specific embodiments illustrated above.

As evident from the description above, matters disclosed by this description include the following.
(1a) A PSA sheet,
with at least one surface thereof being formed as an adhesive face,
the at least one surface being a surface of an acrylic PSA layer comprising an acrylic polymer,
the acrylic polymer comprising an amino group-containing (meth)acrylate as its monomeric component, and
the PSA sheet comprising at least one bubble-containing layer.
(2a) The PSA sheet according to (1a) above, comprising a support layer that includes the bubble-containing layer and the acrylic PSA layer supported with the support layer.
(3a) The PSA sheet according to (1a) or (2a) above, having, as the bubble-containing layer, a bubble-containing adhesive layer formed of a PSA including bubbles.
(4a) The PSA sheet according to any of (1a) to (3a) above, having, as the bubble-containing layer, a foam sheet that comprises a foam body layer formed with a plastic foam body.
(5a) The PSA sheet according to any of (1a) to (4a), having a 10% compression hardness of 0.01 Pa to 0.07 Pa.
(6a) The PSA sheet according to any of (1a) to (5a), having a breaking strength of 0.3 Pa to 2.5 Pa.

As evident from the description above, matters disclosed by this description further include the following.
(1b) A PSA sheet to be applied to a surface formed of an olefinic rubber material,
the PSA sheet having an adhesive face to be applied to the surface formed of the olefinic rubber material,
the adhesive face being a surface of an acrylic PSA layer comprising an acrylic polymer, and
the acrylic polymer comprising an amino group-containing (meth)acrylate as its monomeric component.
(2b) The PSA sheet for application to olefinic rubber according to (1b) above, wherein the amino group-containing (meth)acrylate is included at a ratio higher than 2.6% by mass of monomeric components of all polymers in the acrylic PSA layer.
(3b) The PSA sheet for application to olefinic rubber according to (1b) or (2b) above, wherein
the acrylic PSA layer is a layer formed with an acrylic PSA composition,
the acrylic PSA composition comprises a polymerization product (a) of a monomer mixture comprising an acyclic alkyl (meth)acrylate, and
the monomer mixture includes the amino group-containing (meth)acrylate at a ratio higher than 0.2% by mass or the monomer mixture.
(4b) The PSA sheet for application to olefinic rubber according to any one of (1b) to (3b) above, wherein
the acrylic PSA layer is a layer formed with an acrylic PSA composition,
the acrylic PSA composition comprises a polymerization product (a) of a monomer mixture comprising an acyclic alkyl (meth)acrylate and an acrylic oligomer (b) having a weight average molecular weight of $2 \times 10^4$ or less, and
at least either the polymerization product (a) or the acrylic oligomer (b) comprises the amino group-containing (meth)acrylate as its monomeric component.
(5b) The PSA sheet for application to olefinic rubber according to (4b) above, wherein each of the polymerization product (a) and the acrylic oligomer (b) comprises the amino group-containing (meth)acrylate as its monomeric component.
(6b) A PSA sheet-bearing part comprising
a part having a surface formed of an olefinic rubber material, and
a PSA sheet of which at least one surface is formed as an adhesive face,
the adhesive face being adhered to the surface formed of the olefinic rubber material,
the adhesive face being a surface of an acrylic PSA layer comprising an acrylic polymer, and
the acrylic polymer comprising an amino group-containing (meth)acrylate as its monomeric component.
(7b) The PSA sheet-bearing part according to (6b) above, wherein the adhesive face is directly adhered to the surface formed of the olefinic rubber material.
(8b) The PSA sheet-bearing part according to (6b) or (7b) above, wherein the olefinic rubber material comprises an ethylene-propylene-diene rubber as a primary polymer component.
(9b) The PSA sheet-bearing part according to any of (6b) to (8b) above, wherein the olefinic rubber material comprises carbon black.
(10b) The PSA sheet-bearing part according to any of (6b) to (9b) above, wherein the part having the surface formed of the olefinic rubber material is a weather strip.
(11b) A method for producing a PSA sheet-bearing part, the method comprising
a step of obtaining a molded olefinic rubber body having a surface formed of an olefinic rubber material,
a step of obtaining a PSA sheet in which at least one surface is formed as an adhesive face, and
a step of applying the adhesive face to the surface formed of the olefinic rubber material, wherein the adhesive face is a surface of an acrylic PSA layer comprising an acrylic polymer, and the acrylic polymer comprises an amino group-containing (meth)acrylate as its monomeric component.

(12b) The method according to (11b), wherein, in the step of applying the adhesive face, the adhesive face is directly applied to the surface formed of the olefinic rubber material.

(13b) The method according to (11b) or (12b), wherein the surface formed of the olefinic rubber material is subjected to cleaning treatment by which a cleaning liquid comprising an organic solvent is allowed to make contact with the surface and the adhesive face is directly applied to the cleaned surface.

(14b) The method according to any of (11b) to (13b), wherein the step of applying the adhesive face is carried out at ordinary temperature.

(15b) The method according to any of (11b) to (14b), wherein the molded olefinic rubber body is a weather strip.

REFERENCE SIGNS LIST 1, 2, 3, 5, 10, 20, 30, 40 PSA sheets
21 first PSA layer (acrylic PSA layer)
21A first adhesive face
21B second adhesive face
22 second PSA layer
22A second adhesive face
23 intermediate layer
31 backside layer
50, 500 PSA sheet-bearing parts
52 door weather strip (part)
52A surface (surface subject to adhesion)
60 door panel
60A surface
121 bubble-containing adhesive layer (bubble-containing layer)
121A first adhesive face
121B second adhesive face
221 first PSA layer (bubble-free layer)
221A first adhesive face
222 second PSA layer (bubble-free layer)
222A second adhesive face
223 intermediate layer (bubble-containing layer, support layer)
321 first PSA layer (bubble-free layer)
321A first adhesive face
322 second PSA layer (bubble-containing layer, support layer)
322A second adhesive face
421 PSA layer (bubble-free layer)
421A adhesive face
431 backside layer (bubble-containing layer, support layer)

The invention claimed is:

1. A pressure-sensitive adhesive sheet having an adhesive face,
the adhesive face being formed of an acrylic pressure-sensitive adhesive layer comprising an acrylic polymer,
the acrylic pressure-sensitive adhesive layer is a layer formed with an acrylic pressure-sensitive adhesive composition,
the acrylic pressure-sensitive adhesive composition comprises:
a polymerization product (a) of a monomer mixture comprising an acyclic alkyl (meth)acrylate, the polymerization product (a) comprises the acrylic polymer; and
an acrylic oligomer (b) having a weight average molecular weight of $2 \times 10^4$ or less, and
wherein each of the polymerization product (a) and the acrylic oligomer (b) comprises an amino group-containing (meth)acrylate as monomer A as a monomeric component,
wherein $1.0 (A_O/A_S) \leq 10$, where $A_O$ represents the mass of monomer A included as a monomeric component of the acrylic oligomer (b), and $A_S$ represents the mass of monomer A included as a monomeric component of the polymerization product (a), and
the pressure-sensitive adhesive sheet having a peel strength of 5 N/10 mm or greater, the peel strength is measured such that the adhesive face is directly adhered to an ethylene-propylene-diene rubber surface and after 20 minutes, peeled in the 180° direction at a tensile speed of 50 mm/min.

2. The pressure-sensitive adhesive sheet according to claim 1, comprising a support layer comprising a bubble-containing layer, and the acrylic pressure-sensitive adhesive layer supported with the support layer.

3. The pressure-sensitive adhesive sheet according to claim 1, having a 10% compression hardness of 0.01 Pa to 0.07 Pa.

4. The pressure-sensitive adhesive sheet according to claim 1, having a breaking strength of 0.3 Pa to 2.5 Pa.

5. The pressure-sensitive adhesive sheet according to claim 1, having an overall thickness of 0.05 mm to 10 mm.

6. The pressure-sensitive adhesive sheet according to claim 1, wherein the amino group-containing (meth)acrylate is included at a ratio higher than 2.6% by mass of monomeric components of all polymers in the acrylic pressure-sensitive adhesive layer.

7. The pressure-sensitive adhesive sheet according to claim 1, wherein
the monomer mixture includes the amino group-containing (meth)acrylate at a ratio higher than 0.2% by mass of the monomer mixture.

8. The pressure-sensitive adhesive sheet according to claim 1, wherein the glass transition temperature determined by the Fox equation from the composition of all the monomeric components of the pressure-sensitive adhesive composition is −60° C. or higher, but −10° C. or lower.

9. The pressure-sensitive adhesive sheet according to claim 2, wherein the bubble-containing layer is a layer that is adhesive at ordinary temperature.

10. The pressure-sensitive adhesive sheet according to claim 9, wherein the bubble-containing layer is an acrylic pressure-sensitive adhesive layer.

11. A pressure-sensitive adhesive sheet-bearing part comprising
a part having a surface formed of an olefinic rubber material, and
a pressure-sensitive adhesive sheet according to claim 1.

12. The pressure-sensitive adhesive sheet-bearing part according to claim 11, wherein the olefinic rubber material comprises an ethylene-propylene-diene rubber as its primary polymer component.

13. The pressure-sensitive adhesive sheet-bearing part according to claim 11, comprising a support layer comprising a bubble-containing layer, and the acrylic pressure-sensitive adhesive layer supported with the support layer.

14. The pressure-sensitive adhesive sheet-bearing part according to claim 11, with the pressure-sensitive adhesive sheet having a 10% compression hardness of 0.01 Pa to 0.07 Pa.

15. The pressure-sensitive adhesive sheet-bearing part according to claim 11, with the pressure-sensitive adhesive sheet having a breaking strength of 0.3 Pa to 2.5 Pa.

16. The pressure-sensitive adhesive sheet-bearing part according to claim 11, with the pressure-sensitive adhesive sheet having an overall thickness of 0.05 mm to 10 mm.

17. The pressure-sensitive adhesive sheet-bearing part according to claim 11, wherein the part is a weather strip.

18. The pressure-sensitive adhesive sheet-bearing part according to claim 11, wherein the adhesive face is directly adhered to the surface of the part formed of the olefinic rubber material.

19. The pressure-sensitive adhesive sheet-bearing part according to claim 18, wherein the pressure-sensitive adhesive sheet has a peel strength of 7 N/10 mm or greater, the peel strength is measured such that the pressure-sensitive adhesive sheet is peeled from the surface of the part formed of the olefinic rubber material in the 180° direction at a tensile speed of 50 mm/min.

20. The pressure-sensitive adhesive sheet-bearing part according to claim 11, wherein the olefinic rubber material comprises carbon black.

\* \* \* \* \*